United States Patent [19]

Skogby

[11] Patent Number: 5,946,474
[45] Date of Patent: Aug. 31, 1999

[54] SIMULATION OF COMPUTER-BASED TELECOMMUNICATIONS SYSTEM

[75] Inventor: Staffan Skogby, Danderyd, Sweden

[73] Assignee: Telefonaktiebolaget L M Ericsson, Stockholm, Sweden

[21] Appl. No.: 08/887,653

[22] Filed: Jul. 3, 1997

Related U.S. Application Data

[63] Continuation-in-part of application No. 08/874,660, Jun. 13, 1997.

[51] Int. Cl.[6] .................................................. G06F 9/455
[52] U.S. Cl. ..................... 395/500; 395/680; 395/681; 395/670; 395/677; 395/183.01; 395/183.06
[58] Field of Search ................................... 395/500, 680, 395/701, 677, 678, 670, 684, 685, 681, 183.01, 183.06; 364/578

[56] References Cited

U.S. PATENT DOCUMENTS

| | | | |
|---|---|---|---|
| 5,442,772 | 8/1995 | Childs et al. | 395/500 |
| 5,481,684 | 1/1996 | Richter et al. | 395/375 |
| 5,649,164 | 7/1997 | Childs et al. | 395/500 |
| 5,748,617 | 5/1998 | McLain, Jr. | 370/244 |
| 5,757,678 | 5/1998 | Leeke | 364/578 |

FOREIGN PATENT DOCUMENTS 88 07718  1/1988  WIPO .............................. G06F 9/44

OTHER PUBLICATIONS

May, "Mimic: A Fast System/370 Simulator", Proceedings of the Object Oriented Programming Systems Languages an Applications Conference, (OOPSLA), Orlando, Oct. 4–8, 1987, Special Issue of Sigplan Notices, vol. 22, No. 12, Dec. 1987, vol. 22, No. 7, Jun. 24.

Kluth et al, "Efficient Simulation of Network Models in C++", Teletraffic and Datatraffic in a Period of Change, Compenhagen, Jun. 19–26, 1991, pp. 601–608.

Cohen et al, "Generic Simulation Models of Communication Systems", Proceedings of the 29th Annual Simulation Symposium (Cat. No. 96TB100039), Proceedings of the 29th Ann. Simulation Symposium, New Orleans, La, Apr. 8–11, 1996, IEEE Comput. Soc. Pres., pp., 81–88, XP002061052.

Anderson, "An Overview of Motorola's Power Simulator Family", Communications of the Association for Computing Machinery, vol. 37, No. 6, Jun. 1, 1994, pp. 64–69, XP000450283.

Luderer, et al, "A Research Testbed for Switching Software Studies", Proceedings of the Global Communications Conference (Globecom), Houston, Nov. 29–Dec. 2, 1993, vol. 2, pp. 1034–1038, Institute of Electrical and Electronics Engineers XP000427963.

*Primary Examiner*—Kevin J. Teska
*Assistant Examiner*—Thai Phan
*Attorney, Agent, or Firm*—Nixon & Vanderhye, P.C.

[57] ABSTRACT

A simulation system (200) executes on a host computer system (110) for simulating a target telecommunications system. The simulation system (200) includes a simulation kernel (231) which contains a plurality of simulation subsystems, each of the simulation subsystems corresponding to subsystems of the target telecommunications system. The simulation kernel (231) is assembled as one executable image with all simulation subsystems executing in one common process context and sharing one common execution thread. The simulation system includes a central processor simulator (234) which simulates execution of target instructions in response to commands entered through a user communication channel to the simulation kernel. The central processor simulator simulates utilization of registers of the central processor of the target telecommunication system. An internal bus of the target telecommunication system is simulated by function calls between the simulation subsystems.

19 Claims, 31 Drawing Sheets

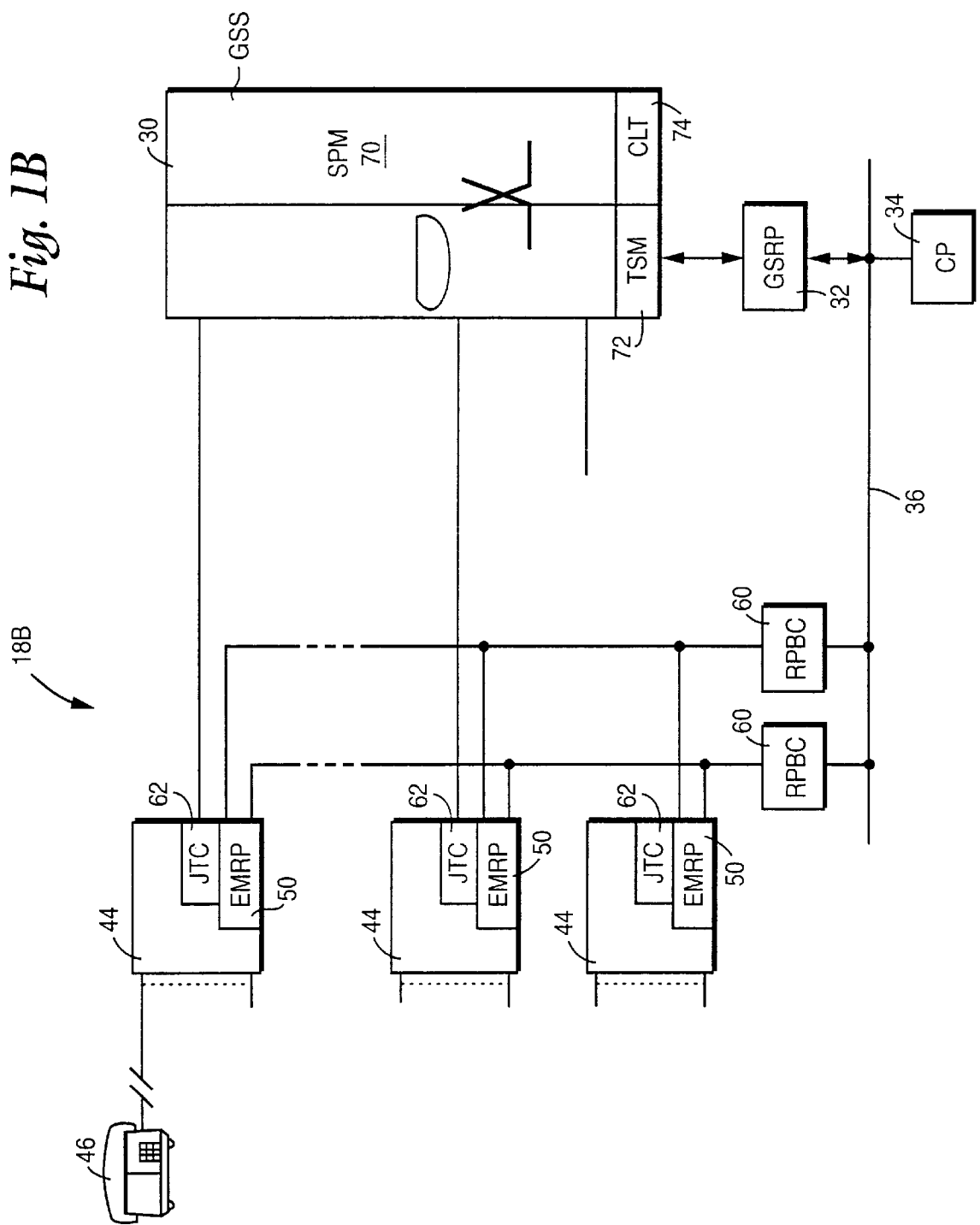

5,946,474

SIMULATION OF COMPUTER-BASED TELECOMMUNICATIONS SYSTEM

BACKGROUND

This application is a continuation-in-part of U.S. patent application Ser. No. 08/874,660, filed Jun. 13, 1997 and entitled "SIMULATION OF COMPUTER PROCESSOR", which is incorporated herein by reference.

1. Field of Invention

This invention pertains to the testing of computer-based systems, and particularly to testing of computer-based telecommunications systems by simulation of such systems 2. Related Art and Other Considerations Many large commercial and industrial systems employ numerous hardware components which are computer-based and which cooperate to perform various tasks. The computers controlling such systems are intricate and have complex assignments. Although it is often desired to test such systems and the computers controlling them, seldom is it affordable to perform a test, as a test may take the system and/or computer off line or otherwise consume resources. Typically the testing of such systems and/or computers, or the testing of new software for such systems, is complex and costly.

The cost of testing is particularly acute in the field of telecommunications. One particular example is a telecommunications switch through which calls between subscribers are connected. Such a telecommunications switch typically has a central processor which is connected to a plurality of regional processors. The regional processors perform numerous tasks in accordance with functions of the switch to which they are assigned. Telecommunications switches are often re-configurable, meaning that the architecture is dynamic Emulation or simulation of a system is one way of testing a system without taxing the system. One particular emulation technique is described in International Patent Application PCT/US94/03911, "METHOD FOR DECODING GUEST INSTRUCTIONS FOR A HOST COMPUTER".

While advantageous in some respects, current simulation/emulation techniques generally have poor execution speed and impose exacting memory requirements. Moreover, the user is often unable to accomplish as much in simulation as otherwise would be desired in a test. Further, it is often difficult to simulate a dynamically configurable system such as a telecommunications switch.

What is needed, therefore, and an object of the present invention, is an efficient simulation of a dynamically configurable computer-based system.

SUMMARY

A simulation system executes on a host computer system for simulating a target telecommunications system. The simulation system includes a simulation kernel which contains a plurality of simulation subsystems, each of the simulation subsystems corresponding to subsystems of the target telecommunications system. The simulation kernel is assembled as one executable image with all simulation subsystems executing in one common process context and sharing one common execution thread. The simulation system includes a central processor simulator which simulates execution of target instructions in response to commands entered through a user communication channel to the simulation kernel. The central processor simulator simulates utilization of registers of the central processor of the target telecommunication system. An internal bus of the target telecommunication system is simulated by function calls between the simulation subsystems.

The central processor of the target telecommunications system has an instruction processor, a signal processor, and a regional processor handler. In the simulation system, the central processor simulator has a simulated instruction processor which simulates an instruction processor of the target telecommunications system. However, the central processor simulator simulates the signal processor and the regional processor handler at an interface level.

One example of a target telecommunications system is a telecommunications switch. In simulating a telecommunications switch, the simulation system includes the following simulation subsystems:

(1) a simulated traffic generator for generating ISDN basic rate access tests;

(2) a simulated group switch subsystem;

(3) a simulated conference call device subsystem;

(4) a simulated signal transfer central subsystem which communicates with a simulated extension module regional processor device; and (5) a simulated signal transfer remote subsystem. The simulated signal transfer central subsystem and the simulated signal transfer remote subsystem transfer signals between them using procedure calls.

For a telecommunications switch, the target system includes a module through which a subscriber has access to the telecommunications system, the module being controlled by an access processor. Such access processor is simulated in the simulation system by a simulated access processor which simulates instruction set of the access processor and a register set of the access processor The simulated access processor interacts with subsystems at a logical level, i.e., at the message level.

The user communication channel is employed not only for commands to the central processor simulator, but also for access to the simulation subsystems. For example, access to a selected simulation can be had for configuring the selected simulation subsystem in accordance with hardware of the corresponding subsystem of the target telecommunications system. Commands entered through the user communication channel for a selected simulation subsystem are transmitted to the simulation kernel through a socket and passed to the simulation subsystem by a command dispatcher.

Each subsystem is organized in a tree hierarchy, with each simulation subsystem having a command interpreter. Each interpreter includes routines for handling hardware configuration of its simulation subsystem. Interpreters for all subsystems follow the same principles for command analysis.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1B is a schematic view of a telephone switching system wherein a subscriber stage is included in a parent exchange.

DETAILED DESCRIPTION OF THE DRAWINGS

In the following description, for purposes of explanation and not limitation, specific details are set forth such as particular architectures, techniques, etc. in order to provide a thorough understanding of the present invention. However, it will be apparent to those skilled in the art that the present invention may be practiced in other embodiments that depart from these specific details. In other instances, detailed descriptions of well known devices and methods are omitted so as not to obscure the description of the present invention with unnecessary detail.

The present invention concerns emulation of a target computer system using a host computer system. One specific but non-limiting example of a target computer system is provided in the context of a telephone switching exchange. Preparatory to discussing the emulation of the computer system of the illustrative example, the telephone switching exchange is described.

1.0 THE TARGET COMPUTER SYSTEM AND ITS ENVIRONMENT

Figure 1A:
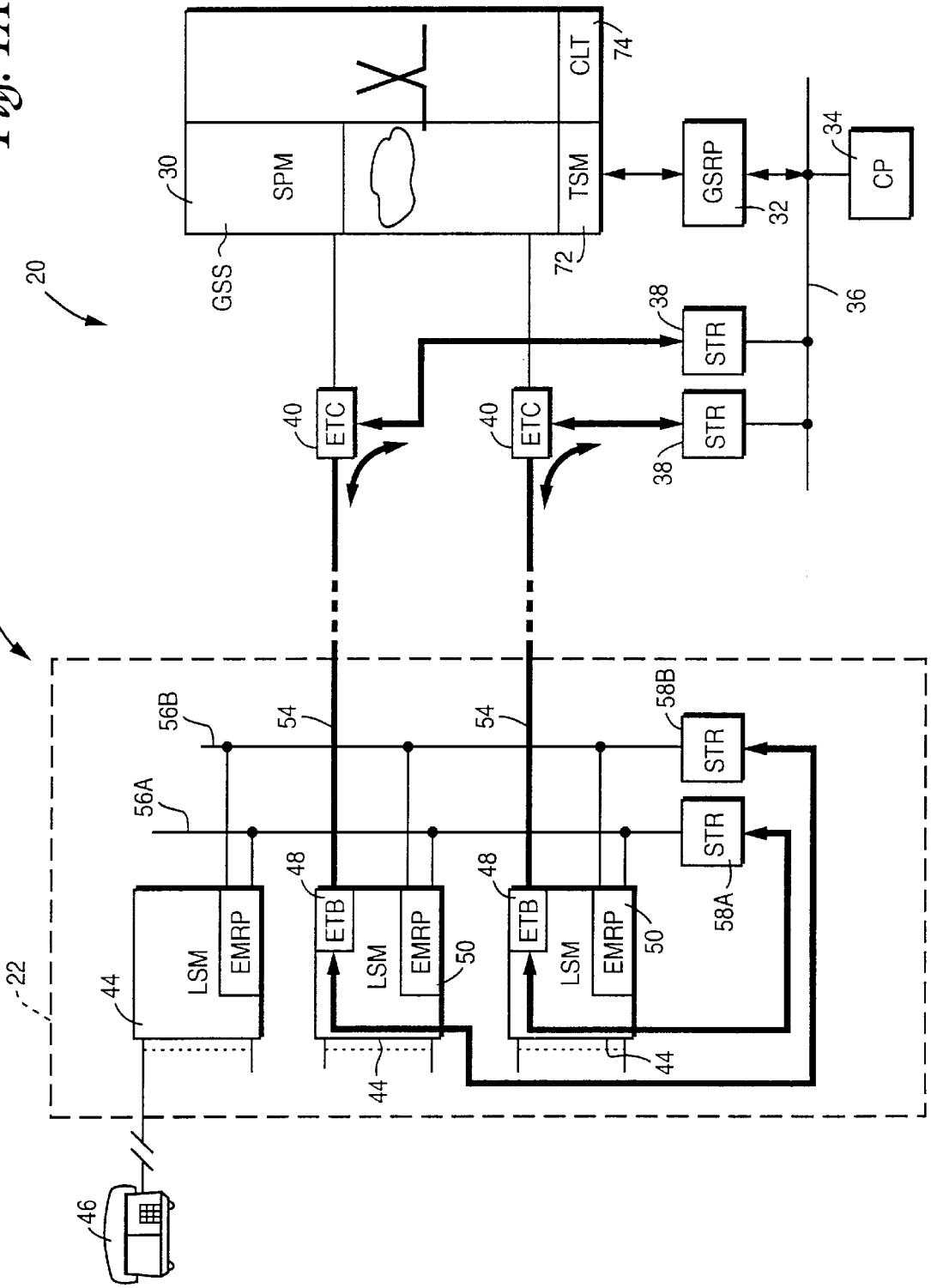
FIG. 1A is a schematic view of a telephone switching system including a remote subscriber stage.

FIG. 1A shows a telephone switching system 18A including a local telephone switching exchange 20 connected to a remote subscriber switch (RSS) 22. Switching exchange 20 includes group switching subsystem (GSS) 30. Group switching subsystem (GSS) 30 is controlled by one or more group switch regional processors (GSRP) 32, which in turn is controlled by central processor (CP) 34. Central processor (CP) 34 and group switch regional processor(s) [GRSP] 32 communicate over a regional processor bus (RPB) 36. Other regional processors and signaling terminal centrals (STC) 38 are also connected to regional processor bus (RPB) 36. As illustrated in FIG. 1A, each signaling terminal central (STC) 38 is connected to an associated exchange terminal circuit (ETC) 40.

Remote subscriber switch (RSS) 22 includes a plurality of line switch modules (LSMs) 44, each of the line switch modules (LSM) 44 being connected to a plurality of subscribers such as subscriber 46. The line switch modules (LSMs) 44 include numerous components. At least one, and preferably a plurality (but not necessarily all) of the line switch modules (LSMs) 44 have an exchange terminal board (ETB) 48. Each line switch module (LSM) 44 has an extension module regional processor (EMRP) 50. Each exchange terminal board (ETB) 48 is connected by links through one of the exchange terminal circuits (ETCs) 40 to a port of group switch (GSS) 30. The extension module regional processors (EMRPs) 50 are connected to two separate EMPR buses 56A and 56B. EMPR bus 56A is connected also to a signaling terminal remote (STR) 58A; EMPR bus 56B is connected also to a signaling terminal remote (STR) 58B. The signaling terminal remotes (STRs) 58 are connected to the exchange terminal boards (ETBs) 48 in the remote subscriber switch (RSS) 22.

A call between subscribers, also referred to as a connection, is routed through the telephone switching system 18. A call typically includes both signaling and traffic (the subscriber's message, e.g., voice or data). A call or connection utilizes channels, e.g., time division slots, on the links 54, of which channel 16 is typically designated for common channel signaling.

FIG. 1B shows a telephone switching system 18B in which a subscriber stage is included in the parent exchange. Like the system 18B of FIG. 1A, telephone switching system 18B includes a group switch subsystem (GSS) 30 which is controlled by group switch regional processor(s) [GSRP] 32, which in turn communicates with central processor (CP) 34 over regional processor bus (RPB) 36. Telephone switching system 18B of FIG. 1B differs from that of FIG. 1A in that each pair of signaling terminal centrals (STCs) 38 and exchange terminal boards (ETBs) 40 are combined to form a regional processor bus converter (RPBC) 60. The regional processor bus converters (RPBCs) 60 are connected both to regional processor bus (RPB) 36 and to the line switch modules (LSM) 44. In addition, the exchange terminal board (ETB) in each line switch module (LSM) 44 is replaced by a printed circuit board assembly known as a junctor terminal circuit (JTC) 62.

The group switch subsystem (GSS) 30 is essentially a matrix of cross-connects and thus comprises a plurality of space switch modules collectively referred to herein as the space switch module (SPM) 70. Each row of space switch modules is controlled by a time switch module, there being a plurality of time switch modules (one for each row) collectively designated as time switch module (TSM) 72. When connection signaling indicates that a call is to be set up in the group switch subsystem (GSS) 30, the group switch regional processor (GSRP) 32 selects the path through the group switch subsystem (GSS) 30 to be utilized for the connection by writing information to a control store of an appropriate one of the time switch modules. For synchronization of the group switch subsystem (GSS) 30, a plurality of clock modules, collectively referenced as clock modules CLT 74, are employed.

The signaling which is utilized to set up, route, and terminate the subscriber content information (i.e., traffic) through a network is referred to herein as "connection signaling". Connection signaling is typically one of two types: channel associated signaling (CAS) or common channel signaling (CCS). Such signaling is not to be confused with program signaling (e.g., software instructions) which is used in and between two or more processors to control the various functions of the exchanges per se. Mention hereinafter of a "signal" or "signaling" refers to program signaling unless otherwise specifically qualified as connection signaling.

In the telephone switching systems of FIG. 1A and FIG. 1B it is necessary for the central processor (CP) 34 to communicate with the extension module regional processors (EMRPs) 50 included in the line switch modules (LSMs) 44. Central processor (CP) 34 communicates with the extension module regional processors (EMRPs) 50 using program signals. These program signals are included as part of the information carried in the connection switching channels. That is, in the embodiment of FIG. 1A, the communication between central processor (CP) 34 and the extension module regional processors (EMRPs) 50 occurs in the connection signaling between signaling terminal central (STC) 38 and exchange terminal board (ETB) 48 (which is routed through, exchange terminal circuit (ETC) 40), with exchange terminal board (ETB) 48 being connected to a signaling terminal remote (STR) 58. Each signaling terminal remote (STR) 58 is, in turn, connected to all extension module regional processors (EMRPs) 50. In the embodiment of FIG. 1B, each regional processor bus converter (RPBC) 60 is connected to all extension module regional processors (EMRPs) 50.

The architecture of the telephone switching systems of FIG. 1A and FIG. 1B is understood by the person skilled in the art. Other examples of such architecture are described in U.S. patent application Ser. No. 08/601,964, filed Feb. 15, 1996, entitled "TELECOMMUNICATIONS SWITCHING EXCHANGE", which is incorporated herein by reference.

Figure 2:
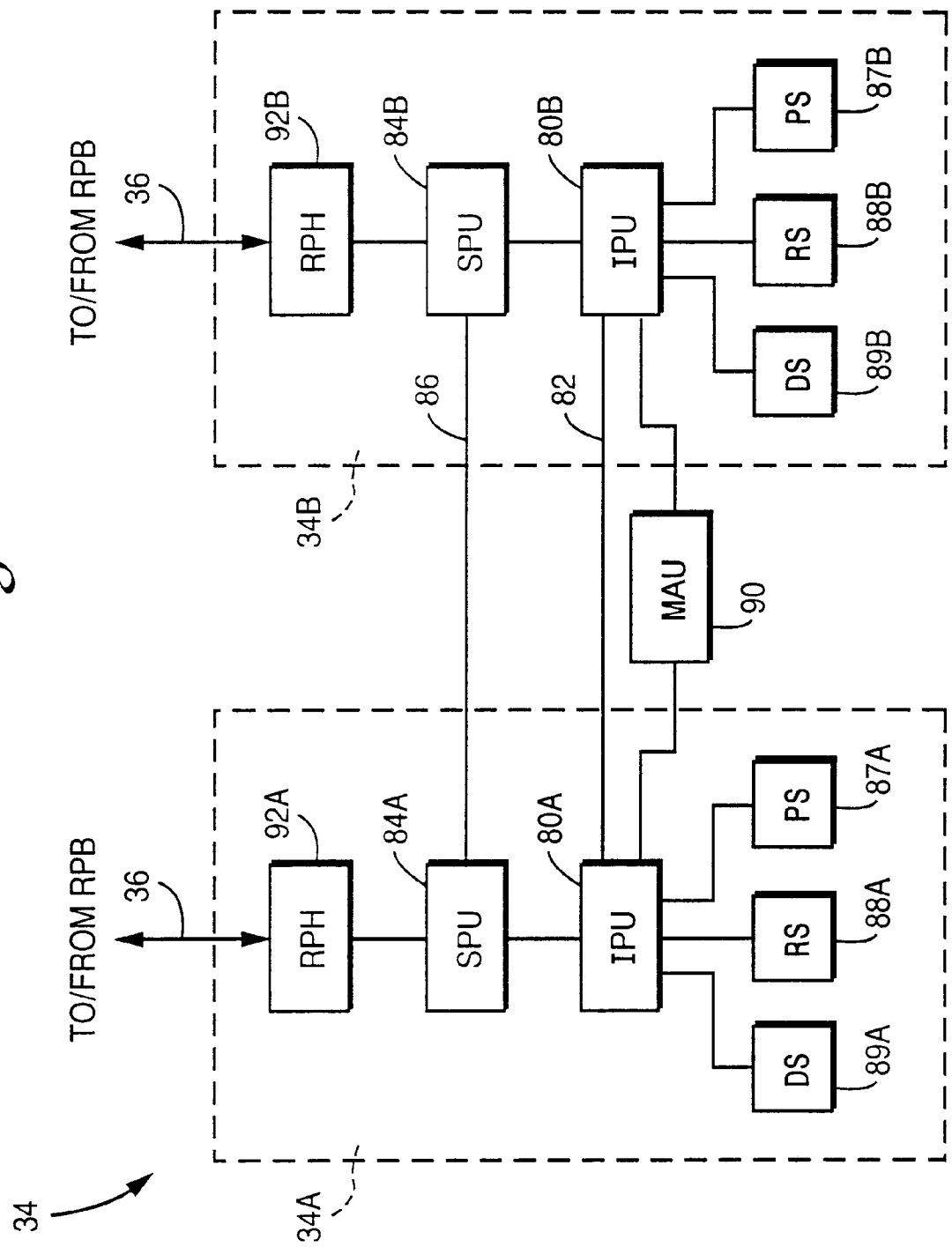
FIG. 2 is a schematic view of a central processor for a telephone switching system according to an embodiment of the invention.

An embodiment of central processor (CP) 34 is shown in FIG. 2. In actuality, central processor (CP) 34 comprises two central processors, particular central processor 34A and central processor 34B, which are collectively referenced as central processor 34. Each central processor includes an instruction processor unit (IPU) 80, with instruction processor units 80A and 80B being connected by an IPU updating and matching bus 82. Each central processor also includes a signal processor unit (SPU) 84, with signal processor units 84A and 84B being connected by a SPU updating and matching bus 86. The signal processing units 84 administer work in the CP 34, and prepare work to be done by the instruction processor units 80, thereby enabling the instruction processor units (IPUs) to execute programs continuously. The instruction processor units (IPUs) execute programs, with the signal processor units telling the IPUs the address at which the programs should be executed.

Each instruction processor (IPU) 80 has access to three storage units, particularly program store (PS) 87, reference store (RS) 88, and data store (DS) 89. As indicated above, instruction processor (IPU) 80 executes jobs, each job corresponding to a block of instructions stored in program store (PS) 87. Signal processor (SPU) 84 serves as a scheduler of jobs for instruction processor (IPU) 80. In connection with such scheduling, for each job signal processor (SPU) 84 receives a program "signal", e.g., from the outside world or from instruction processor (IPU) 80. Generally speaking, a signal is an instruction telling where to execute in a specific part of a block of instructions, the signal including data to be utilized in execution of the block. Signals are further described in section 3.2.3. Signal processor (SPU) 84 analyzes and prepares incoming signals, and assigns priority to these signals before they are sent to instruction processor (IPU) 80. Reference store (RS) 88 contains information describing the signals, the blocks, and the variables used in the system.

A maintenance unit (MAU) 90 is connected to both instruction processors (IPUs) 80. Maintenance unit (MAU) 90 has several functions, including initiating tests in case of fault and deciding which side, e.g., central processor 34A or central processor 34B, is to be designated as an executive.

Each central processor 34 also includes a regional processor handler 92. Regional processor handler 92 handles the program signaling to and from various regional processors, including the regional processor bus converters 60 and group switch regional processor(s) 32. Regional processor handler 94 is connected to its associated signaling processor (SPU 84) and to regional processor bus (RPB) 36.

Further architecture of a particular central processor 34, known as the APZ, and an exemplary manner of scheduling jobs therein is disclosed in U.S. patent application Ser. No. 08/574,977, filed Dec. 19, 1995, entitled "JOB SCHEDULING FOR INSTRUCTION PROCESSOR", which is incorporated herein by reference.

The instruction set and registers of CP 34 are described in section 3.2.1 and 3.2.2, respectively.

2.0 THE HOST COMPUTER SYSTEM

Figure 3:
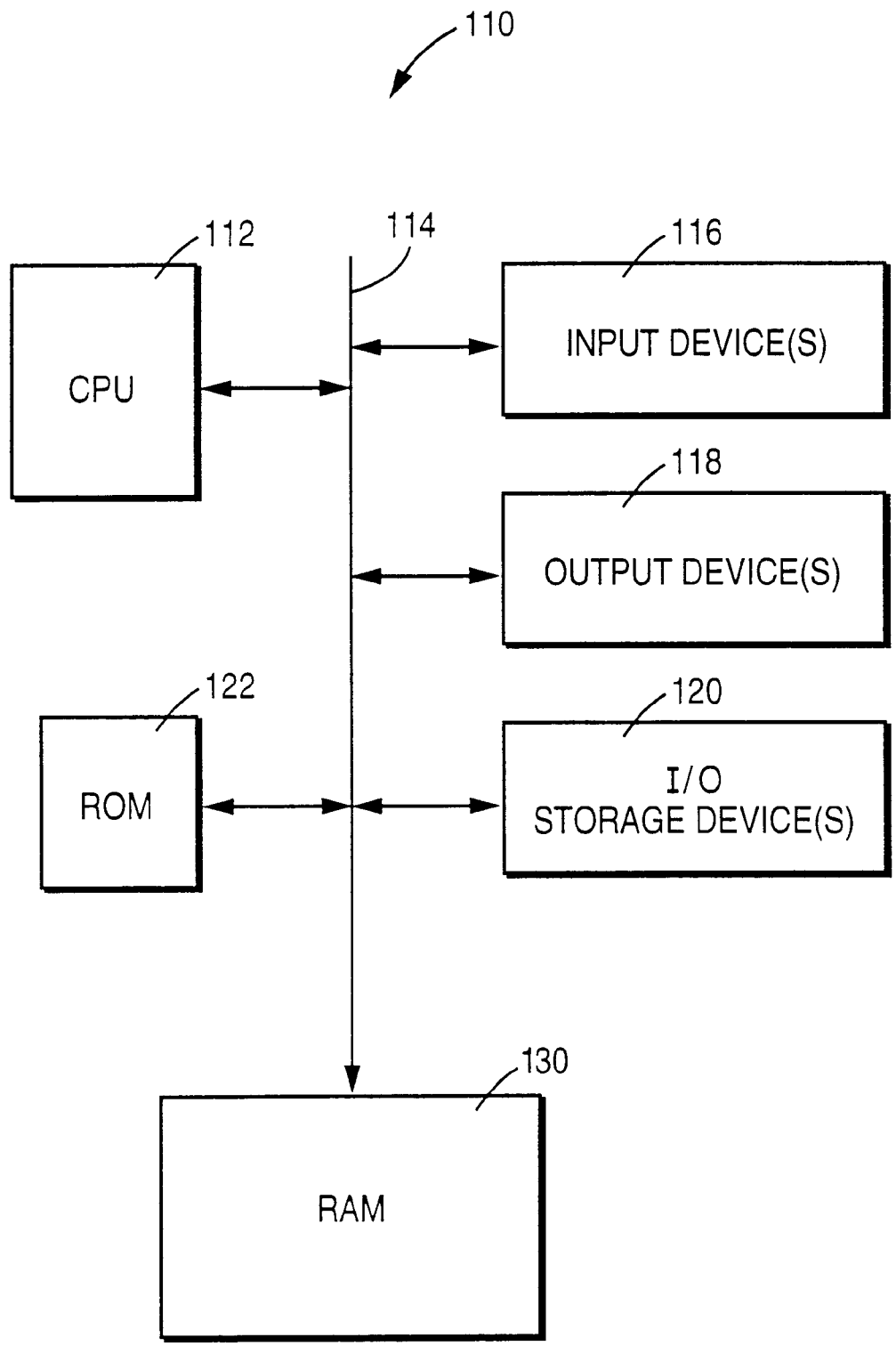
FIG. 3 is a schematic view of a host computer system according to an embodiment of the invention for simulating a telephone switching system.

FIG. 3 shows a host computer system according to an embodiment of the invention. Host computer system 110 has a host processor, e.g., CPU 112, which communicates with other host constituent units over bus 114. The other host constituent units include input device(s) (e.g, keyboards and pointers [e.g., mouse]) 116; output device(s) (e.g., displays, printers) 118; input/output storage device(s) 120 (e.g., disk drives); read only memory (ROM) 122; and, random access memory (RAM) 130. The person skilled in the art understands that various ones of these constituent units are connected to bus 114 through appropriate interfaces.

In the illustrated embodiment, the host machine is a Sun SPARC workstation. In the following it is assumed that SPARC version 8 is available on the host machine, i.e. that the imul and idiv instructions are available. All SPARC instructions are 32 bit, except for the (synthetic) instruction set, which may be 32 or 64 bits. CPU 112 is a 110 MHz microprocessor, RAM 130 is 64 Mbyte; and I/O storage device 120 is a disk drive accommodating swapping for 300 Mbyte. The invention is not limited to employment of this particular type of host machine, as it is understood that principles of the invention are applicable to other computer systems as well.

Figure 4:
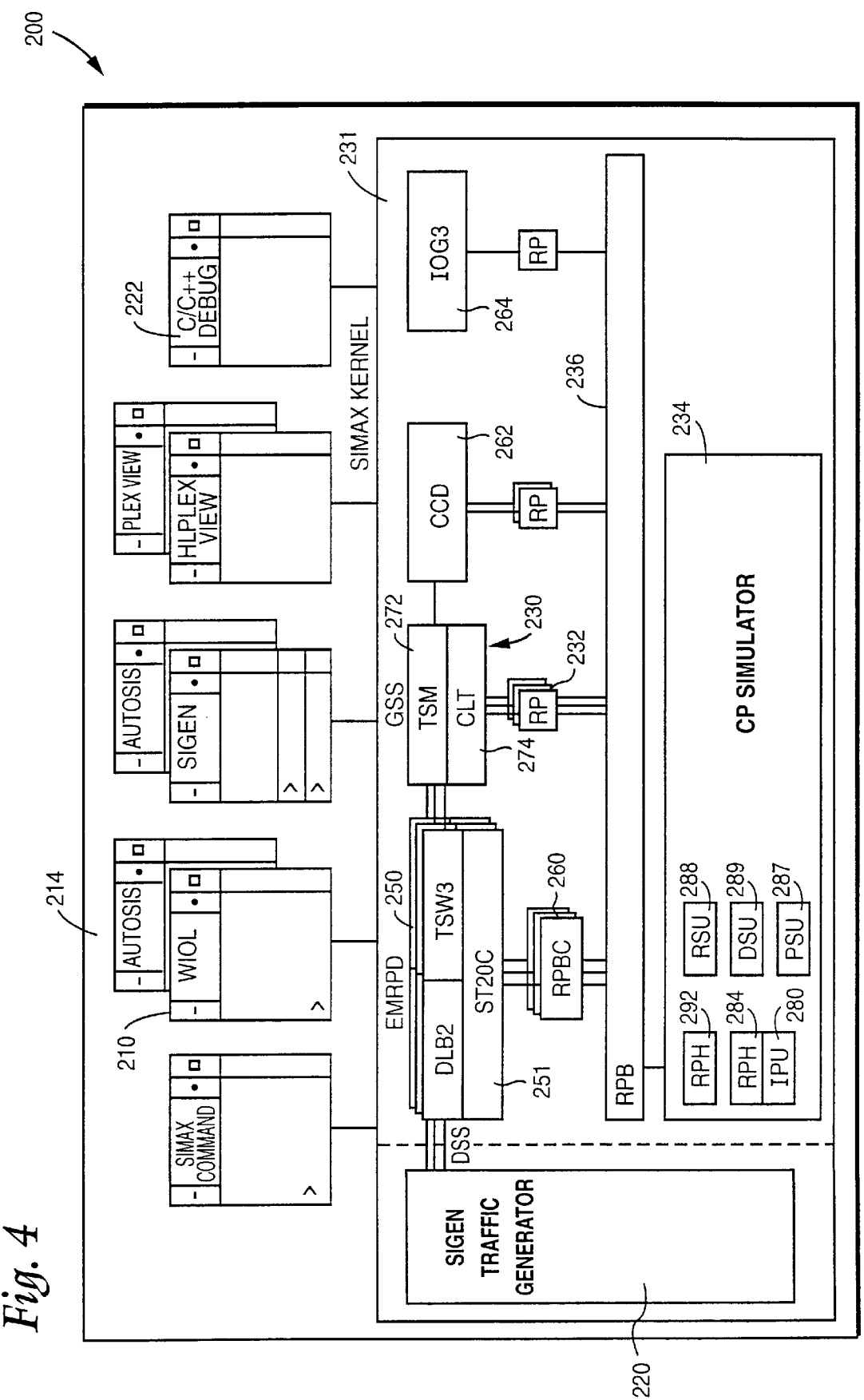
FIG. 4 is a schematic view of a simulation system according to an embodiment of the invention.

FIG. 4 shows a simulation system 200 which is executed on host system 110. The main parts in the simulation system 200 (also known as "SIMAX") are:

(1) a set of existing tools, including tools 210, 212, and 214, respectively known as WIOL, Plex debugger, Autosis.

(2) an additional user tool 216 known as Main Control Window (MCW) for hardware configuration and low level debugging.

(3) a traffic generator 220 for executing IGEN scripts.

(4) a debugger 222 (in C/C++ language) for a ST20C processor.

(5) a simulator kernel 231 (comprising a number of simulator subsystems that partly correspond to a real configuration of an AXE-10 ISDN basic rate access system).

As employed in the context of FIG. 4, a "subsystem" refers to corresponding actual hardware which is simulated by simulation system 200.

2.1 THE SIMULATOR KERNEL

Regarding kernel 231 of FIG. 4, the simulator subsystems include a simulated group switch subsystem 230; one or more simulated group switch regional processors 232; a simulated central processor 234; a simulated regional processor bus 236; simulated extension module regional processors (EMRPDs) 250; simulated regional processor bus controller(s) (RPBCs) 260; a simulated conference call device (CCD); and a simulated input/output system (IOG3) 264. Simulated central processor 234 is comprised of a simulated instruction processor unit (IPU) 280; a simulated signal processor unit (SPU) 284; a simulated program store (PSU) 287; a simulated reference store unit (RSU) 288; a simulated data store unit (DSU) 289; and, a simulated regional bus handler 292.

Kernel 231 is assembled as one executable Unix image. All subsystems in the simulator execute in one common Unix process context and share one common execution thread. This is motivated by the following reasons:

(1) Synchronization between collaborating subsystems can be simplified (e.g., is not based on any Unix IPC mechanism).

(2) No performance degradation due to Unix "heavy weight" process scheduling will occur.

(3) It is possible to obtain exact control of the execution, down to the level of executing a single instruction.

(4) A common address space reduces the need to create copies of data buffers used to pass the simulated signal flow between subsystems.

(5) High efficient distribution can be made of the execution thread among the cooperating subsystems (very simple scheduling mechanism).

(6) Possibility to configure the scheduler to give fully deterministic behavior during simulation, making it possible to exactly repeat a course of events.

As used herein, the "scheduler" is the internal scheduling mechanism for the different threads of the simulation kernel 231.

In the EMRPD Sim APP denotes application software written in C/C++. REOS is the OS for EMRPD, and is available from Enea Data.

2.2 MODULARITY WITHIN THE FRAMEWORK

The FrameWork of simulator kernel 231 creates a common environment for management and control of the different subsystems in the simulator kernel 231. The FrameWork also implements and supports a number of common services used by the subsystems.

The FrameWork environment is established by the following functions:

Registration management

Execution thread scheduling

Execution control

Generation and management of virtual time

Common configuration information handling

Additional common services are:

Error/trace reporting utilities

Management of dynamically allocated memory within the kernel

Dispatching of Unix signals

Simple command handling

Process handling facility

2.2.1 GENERAL PRINCIPLES FOR USER INTERACTION

When simulation system 200 is started, a window known as the SIMAX Command Window (SCW) is opened and becomes the user's communication channel to the simulator kernel 231. The SCW is a pure text window as the user interaction is command oriented. Commands are entered line by line, and when the user hits return a complete line is forwarded to a command interpreter which carries out the command. In a typical usage for function test the configuration is done by entering a prepared configuration script file.

2.2.1.1 CONFIGURATION OF THE SIMULATED SYSTEM

A simulation session always starts with configuration of the simulator, i.e., with a description of the properties of the simulated system (the target system). This is performed in two basic steps.

In the first step, the hardware components of the simulated system are stated. Components are created (instantiated) and each component is given an identity and its properties are detailed. Possible properties are, for example, the size of RAM and ROM relating to, e.g., the PS 87 and DRS 89 of the central processor 34.

In the second step, the connections between the components are stated. For example, busses, PCM links and line interface ports in the hardware system are simulated by connections between the simulated components.

In the following example (borrowed from the functional description of SIGEN 220), these two steps are illustrated concerning TUBORG (instances of the traffic generator subsystem):

```
FW> . . .
FW> . SIGEN
FW/SIGEN> __create TUBORG
FW/SIGEN> TUBORG
FW/SIGEN/TUBORG> __attach DLB2__ONE 1 0
FW/SIGEN/TUBORG> __attach DLB2__ONE 2 1
FW/SIGEN/TUBORG> __attach DLB2__TWO 0 2
FW/SIGEN/TUBORG> up
.
.
.
FW/SIGEN> .TUBORG
FW/SIGEN/TUBORG> __detach 0
FW/SIGEN/TUBORG> __detach 1
FW/SIGEN/TUBORG> __detach 2
FW/SIGEN/TUBORG> up
.
.
.
FW/SIGEN> __delete TUBORG
FW/SIGEN> top
.
.
.
```

When the simulated system has been set up properly, simulation can begin.

In practice, the set up procedure is likely to be stored in a script file, which is read at system start. A script file is basically an ASCII text file containing the desired commands. The name of script file could either be given as a command-line argument or as an argument to the "insert" command (see below). Giving the script file as a command-line argument is equivalent to typing in the "insert" command as the first command.

2.2.1.2 USING THE SIMULATED SYSTEM AND THE SIMULATOR

During simulation the user has access to the system in two ways. One access is directed towards the simulator itself; the other access is towards the simulated system.

Normally, the user interacts with the simulated system through an external tool, such as PlexView 212 and WIOL 210. PlexView is a view and debug tool which handles PLEX listings (E-modules), signals, and corrections. PlexView replaces paper printed E-module listings and signal description documents. PlexView offers the user features for browsing, searching, and printing. WIOL is an interactive man-machine communication program under the UNIX operating system. Using WIOL, a user can establish and close connections with the target system, prepare, edit, and send commands for the target system.

Thus, with such tools, the user can perform tests and check the results. These tools also allow the user to inspect the simulated system in the same way as a real system can be inspected. To the external tools the simulated system is indistinguishable from a real system.

There is also a need to interact with the simulator kernel 231 directly. This is done in the main control window (MCW). In so doing, other aspects of the simulated system can be inspected and other properties changed. For example, it could be desirable to change the order of pseudo processes for the scheduler or to change the size of the pseudo processes' execution slots. Interaction via the main control window (MCW) could also be used for additional functionality compared with that of the external tools. What is available in this respect is however completely decided by the designers of the different subsystems.

2.2.2 THE COMMAND HIERARCHY

Figure 5:
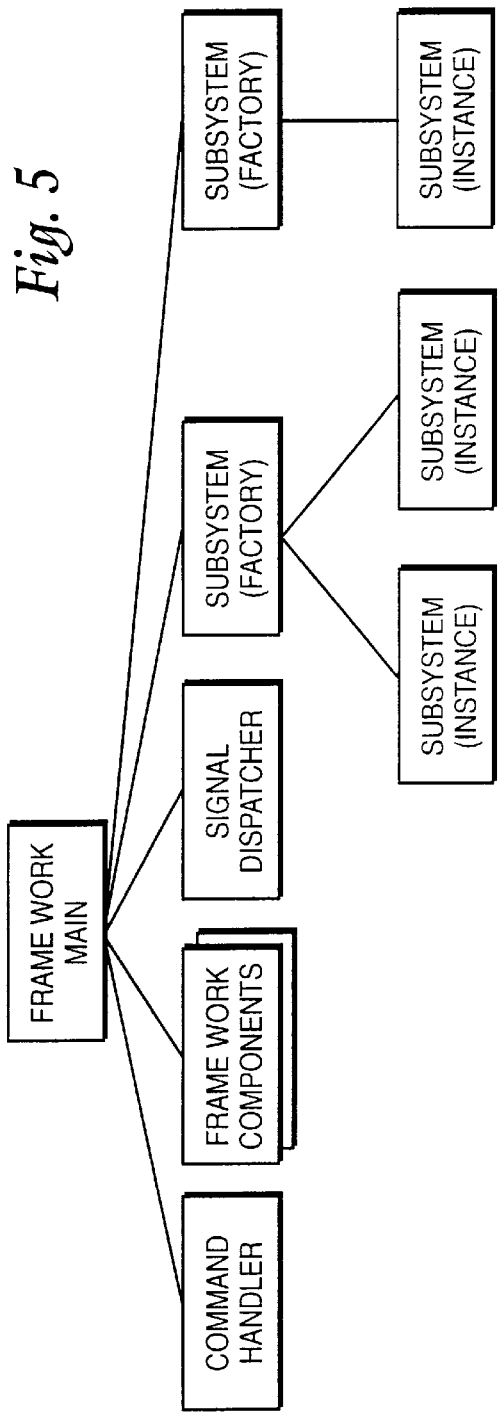
FIG. 5 is a schematic view of a hierarchical structure of subsystems according to an embodiment of the invention.

Each subsystem in simulation system 200 has its own interpreter. The subsystems and their interpreters are organized in a "framework" tree hierarchy as shown in FIG. 5. In FIG. 5, the simulation subsystems correspond to the actually simulated hardware of the target telecommunications system. Other parts of the framework are employed for administrative functions, such as the Command Handler, for example. Instances of the subsystem simulation are instantiated by the particular subsystem known as the "factory".

Commands are used to access the different subsystems in simulation system 200. Every subsystem can reach its parent node and its children nodes with navigation commands. It is also possible to reach the root node (FrameWork Main) in one step. With these navigation commands it is possible to navigate through the whole tree. At start time, FrameWork Main is the current active node, i.e. its interpreter executes any incoming commands. If the next command is a navigation command, the active node is chanced and consequently also the interpreter that executes incoming commands. There are four basic types of commands: Global, Local, Instance, and Tcl.

A Global command is defined for all interpreters and is added when the interpreter is created. Global commands have the same behavior in all interpreters.

A Local command is defined by the subsystem itself, and is only available when the subsystem is the active subsystem. Local commands have an '__' prefix.

An Instance command is utilized to reach child nodes and is added to the current subsystem when a child subsystem is created. These commands are actually local commands. Instance commands have a '.' prefix.

A subset of Tcl defined commands are available. These commands are actually global commands.

The hierarchical organization of the subsystems (and their interpreters) means that to interact with a certain subsystem, the user first has to move there with navigating commands, and then give the desired commands. Another possibility to execute commands in a different kernel component is to use the "do" command, as described below.

2.2.2.1 GLOBAL COMMANDS

Global commands are common for all subsystems. Global commands can be used on any level, and are automatically added to the command set when the subsystem is created.

This also means that the global commands are reserved and must not be redefined by any individual subsystem.

One set of global commands are defined to navigate in the subsystem tree hierarchy and to execute individual commands:

"up"—Moves upwards one level in the hierarchy. This command has no effect on the top level.

"top"—Moves directly to the uppermost level. This command has no effect on the top level.

"do"—Executes a command at a different place in the hierarchy. For example, "do/schd/_status" executes the status command in the Scheduler kernel component.

Another global command is used for script files, in particular an "insert file" command. The "insert file" command reads commands from "file", which is an ordinary text file containing commands to the current interpreter. It may also contain nested "insert" commands.

Three commands are used to control execution of simulator kernel 231. These three commands are the "halt", "run[n]", and "thread" commands. The "halt" command stops the execution of simulator kernel 231. When halted, the simulator only responds to commands (from the main control window [MCW]). The "run [n]" command continues execution of simulator kernel 231. This command releases the pseudo processes of kernel 231. If "n" is specified, the Scheduler runs n cycles. If no parameter is specified, Scheduler runs until the "halt" command is given. The "thread" command forces control to the scheduler to execute the process thread, before further commands are parsed.

Another set of commands are used to display information about the components in a simulated system. These commands are "showall", "iinfo", "?", "trace level", "prompt", and "resetall". The "showall" command calls the show-function for the component, if defined (See "_show" below). Then it forwards the "showall" command to all subsystems. Each child then executes the command in the same fashion. The "iinfo" command displays registration related information about the current instance. The "?" command lists all defined commands for current subsystem. The "trace level" command sets the trace level for the current instance/factory to the specified level. The "prompt" command sets the prompt string layout. The "resetall" command resets simulation system 200 by calling the reset-function for all registered modules.

2.2.2.2 LOCAL COMMANDS

Local commands can be added to a subsystem's interpreter at any time after registration. The local commands will have an '_' prefix, which is added automatically at creation time. There are some predefined local commands to invoke registered functions, particularly the "show" and "reset" command. The "show" command displays detailed information about the current component. As this information varies with the different components both in format and content, each component must have a show function which is registered with the component. The "reset" command calls the current instance's reset function. The function is normally only used by hardware simulating modules. A call to the reset function should have the same semantics as issuing a reset operation on the simulated hardware.

2.2.3 INSTANCE COMMANDS

When a subsystem is created, a navigation command is added to the parent subsystem, i.e. the current (active) subsystem. By invoking this command, the current subsystem is changed to the child subsystem. Instance commands have a '.' prefix. The commands to navigate upwards ("up" and "top") in the hierarchy are considered to be global commands.

2.2.4 Tcl COMMANDS

Several of the commands defined by the Tcl library are available for each subsystem. These commands have no prefix and can be considered as global commands.

2.2.5 THE COMMAND INTERPRETERS

As was mentioned above, a general design principle for the kernel 231 of simulation system 200 is that each kernel component that is controllable from the user interface should have its own command interpreter and its own command set. It is necessary that all interpreters work in the same way, i.e., that they follow the same principles for command analysis and that they tie actions (functions) to the commands in the same way. To this end, all interpreters are implemented using Tcl. This also enables the interpreters to import commands that every interpreter should understand.

All command interpreters are called from the Command Handler. There is always exactly one interpreter to call, the Current Command Interpreter, CCI. Any output from the interpreters, such as acknowledgments, should use the built-in Tcl commands "Tcl_AppendResult" or "Tcl_SetResult".

2.3 CP SIMULATOR

In the illustrated embodiment, the CP Simulator 234 (see FIG. 4) simulates an APZ212 20 processor including the complete instruction set and register of instruction processor unit (IPU) 80. This enables true job handling of APZ and APT software. The signal processor unit (SPU) 84 and regional processor handler (RPH) 92 are simulated at the interface level. The CP Simulator 234 is designed for high speed execution of target code, i.e., code of the simulated system.

As subsequently described in more detail (e.g., in section 3.4), the code threads of the target system that are going to be executed are incrementally translated into host (SPARC) binary code. The binary code is then executed. The binary code is also stored for reuse when entering the same code thread, thereby providing e.g., good execution performance.

2.4 INPUT/OUTPUT (IOG) SIMULATOR

The input/output simulation (IOG3) 264 (see FIG. 4) supports the basic functions for loading, dumping and function changes. A user interface for WIOL 210 is supported. The WIOL 210 and Autosis 214 are connected with channels. Autosis is a test system for creating and executing test instruction files. The core of Autosis 214 is its interpreter that is able to execute the test instructions, ie., sending commands to a device under test and analyzing the returned response. Autosis 214 is adapted for the AXE system, and controls various traffic generators.

2.4.1 SIGEN TRAFFIC GENERATOR

SIGEN traffic generator 220 is fully compatibility with existing IGEN-script and Autosis 214.

2.4.1.1 General

Figure 6:
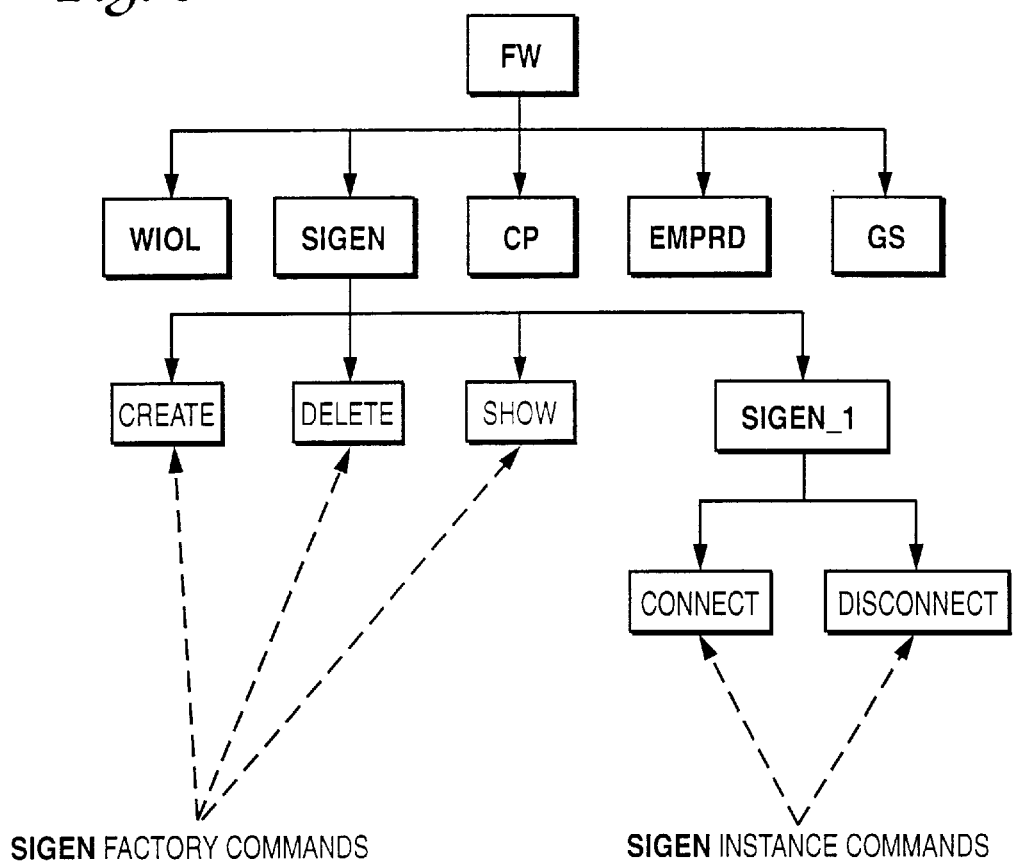
FIG. 6 is a schematic view of SIGEN command hierarchy according to an embodiment of the invention.

The SIGEN commands are divided in two parts. The first groups is used at the SIGEN factory level for creating and deleting of SIGEN instances (create and delete) as well as for printing the SIGEN configuration and status (show). The second group is used at the SIGEN instance level for establishing simulated connections between ISDN accesses and DLB2 lines (connect and disconnect). The first two commands are on the SIGEN level, whereas the latter are available under each instance of SIGEN as shown in FIG. 6.

2.5 GROUP SWITCH SIMULATOR 2.5.1 OVERVIEW OF GROUP SWITCH SIMULATOR

The Simulated Group Switch (SGS) module 230 (see FIG. 4) of the Simulation system 200 environment emulates a subset of the functionality of the Group Switch Subsystem (GSS) 30. Such emulation is required, e.g., for automatic functional tests of the ISDN basic rate access (BRAC).

The main purpose of the simulated Group Switch SGS 230 is to maintain the information about paths established in the hardware of the Group Switch Subsystem (GSS) 30. This information used to simulate end-to-end channels between ISDN terminals emulated by SIGEN and to simulation of in-band signaling in these channels, i.e. sending and receiving tones or values. This is a basic means used in ISDN BRAC functional test to verify tested ISDN services and established (simulated) connections.

Figure 7C:
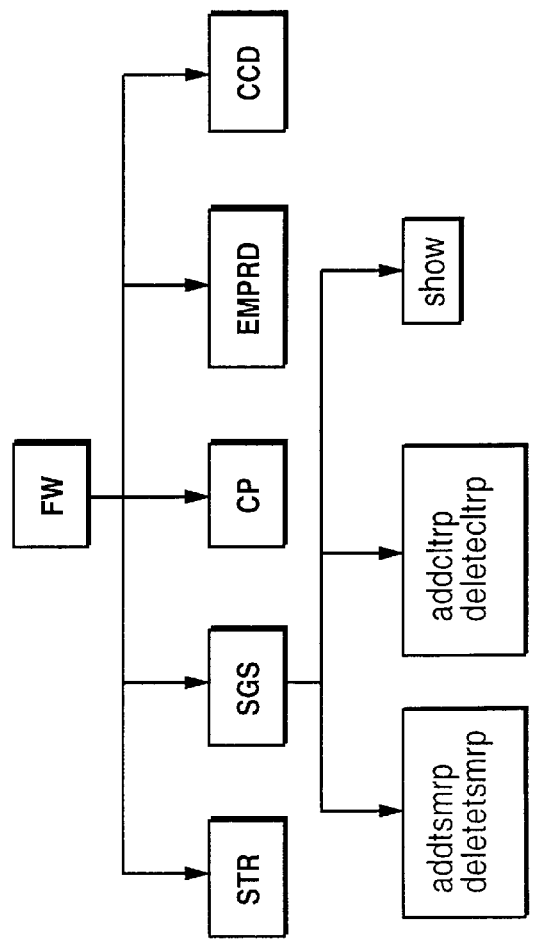
FIG. 7C is a diagrammatic view showing location of commands for the group switch simulation module.
Figure 7A:
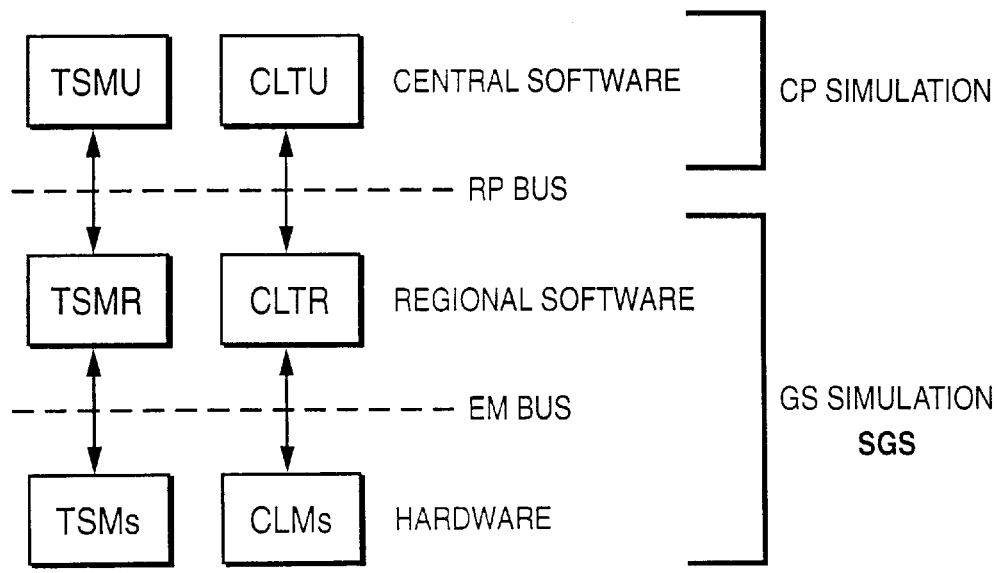
FIG. 7A is a diagrammatic view showing scope of group switch simulation module according to an embodiment of the invention.

The GS simulation module 230 mainly concerns blocks TSM 272 and CLT 274 (see FIG. 4). Since simulation system 200 provides CP simulator 234 to simulate CP 34, and the central software of TSM 72, CLT 74, and since other GSS blocks are executed on the simulated CP 234, there is no need to simulate the TSMU and CLTU functions in SGS. FIG. 7A shows that the TSMU and CLTU functions are executed in CP simulator 234, and that the GS simulation 230 simulates the regional software (for the TSMR and CLTR) and the hardware (for TSMs and CLMs)

2.5.2 FUNCTION OF GROUP SWITCH SIMULATOR 2.5.2.1 PASSIVE PART OF KERNEL

Figure 7B:
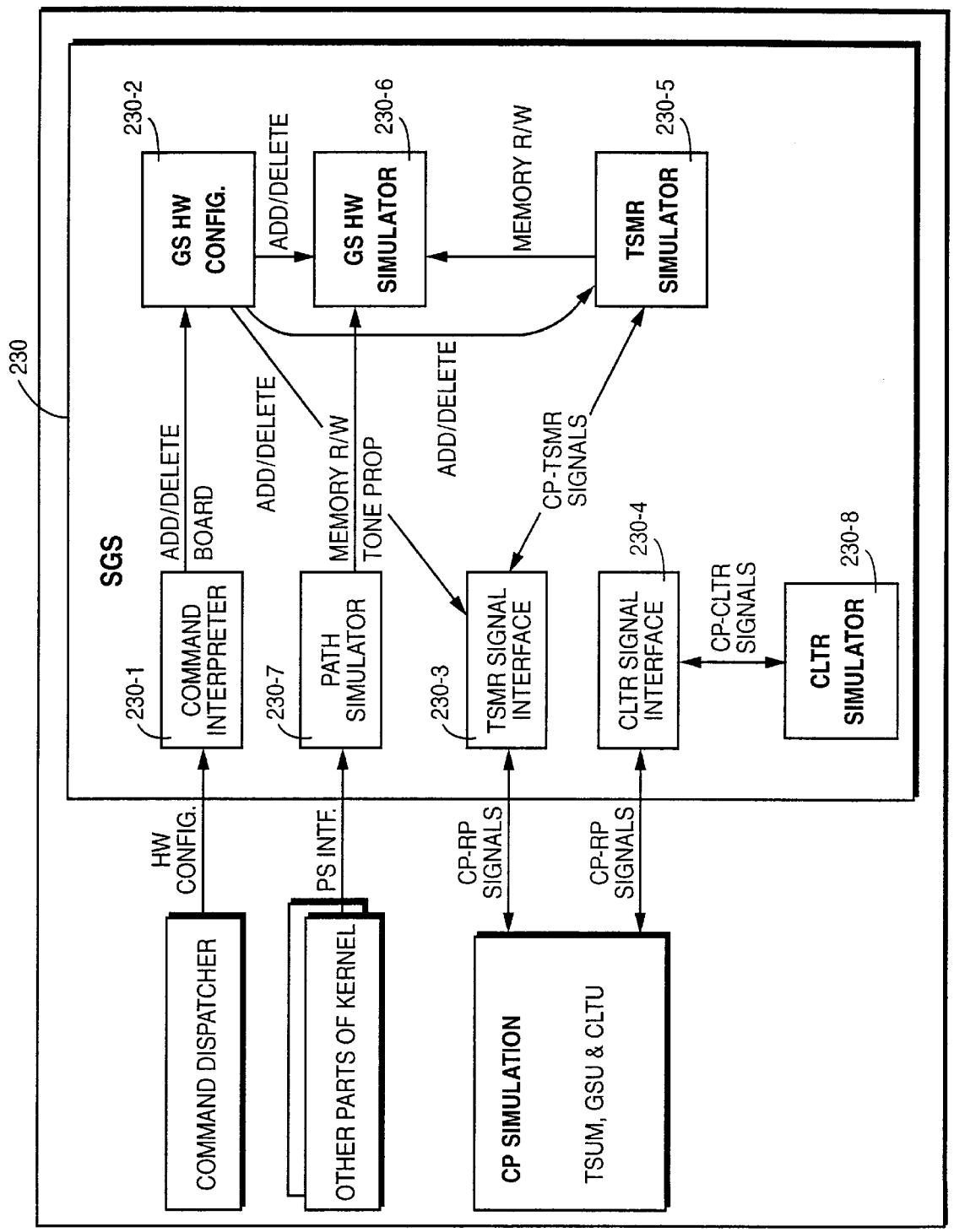
FIG. 7B is a schematic view of the group switch simulation module.

The simulated group switch module 230 is a passive part of kernel 231. This means that simulated group switch module 230 does not have any "process" inside and as such it is not a subject of the time sharing policy of kernel 231. Simulated group switch module 230 only acts upon requests issued by other parts of the simulated environment, i.e. signals sent from simulated CP 234, procedure calls, and low-level commands. The basic elements of simulated group switch module 230 module are illustrated in FIG. 7B and are discussed below.

2.5.2.2 BASIC ELEMENTS OF GROUP SWITCH SIMULATOR

The basic elements of simulated group switch module 230 module 230 (see FIG. 7B) include command interpreter 230-1; hardware configuration 230-2; TSMR signal interface 230-3; CLTR signal interface 230-4; TSMR simulator 230-5; group switch hardware simulator 230-6; path simulator 230-7; and, CLTR simulator 230-8.

Command interpreter 230-1 includes routines for handling the group switch hardware configuration commands. The commands entered in the Main Configuration Window (MCW) are transmitted to kernel 231 through a socket and passed to simulated group switch 230 by a command dispatcher.

Hardware configuration 230-2 is a function for managing the simulated group switch hardware, i.e memory allocation and creation of data structures for simulated TSMs and regional processors (RPS) controlling them.

TSMR signal interface 230-3 is a function for handling CP-RP signals sent to and from the TSMR simulator 230-5. The signals are internally distributed to the correct regional processor.

CLTR signal interface 230-4 is a function for handling CP-RP signals sent to and from the CLTR simulator 230-8. TSMR simulator 230-5 is a function for emulating necessary elements of the TSMR regional software. All incoming signals are accepted, but signals not concerned with connection establishment or removal result in dummy responses.

Group switch hardware simulator 230-6 includes routines for simulating elements of the group switch hardware—mainly the TSM data stores. Group switch hardware simulator 230-6 is controlled by TSMR simulator 230-5. The CSC and CSAB stores contain exactly the same information as in the real TSM 72, whereas the SSA and SSB store information about in-band signaling in the group switch, e.g. the most recently sent tone or byte.

Path simulator 230-7 is a function for analyzing paths in the group switch hardware simulator 230-6 propagating in-band signals through these paths, i.e. given a "talking" MUP the function will find the connected "listening" MUP, and send a quasi-tone to it.

CLTR simulator 230-8 is a function emulating basic elements of the CLTR regional software, such as maintaining the state of CLMS. All incoming signals are accepted, but most result in dummy responses.

2.5.3 GENERAL COMMANDS FOR THE GROUP SWITCH SIMULATOR

The group switch hardware configuration 230-2 includes commands for creating and deleting regional processors 232. The regional processors 232 control TSMs 72 and CLTs 74 as well as the "show" command for printing the simulated group switch configuration and status. The location of the commands for the group switch simulator 230 is shown in FIG. 7C.

2.6 CONFERENCE CALL DEVICE (CCD) SIMULATION 2.6.1 OVERVIEW OF CONFERENCE CALL DEVICE SIMULATOR

The simulated conference call device (CCD) module (SCCD) 262 of simulation system 200 (see FIG. 4) emulates those elements of the CCD functionality which are necessary for automatic function tests of the ISDN basic rate access (BRAC).

The main purpose of the simulation conference call device (SCCD) 262 is to maintain the information about the conference connections established in conference call device (CCD) hardware and tone messages generated towards the subscriber lines interconnected to the CCD RW through the group switch. This information is necessary for simulating in-band signaling on B channels, i.e. sending and receiving tones or values, which is a basic means used in BRAC functional test to verify (simulated) multiparty connections.

The simulation conference call device SCCD 262 provides the signal interface and selected function of the CCDR and conference call device (CCD) hardware. CCDU is executed on the simulated CP 234 and thus it is not the subject of the conference call device (CCD) simulation. The simulation of the regional software is necessary because simulation system 200 does not provide for the simulation of regional processors. The scope of conference call device simulation is shown in FIG. 8A.

Figure 8A:
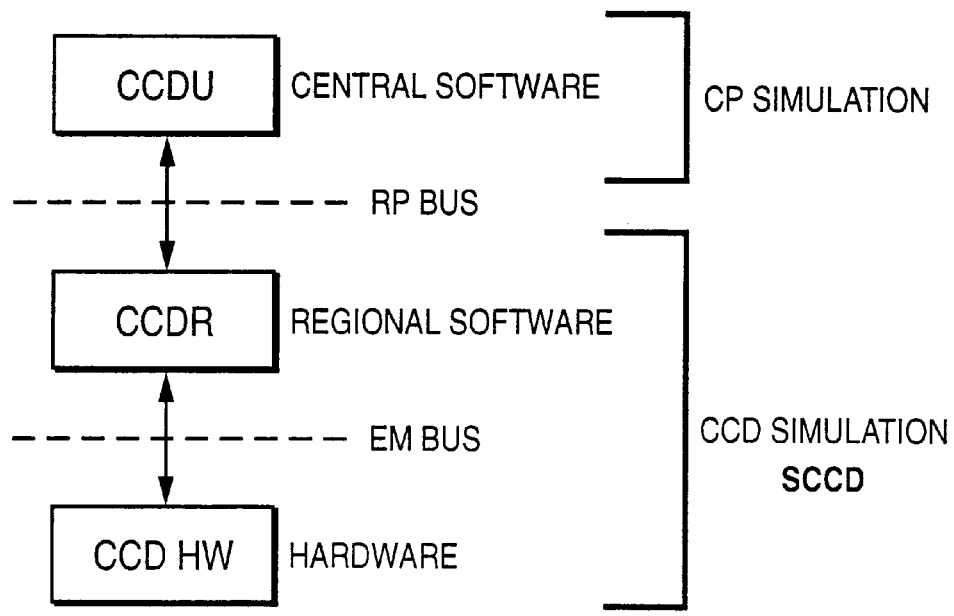
FIG. 8A is a diagrammatic view showing scope of a conference call device (CCD) simulator according to an embodiment of the invention.

Since SCCD 262 encapsulates both the hardware and regional software functionality as shown in FIG. 8A, there is no need for simulating the hardware interface between CCDR and conference call device (CCD) hardware (i.e. EM bus) Simulated CCDR directly "operate" on the memories of the simulated CCD HW. The RP bus functionality is also limited to simplified CP-RP signal passing.

2.6.2 FUNCTION OF CONFERENCE CALL DEVICE SIMULATOR 2.6.2.1 PASSIVE PART OF KERNEL

The simulation conference call device (SCCD) module 262 is a passive part of kernel 231 of the simulation system 200. This means that SCCD 262 does not have any "process" inside and as such it is not a subject of the time sharing policy of kernel 231. SCCD 262 only acts upon requests issued by other parts of the simulation system 200, i.e. signals sent from simulated CP 234, procedure calls, and low-level commands.

2.6.2.2 BASIC ELEMENTS OF SIMULATED CONFERENCE CALL DEVICE

Figure 8C:
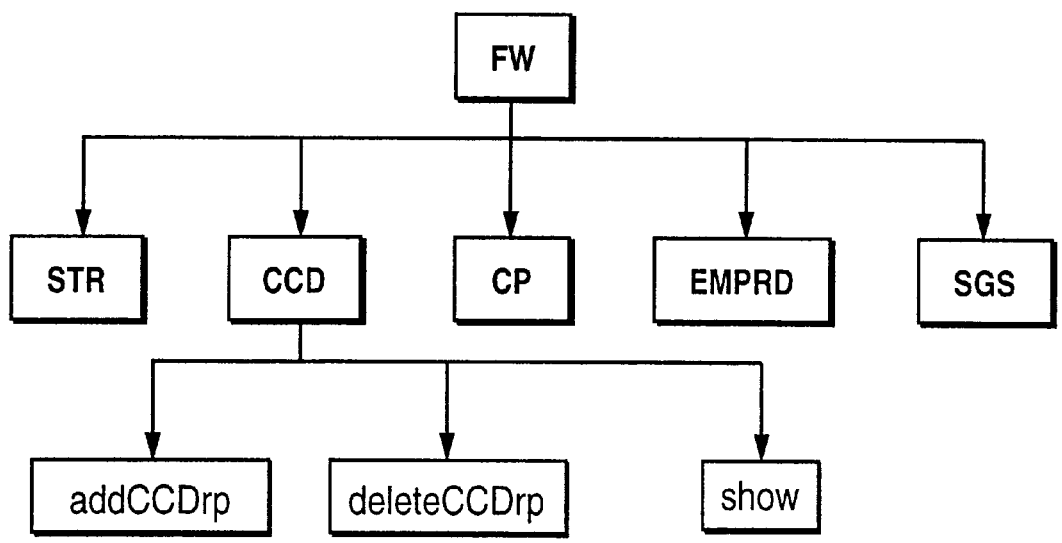
FIG. 8C is a diagrammatic view showing location of commands for the conference call device (CCD) simulator.
Figure 8B:
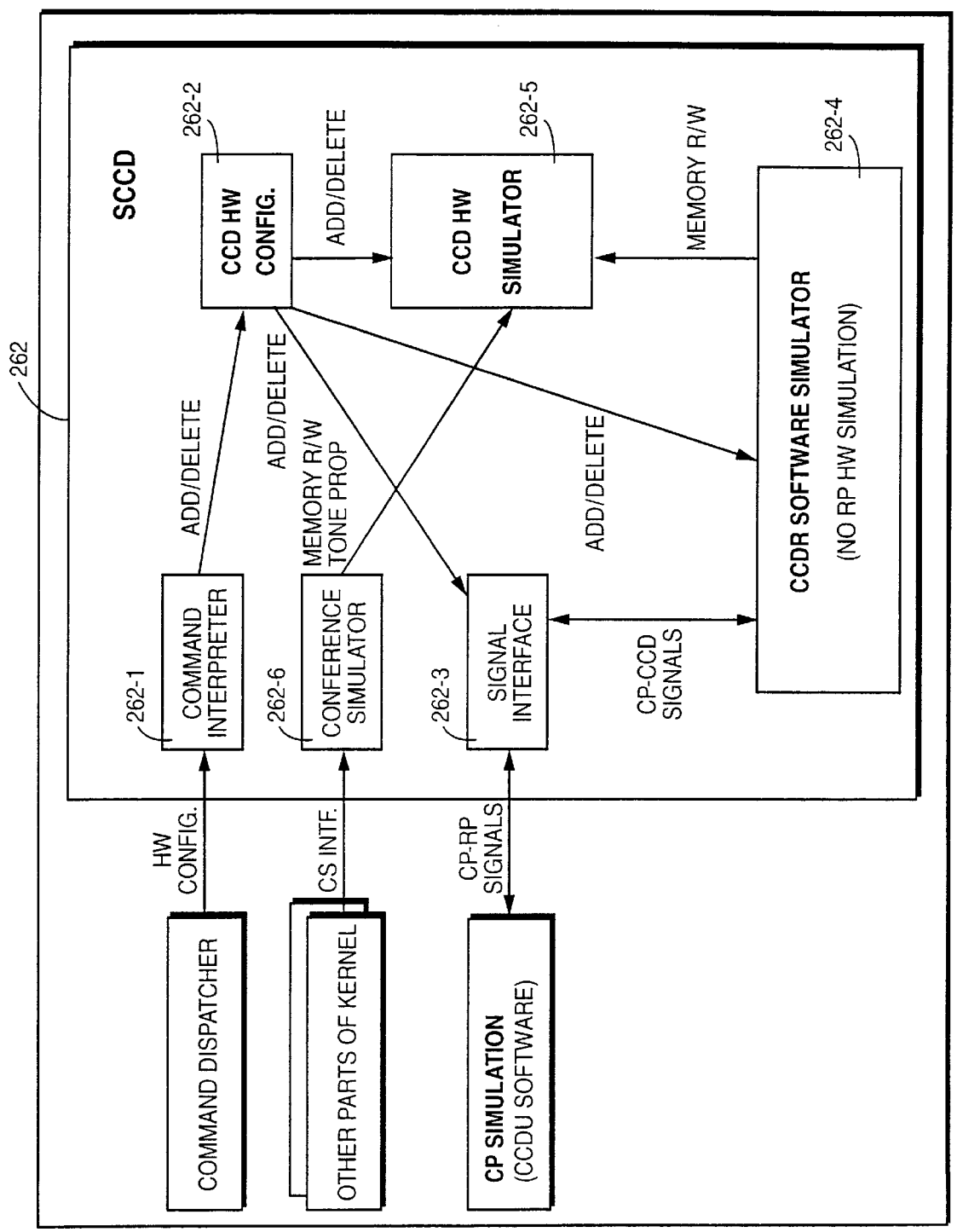
FIG. 8B is a schematic view of the conference call device (CCD) simulator.

The general structure of simulated conference call device (SCCD) 262 is shown in FIG. 8B. The basic elements of the SCCD module 262 are command interpreter 262-1; hardware configuration 262-2; signal interface 262-3; CCDR simulator 262-4; hardware simulator 262-5; and conference simulator 262-6.

Command interpreter 262-1 includes routines for handling the CCD hardware configuration commands. The commands entered in the Main Configuration Window (MCW) are be transmitted to kernel 231 through a socket and passed to SCCD 262 by a command dispatcher.

Hardware configuration 262-2 is a function for managing the CCD hardware simulator 262-5, i.e memory allocation and creation of data structures for simulated CCDS, and regional processors controlling them.

Signal interface 262-3 is a function handling CP-RP signals sent to and from CCDR simulator 262-4. All incoming signals are accepted, but signals not concerned with connection establishment or removal result in dummy responses.

CCDR simulator 262-4 is a function emulating necessary elements of the regional software, such as establishment and removal of CCD connections, sending simulated tones, etc.

Hardware simulator 262-5 includes routines for simulating elements of the CCD hardware—mainly the CCD data stores which contains states of the connections, their attenuations, the most recently connected tones (cadences and frequencies), etc.

Conference simulator 262-6 is a function for analyzing conference connections in the CCD HW simulator 262-5 and propagating in-band signals (e.g. simulated tones) to their participants.

2.6.3 CONFERENCE CALL DEVICE COMMANDS

FIG. 8C shows location of commands for the conference call device (CCD) simulator 262.

2.7 STC SIMULATION
2.7.1 OVERVIEW OF STC SIMULATOR

The STC (signal transfer control) simulation module 238 of the simulation system 200 (see FIG. 4) simulates a part of the STC functionality which is required for automatic functional tests of the ISDN basic rate access (BRAC). In the illustrated embodiment, the STC module runs on SUN Sparc workstations under Solaris 2.5 as an integral part of kernel 231 of the Simulation system 200.

The main task of a simulated STC (signal transfer central) 238 is to provide means for loading and signal communication with the simulated EMRPDs 250. STC 38 is a special kind of regional processor connected to the regional processor bus 36. The signal transfer between CP 34 and EMRPD 50 (including loading) goes through the regional processor bus (RPB) 36, a pair of processors STC 38 and STR 58, and the EMRP Bus (EMRPB) 56 controlled by STR 58 (see FIG. 1A).

In a real AXE input/output system, each STC 38 and STR 58 pair is connected by an SS7 link (ITU-T Common Channel Signaling System no. 7, level 2) normally based on a PCM connection of the first order. The SS7 link enables control of remote subscriber stages. Simulation system 200 does not have any simulation of this link, because signals between STC 38 and STR 58 can be transferred by means of procedure calls.

Figure 9A:
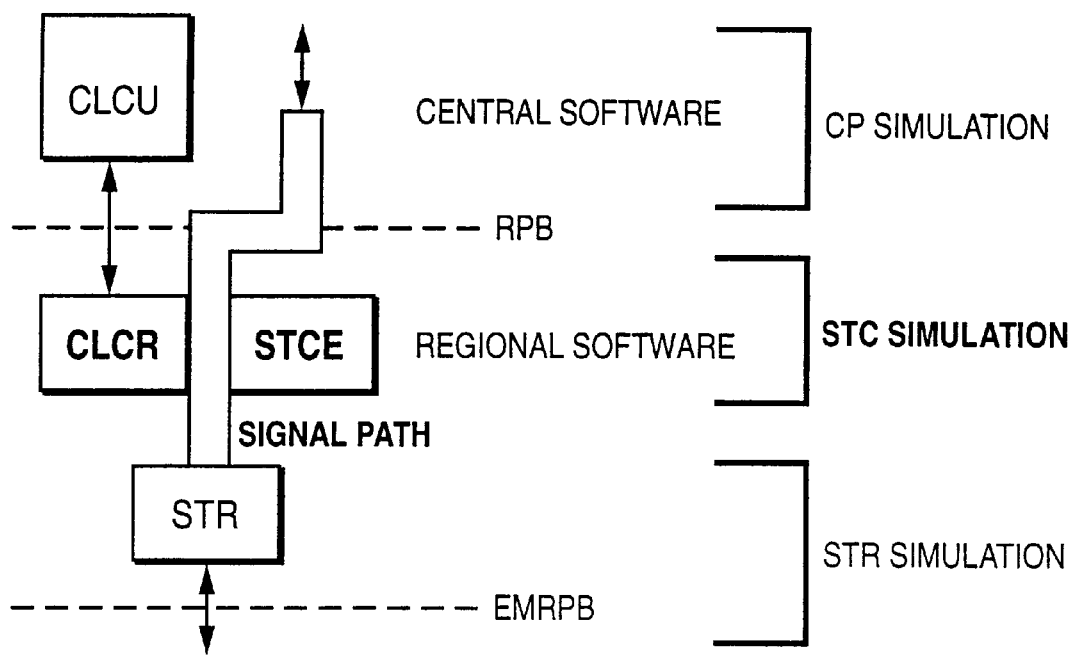
FIG. 9A is a diagrammatic view showing scope of a signal transfer control simulator according to an embodiment of the invention.

FIG. 9A shows the scope of a signal transfer control simulator according to an embodiment of the invention. As shown in FIG. 9A, the STC simulation module 238 includes functional simulation of the STCE (STC Executive) and regional program CLCR (Control signaling Link Central). The STC Executive provides mechanisms for signal conversion between RPB format and EMRPB format and administration of EMRP(D) loading with the aid of I/O transfer. It also provides job administration and program execution support for CLCR and functions necessary for RP maintenance.

The CLCR program handles the SS7 signaling link at signal transmission, link test, and system restart. CLCR interworks with the STCP and DCI hardware components.

2.7.2 FUNCTION OF STC SIMULATOR
2.7.2.1 PASSIVE PART OF KERNEL

The STC simulation module 238 is a passive part of kernel 231 of simulation system 200. This means that STC simulator 238 does not contain any pseudo-process and, as such, is not subject to time sharing policy of kernel 231. STC simulation module 238 acts only upon the requests issued by other parts of the simulated environment, i.e. signals from simulated CP 234 and EMRPD 250 (through STR), procedure calls, and users commands.

2.7.2.2 BASIC ELEMENTS OF STC SIMULATOR

Figure 9C:
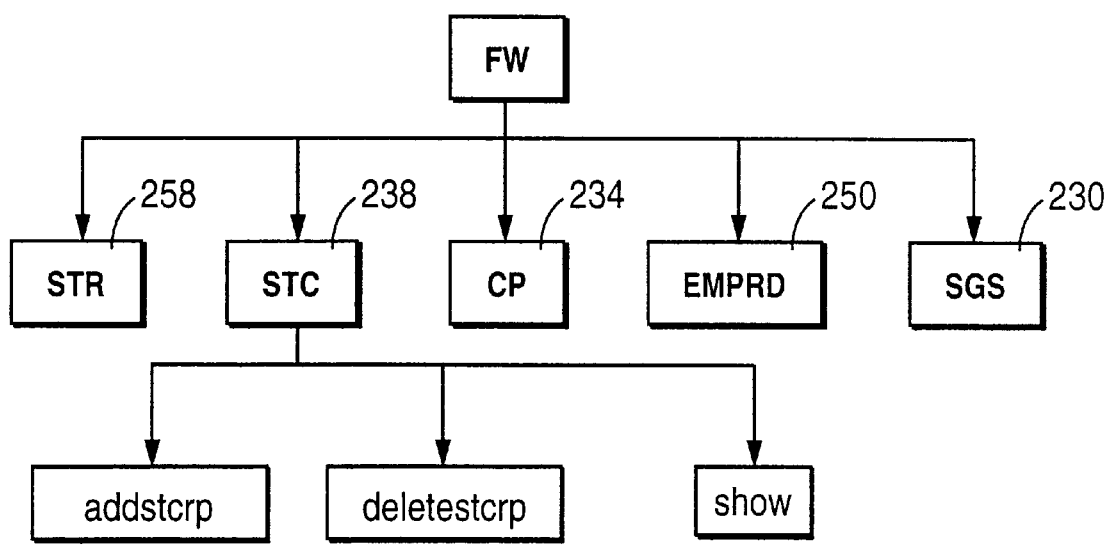
FIG. 9C is a diagrammatic view showing location of commands for the signal transfer control simulator.
Figure 9B:
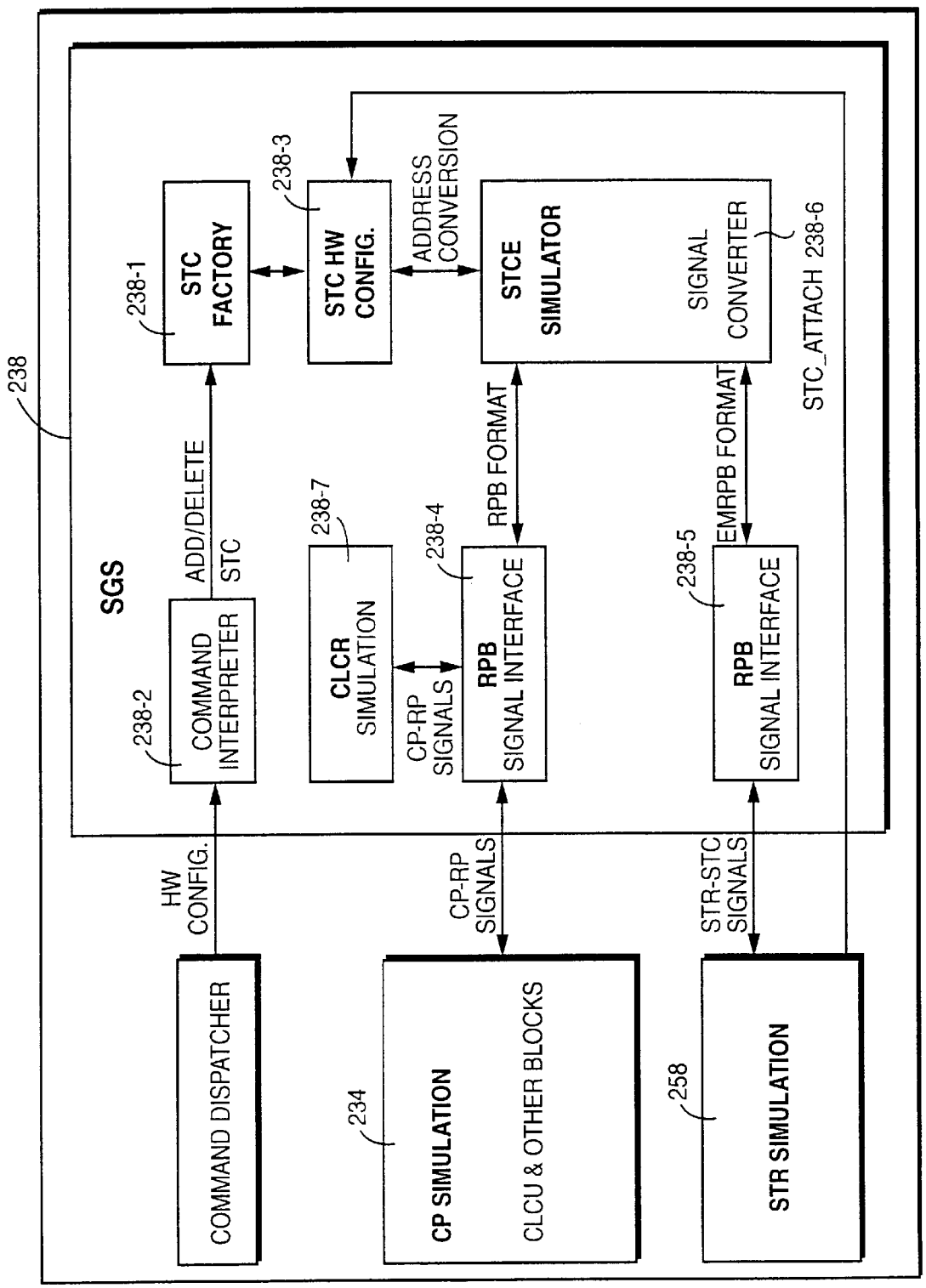
FIG. 9B is a schematic view of the signal transfer control simulator.

The general structure of STC simulator 238, shown in FIG. 9B, include STC factory 238-1; STC command interpreter 238-2; STC hardware configuration 238-3; RPB signal interface 238-4; STR signal interface 238-5; STCE simulator 238-6; and CLCR simulator 238-7.

STC factory 238-1 is a function for handling the STC instances. STC command interpreter 238-2 is a function for handling the configuration commands defining STC instances. The commands are entered in the Main Control Window (MCW), transmitted to kernel 231 and passed to SGS 230 by the command dispatcher.

STC hardware configuration 238-3 is a function for managing the configuration of an STC instance including the link to regional processor handler (RPH), the link to simulated STR and the address conversion tables EMITAB, STCTAB, and EMOTAB initiated by CP-RP signals.

RPB signal interface 238-4 is a function for handling CP-RP signals sent to and from the STCE simulator 238-6. The interface concerns device block signals, operating system signals, and I/O transfer signals. The signals received from CP 234 are terminated in STC or transferred to STR.

STR signal interface 238-5 is a function for handling incoming and outgoing signaling towards STR simulator 258. The signals are sent and received by means of procedure calls. A simple acknowledgment-based protocol is applied from both sides.

STCE simulator 238-6 is a function for simulation STC executive functions, including mainly converting the signals transferred between CP 34 and EMRPB 50 from the RPB to EMRPB format and vice versa. The function uses the address conversion tables EMITAB, STCTAB, and EMOTAB.

CLCR simulator 238-7 is a function for responding to CP-RP signals sent to CLCR by CLCU. It includes the signals used for link initiation, test, and blocking. Since the SS7 link is not simulated the signals have dummy character.

2.7.3 STC COMMANDS

FIG. 9C is a diagrammatic view showing location of commands for the signal transfer control simulator.

2.8 STR SIMULATION
2.8.1 OVERVIEW

The STR simulation module 258 simulates the behavior of the STR hardware component 58 (see FIG. 1A). Simulation is functional, that is, it is the STR's response to external signals that is simulated, while the inner workings of STC 58 are only simulated to the extent this is necessary.

As shown in FIG. 1A, the STR 58 receives signals from the EMRPB 56 and the STC 38. Some of these signals are taken care of by STR 58 itself, the other signals are forwarded to the STC 38 and EMRPB 56, respectively.

Figure 10A:
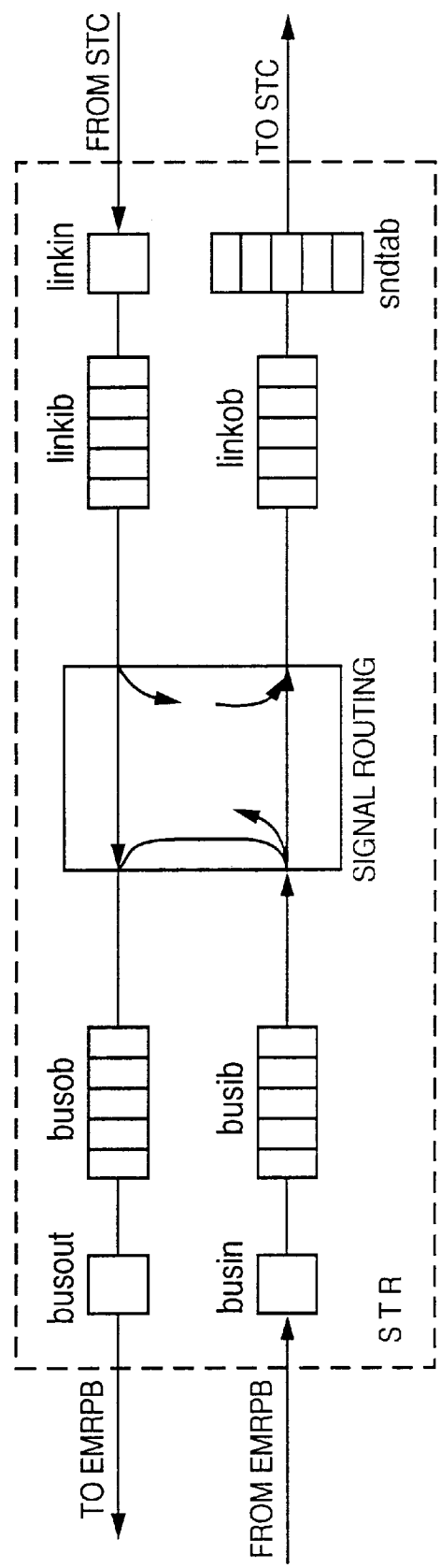
FIG. 10A is a schematic view of a signal transfer remote and signal flow therein

FIG. 10A shows STR simulator 258 with its signal flow. In particular, FIG. 10A shows that signals arriving from the STC 238 are stored in an input buffer linkin and transferred to a input queue linkib. One signal at a time is fetched from this queue and taken care of by the STR Executive Program A signal from STC simulator 238 can either be diverted to a module within STR simulator 258 itself or lead further to the EMRPB 256. In the latter case, the signal is queued in a buffer queue busob before copied to the output buffer busout. Conversely, signals from the EMRPB 256 are stored one at each time in the input buffer busin, and then queued in busib. Later, one signal at a time is fetched by the STR Executive Program, treated inside STR simulator 258 or sent to the STC simulator 238 via the buffer queue linkob and the output buffer sndtab.

To enable stand-alone operation of regional processors, a signal from EMRPB 256 may also return immediately to the output queue busob and subsequently to EMRPB (and another regional processor). This functionality is only used when other parts of the system is malfunctioning to allow regional processors to continue operation.

In the target system (see FIG. 1A), signals between the STR 58 and the STC 38 are sent using the CCITT #7 level 2 protocol. In the simulated system, signals between these modules are consequently buffers without any protocol overhead.

Signal sending and reception has also been simplified in the simulated system. Asynchronous sending and reception of signals has been exchanged by synchronous function calls. Thus, a signal is sent as an argument to a function call. The signal will be received when the receiving pseudo process is allowed to execute next time. Signals to the EMRPB are however queued within the STR simulator 258 and sent one by one to the receiver.

Figure 10B:
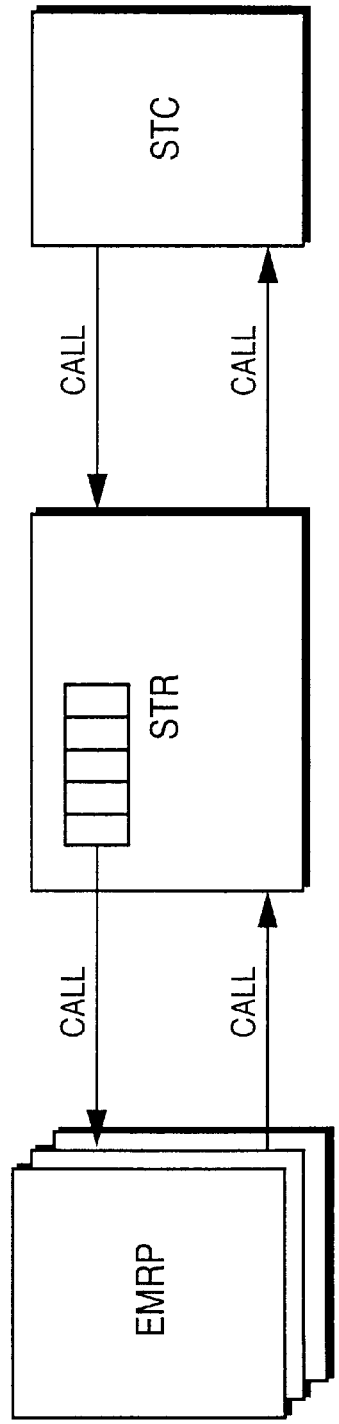
FIG. 10B is a schematic view showing cooperation of a signal transfer remote and its surrounding modules.

In addition, bus handling, cable selection and CRC calculation is not included in the STR simulator 258 of the illustrated embodiment. The architecture of the STR simulator 258 and its surrounding modules cooperate according to the principles in FIG. 10B.

2.8.2 FUNCTION OF STR SIMULATOR
2.8.2.1 KERNEL SUBSYSTEM

The STR simulator 258 module is implemented as a subsystem in kernel 231 of simulation system 200, and executes independently as a pseudo process. As such, it fetches processes and distributes signals from EMRPs and the STC simulator 238. These are fetched from queues and buffers, where they are placed by the surrounding modules during their execution.

2.8.2.2 ALLOCATION DIAGRAM

Figure 10C:
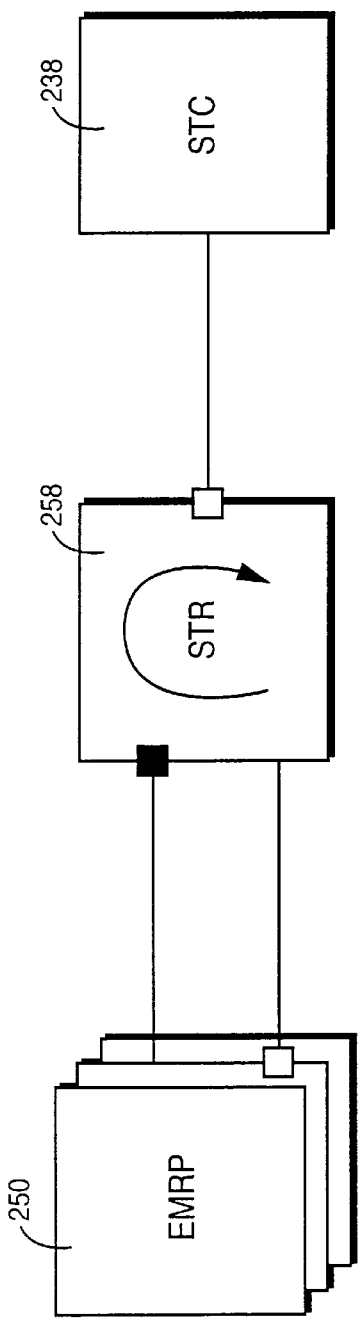
FIG. 10C is a diagrammatic view showing how the STR simulator communicates with EMRPs and a STC simulator.

FIG. 10C shows how the STR simulator 258 communicates with the EMRPs 250 and the STC simulator 238. STR simulator 258 provides EMRP clients with an externally callable function interface, the clients conversely define connection points for the STR simulator 258 with function pointers. Similarly, STR simulator 258 provides the SC simulator 238 with connection points with function pointers.

2.8.2.3 INTERFACES

The interface towards STR simulator 258 has three parts. These three parts include functions defined by STR simulator 258 [see section 2.8.2.4]; functions supplied by the EMRPB client (these are defined when the client attaches to the STR) [see section 2.8.2.5]; and, functions supplied by the STR simulator 258 to STC simulator 238 (these are defined when STR simulator 258 attaches as a client to STC simulator 238) [see section 2.8.2.5].

2.8.2.4 FUNCTIONS DEFINED BY STR SIMULATOR

The following functions are defined by STR simulator 258:

STR_AttachToEMRPB

This function attaches a client to the EMRPB and hands over pointers to functions that enable the STR to control its clients.

STR_ToServer

This function is used when a client wants to send data to the STR. The signal must be created with the STR_CreateEMRPBData function, and the data must be deallocated by the server.

The following three functions are help functions for creating, deleting and copying EMRP data, respectively:

STR_CreateEMRPBData
STR_DestroyEMRPBData
STR_CopyEMRPBData 2.8.2.5 FUNCTIONS SUPPLIED BY THE EMRP CLIENT The functions that are supplied by the client are defined as follows (the functions need not keep the names given below):

STR_ToClient

This is a pointer to a function to be used when sending data to the attached client. The data is deallocated by the server.

STR_ResetClient

This is a pointer to a function which is used for resetting the client.

STR_BlockCilent

This is a pointer to a function that is used for blocking/unblocking the client.

2.8.2.6 FUNCTIONS SUPPLIED TO THE STC SIMULATOR

The "STR_FromServer" function is supplied by the client and need not keep this name.

2.9 ST20C SIMULATION

The simulated access processor, known herein as the ST20C 251, has full simulation of the target processor instructions and registers. This enables loading and execution of target modules for both control system and application. The ST20C simulator 251 interacts with connected devices at a logical level.

2.9.1 MAIN INTERFACES FOR TARGET ST20C

Figure 11A:
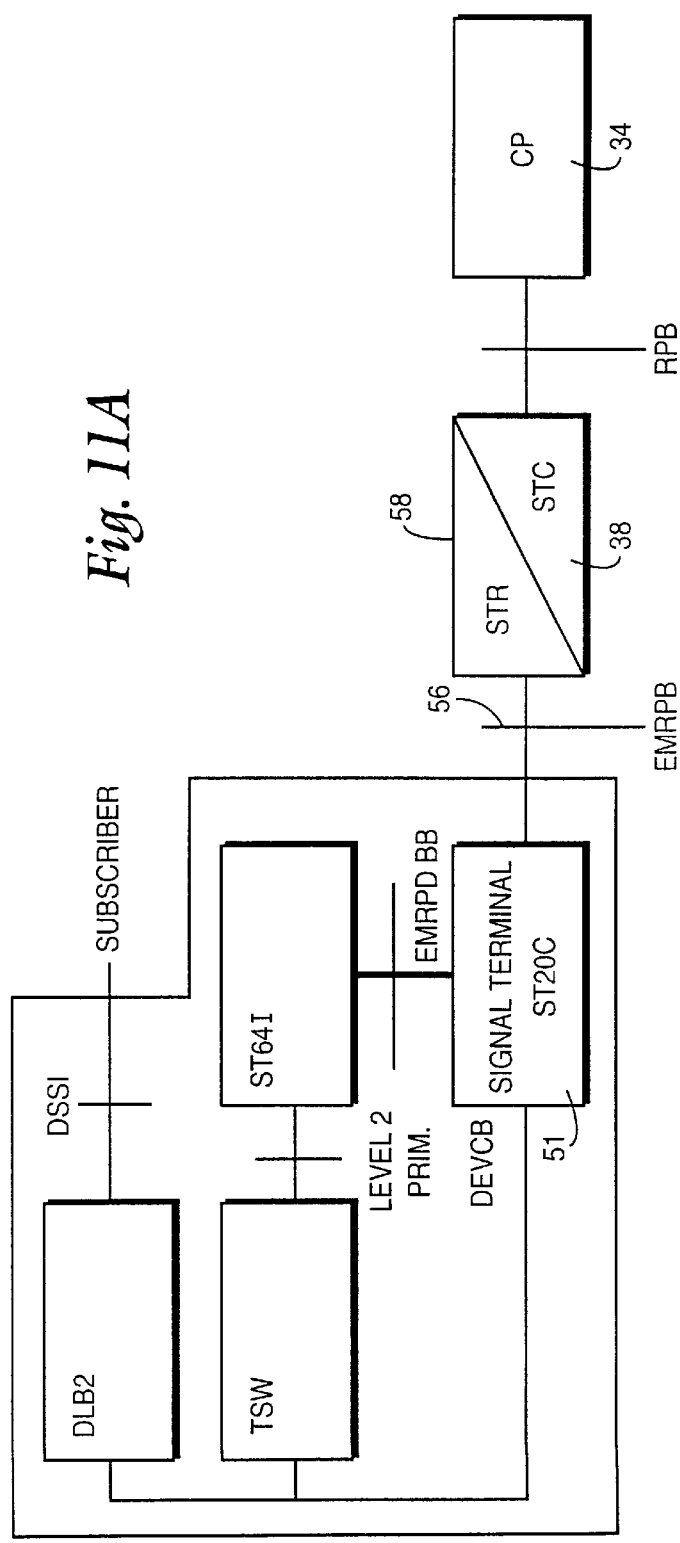
FIG. 11A is a schematic view of portions of a target system showing a signaling terminal ST20C and its interfaces and signal flow.

FIG. 11A provides a system overview focusing on ISDN control signal flow for a BRA in the target system, i.e., the AXE-10. FIG. 11A shows that there are three main interfaces of the ST20C 251. The first interface is the EMRPB 56, a bus connecting the EMRPD 50 to CP 34. The second interface is DEVCB, a device processor bus controlling attached device boards. The third interface is EMRPD BB, a local bus extension of the ST20C microcomputer. These interfaces are further detailed in the following sections.

2.9.1.1 EMRPB INTERFACE FOR TARGET ST20C

An EMRP 50 communicates with the central processor (CP) through the STR-STC signaling technical pair. The STC 38 is connected to the regional processor bus (RPB) 36 and is responsible for the conversion from regional processor signals with RP/EM addresses into EMRP signals with EMRP addresses. The STR 58 is the bus master of the EMRPB 56 which connects all EMRPs 50 to the STR 58 and hence to the CP 34. The EMRPB 56 is doubled, all EMRPs 50 are connected to both buses and there is one STR 58 for each bus.

The EMRPB 56 uses a synchronous point to multipoint bus with a bit oriented protocol. Each EMRP 50 has an unique address in the range 0 to 31 chosen with an address plug, connected to the front connector of the EMRP 50.

The STR 58 polls all EMRPs 50 cyclically by sending poll signals with the address of each EMRP 50 in sequence.

When addressed, the EMRP 50 responds with a transmission request signal, if it has something to send. After some handshaking between the master and the selected EMRP 50, the EMRP 50 can send its signal If the STR 58 wants to send a signal to an EMRP 50, it temporarily stops the polling process and sends the signal with the address of the destination EMRP 50.

The STR 58 may also send a signal to all EMRPs 50 using a special broadcast address.

An EMRP 50 can only receive and transmit on one of the bus sides at a time. Which side to use is set by the STR 58 on a higher level of the EMRP/STR protocol.

To block or reset an EMRP 50, the STR 58 issues a special signal transaction.

A maximum number of 64 bytes can be transferred in a frame over the EMRPB 56.

2.9.1.2 DEVCB INTERFACE FOR TARGET ST20C

ST20C 51 communicates with its attached device processors (DEVPS) through a bus called DEVCB. This is an asynchronous half-duplex serial bus where ST20C is the master.

On the ST20C 51, a gate array LCA-DEVCB is used to implement the master side of the DEVCB interface. This unit comprises three main parts: a scanner, a receiver and a transmitter.

Normally, the scanner is addressing all devices by asserting their addresses, one at a time. If one of the attached devices has something to send, it asserts a flag signal. This causes the bus controller to generate an interrupt. If the appropriate conditions are met, the ST20C CPU then can send a go ahead signal and wait for the signal from the slave side to be received.

When the slave has received the go ahead signal it can send its message. For each byte received by the master, an interrupt is generated causing the CPU to read the received byte. The transfer of messages is supervised by a timer, generating an interrupt if the next byte in a message arrives too late or is lost.

Sending a message from the master side to a slave is done by addressing the device and sending the message byte by byte. This process is also interrupt driven.

A device can be reset by addressing it and asserting a reset signal on the bus.

2.9.1.3 EMRPD BB INTERFACE FOR TARGET ST20C

The EMRPD BB is simply an extension of the CPU bus making it possible to issue normal memory accesses to external boards attached to this bus.

2.9.2 ST20C SIMULATION

In this section focus is narrowed down to the ST20C itself and its architectural structure is described. Also, the mapping between this architecture and the structure of the simulated system is sketched on a modular level.

2.9.2.1 ARCHITECTURAL VIEW OF THE ST20C

Figure 11B:
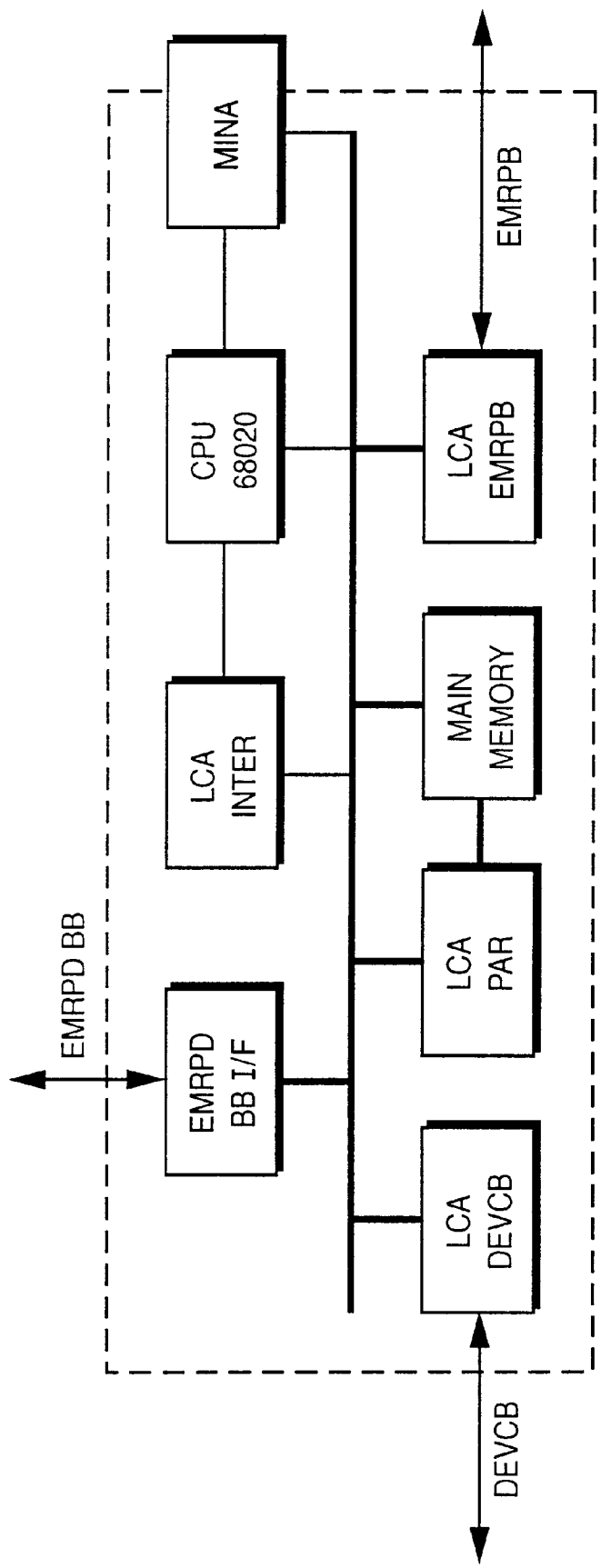
FIG. 11B is a schematic view of major components of a signaling terminal ST20C.

FIG. 11B shows major components of a signaling terminal ST20C as well as the connections of those components.

2.9.2.2 MAPPING OF THE ST20C TO ITS SIMULATION

Figure 11C:
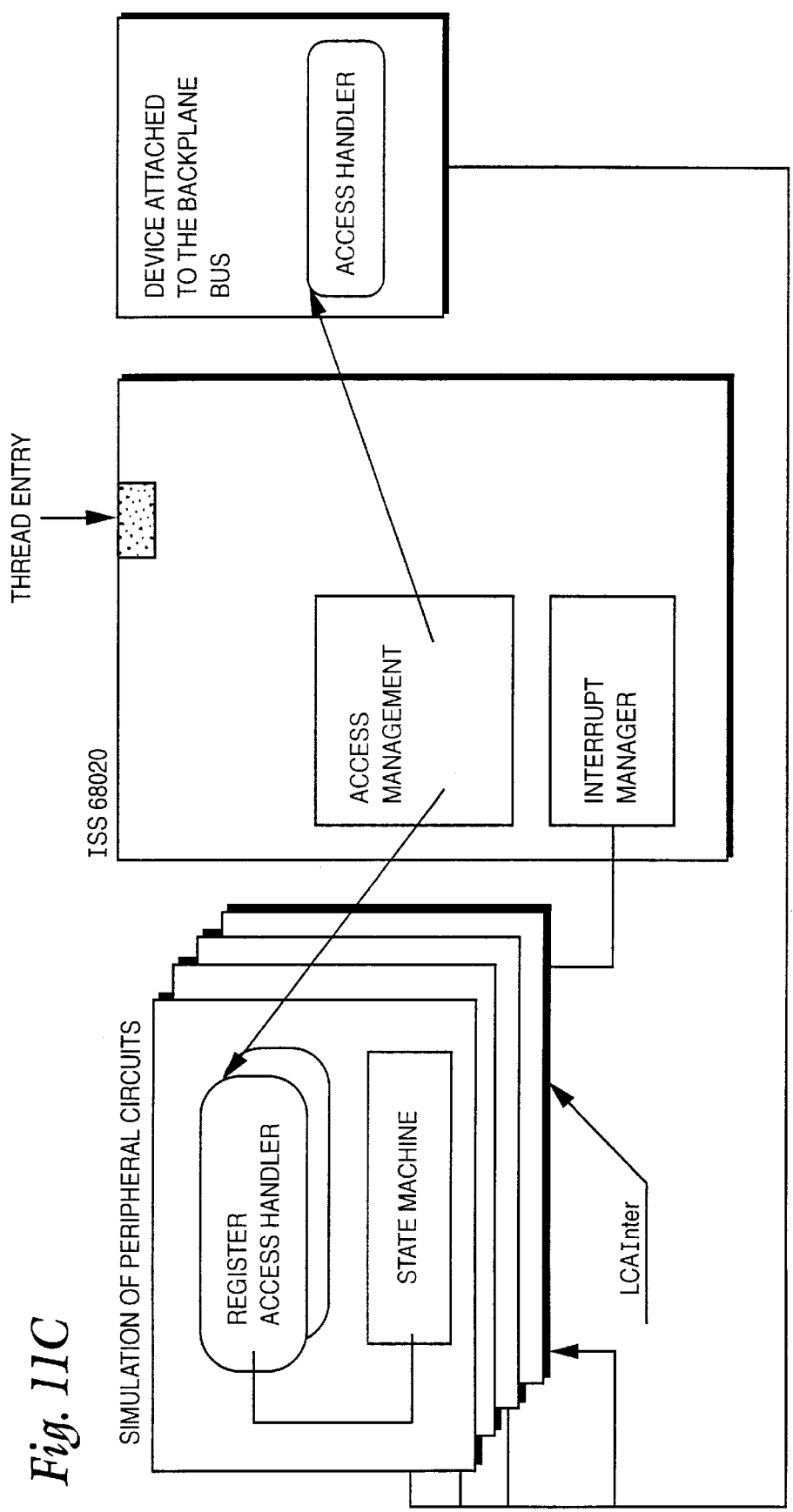
FIG. 11C is a schematic view of an ST20C simulator according to an embodiment of the invention.

The simulated ST20C 251 is organized according to FIG. 11C. The ST20C simulation mirrors the hardware architecture of FIG. 11B in most respects. However, depending on the needs of the simulator, the level of detail of the simulation may differ between the different ST20C components. This is further described in the sections that follow.

2.9.3 ISS 68020 (Instruction level simulation of ST20C microcomputer)

The ST20C is based on a Motorola 68020 microprocessor. The instruction level simulation supports a complete instruction set as well as the execution modes offered by the microprocessor, interrupt and exception handling including hardware reset.

ISS 68020 is based on a performance optimized architecture fully implementing the instruction set of the Motorola 68030 microprocessor, including full MMU simulation.

2.9.4 BASIC PRINCIPLES

An important principle of the ISS 68030 lies in its decoding and dispatching technique. This is also the key feature contributing to its speed. The same principle is used in the ISS 68020. The technique works as follows. The instruction code (in fact, the first 16 bits) is used as an index to a dispatch table containing addresses to SPARC code sequences. These code sequences mimic the behavior of the M68OxO instructions, which thus has the same effect as interpreting them. This effectively avoids all unnecessary overhead. However, when memory is accessed computation of effective addresses has to be computed by special functions. Furthermore, the code sequences are generated from descriptions of the M68OxO instructions' syntax and semantics and the emulating code is automatically collected in tables.

Figure 11D:
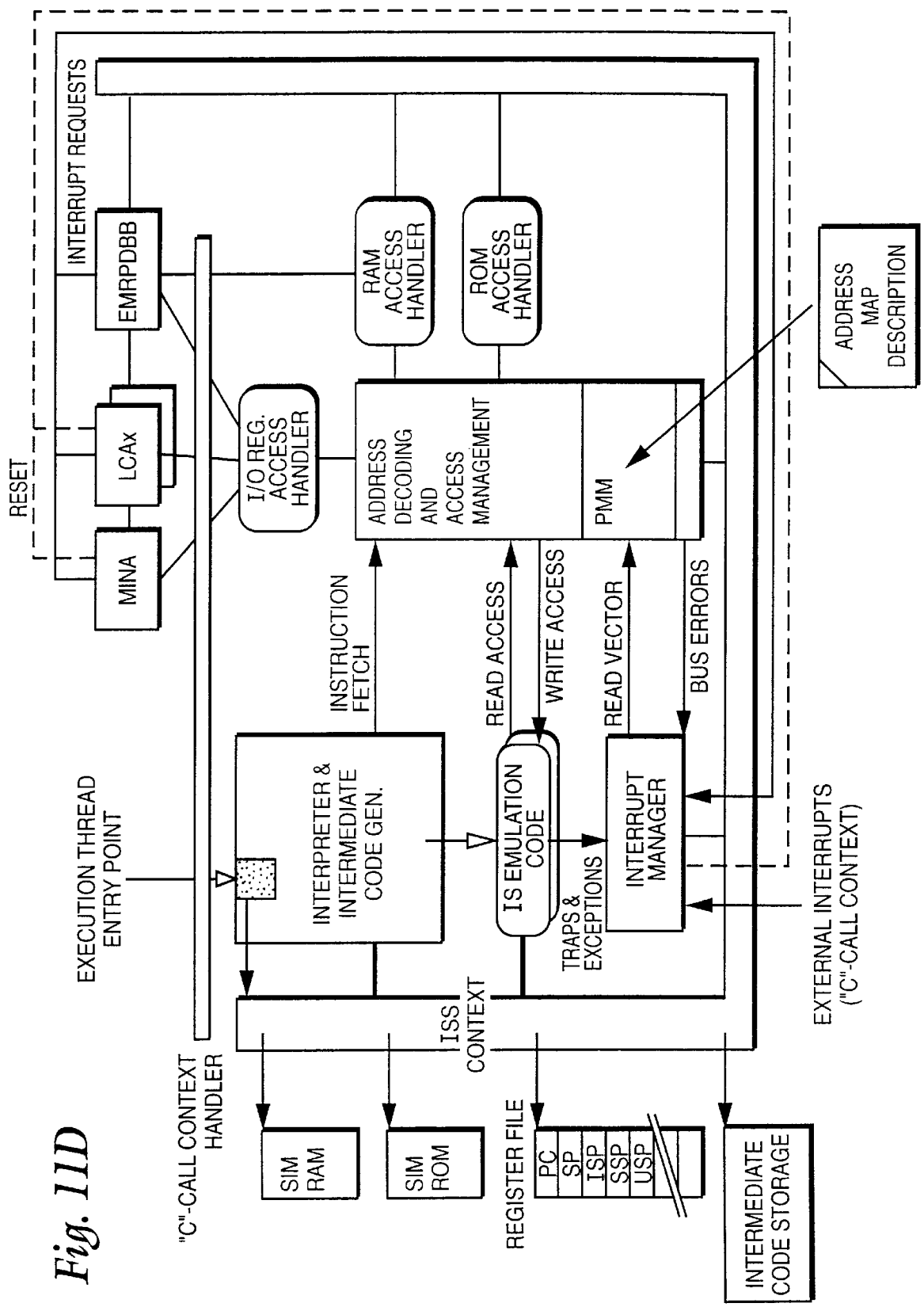
FIG. 11D is a schematic view depicting the adaption of the ISS 68030 to the needs of the ISS 68020 in the ST20C context.

FIG. 11D describes the adaption of the ISS 68030 to the needs of the TSS 68020 in the ST20C context.

2.10 LINE INTERFACE BOARD SIMULATION

2.10.1 MAIN INTERFACES

Figure 12A:
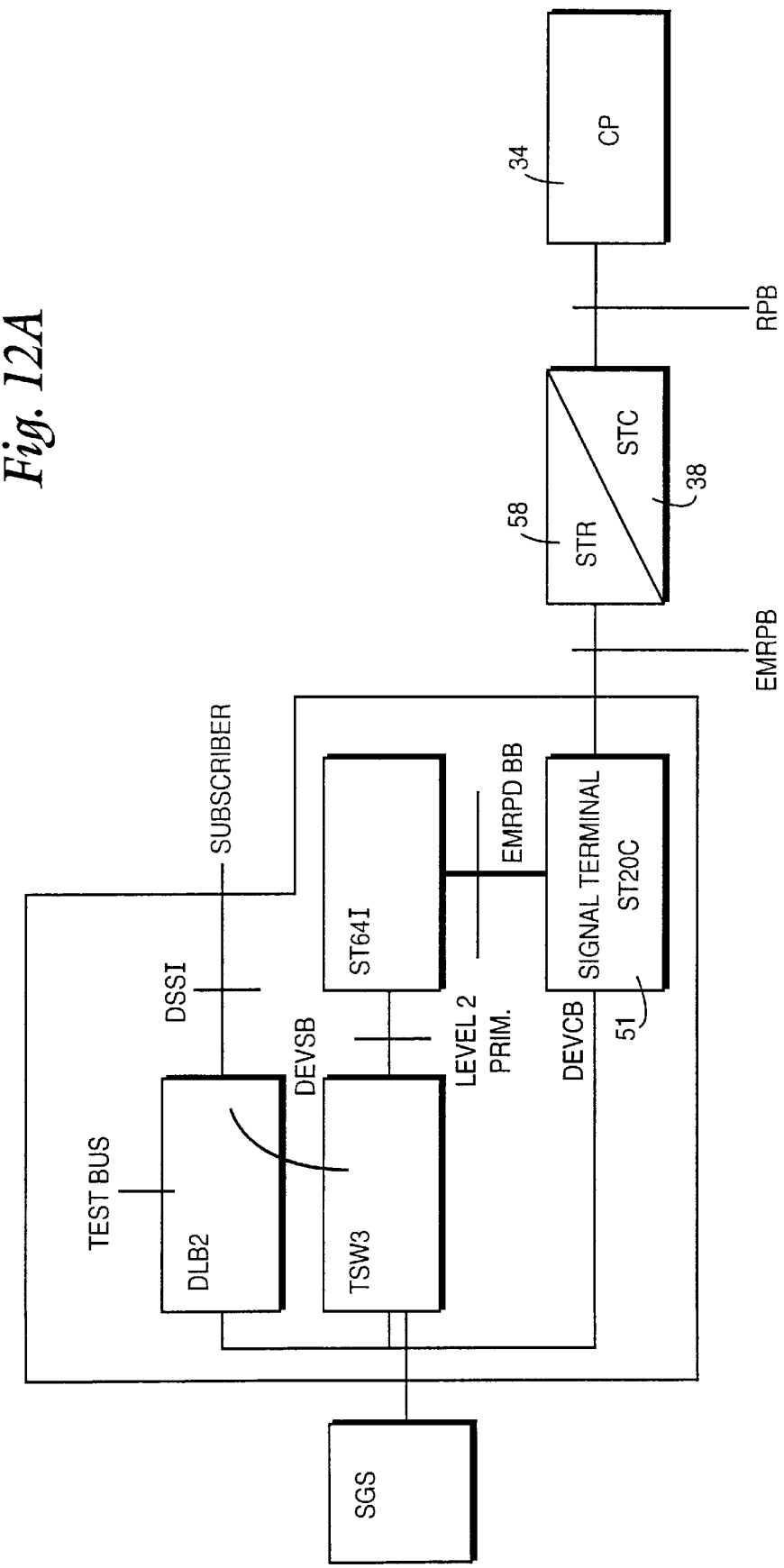
FIG. 12A is a schematic view providing an overview of ISDN control signal flow (D-channel) for a basic rate access (BRA) in the specific target system.

FIG. 12A provides an overview ISDN control signal flow (D-channel) for a BRA in the specific target system exemplified by the AXE-1. In particular, FIG. 12A shows that there are five main interfaces of the BRA device board complex. The first interface is DSS1, the subscriber line interface. The second interface is DEVSB, a bus used to transfer data between devices and the time-switch. The third interface is DEVCB, a device processor bus controlling attached device boards. The fourth interface is EMRPD BB, a local bus extension of the ST20C microcomputer. The fifth interface is known as "Test Bus", a test facility access bus. These interfaces and device boards are further detailed in the following sections.

2.10.1.1 LINE BOARD DLB2-5U (ROF1377828/1 R7B)

Line board DLB2-5U implements the subscriber line interface. Line board DLB2-5U offers four subscriber lines. Only layer 1 (physical layer) functions are realized on Line board DLB2-5U. These layer 1 functions are power feeding of NT (Network Terminal); 2B IQ conversion; multiplexing/demultiplexing at the bit level of B- and D-channel bit streams; and, a speech bus interface. A device processor controls the board and executes the various tasks ordered, via the DEVCB, by the EMRPD.

2.10.1.2 TIME SWITCH TSW3

The Time Switch implements the time switch function in the digital subscriber stage. The board includes a device processor executing primarily two software units: TSD and CDD. Signaling between the device processor and EMRPD are performed via the device control bus (DEVCB). Two separate DEVCB identities are used for TSD and CDD.

2.10.1.3 SIGNALING TERMINAL BOARD ST641

ST641 is a signaling technical board for termination of up to 64 D-channels layer 2 signaling data traffic towards the ISDN basic rate subscriber access and data delivered to or form the central processor. The ST641 is connected to the ST20C using the ST20C backplane bus, and to the Time Switch by the device speech bus (DEVSB).

2.10.1.4 DEVCB (DEVICE CONTROL BUS)

ST20C communicates with its attached device processors (DEVPS) through a bus called DEVCB. This is an asynchronous half-duplex serial bus where ST20C is the master.

2.10.1.5 EMRPD BB

The EMRPD BB is simply an extension of the CPU bus making it possible to issue normal memory accesses to external boards attached to this bus.

2.10.1.6 DEVSB (DEVICE SPEECH BUS)

The DEVSB is a PCM bus which connects the Time Switch with a number of devices that can be of any kind of hardware individual directly connected to the DEVSB.

2.10.1.7 TEST BUS

Through the operation of a test access relay on the DLB2-5U, a line can be disconnected from the subscriber and connected to a test access bus used for measurements towards the line or the board.

2.10.2 DEVICE BOARD SIMULATOR OVERVIEW

The purpose of the simulation of the BRA device boards is to offer an interface that can be utilized by the simulated traffic generator (SIGEN) 220. This interface supports and simulate a DLB2-5U line interface regarding hardware configuration, i.e. board position and which one of the four line interfaces that a board implements. This interface only supports transport of LAPD layer 2 D channel frame contents, i.e corresponding to the octet stream (without bitstuffing) between an opening flag and a closing flag, between the subscriber side and the exchange.

An incoming frame is assigned a timeslot number related to which subscriber line is used in a PCM frame allocated for the actual board position. The actual board position is defined during the configuration phase of kernel 231 of Simulation system 200.

Figure 12B:
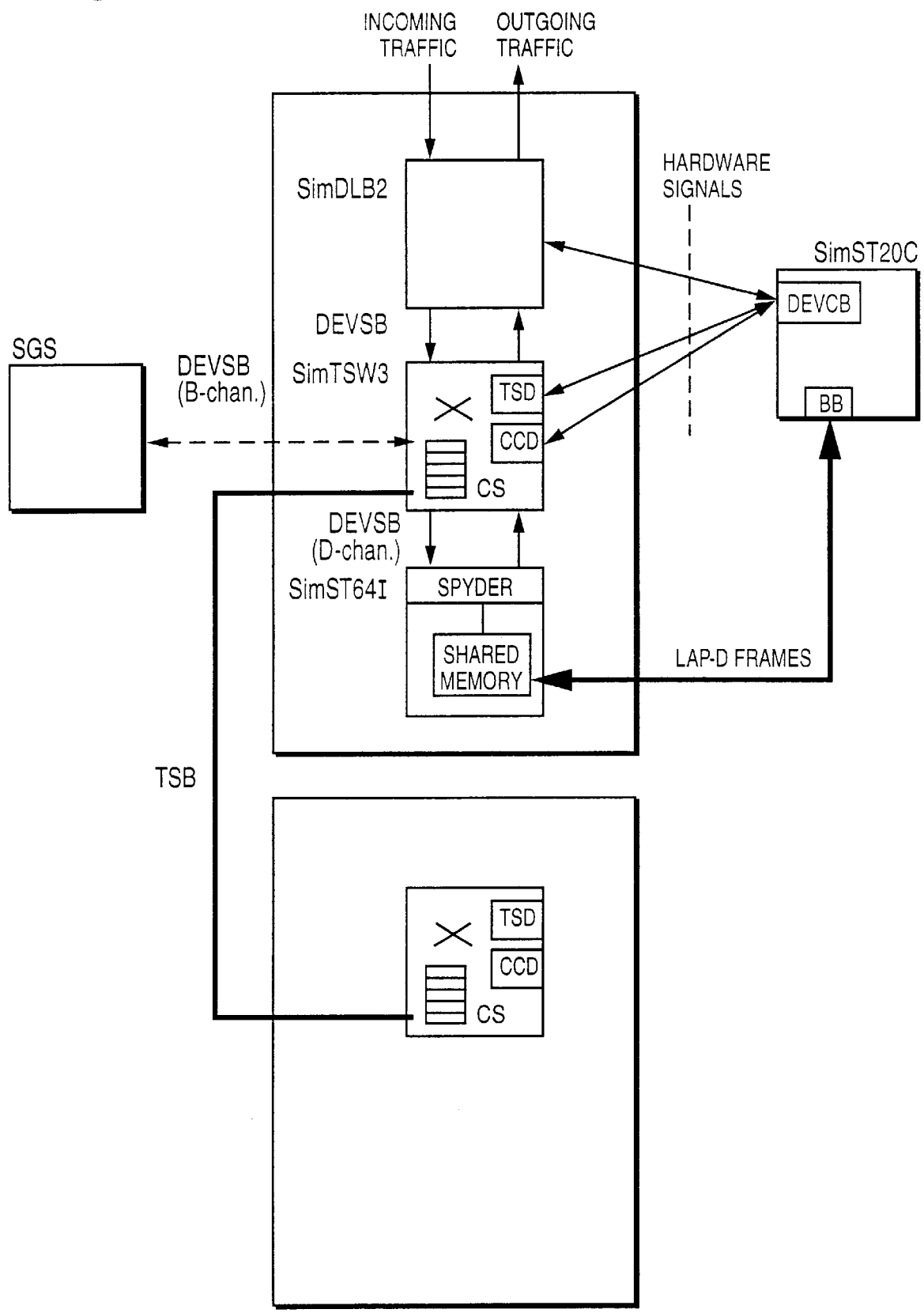
FIG. 12B is a schematic view of data flow through software implementing the DBS.
Figure 12C:
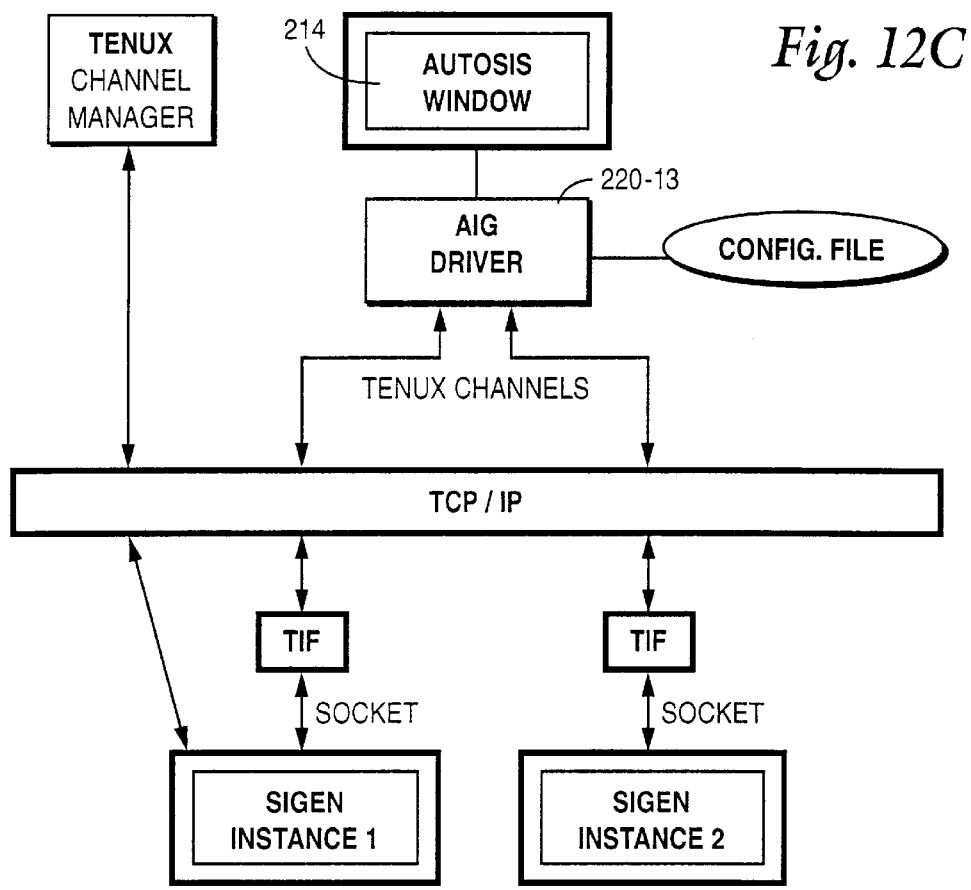
FIG. 12C is a schematic view of AUTOSIS and simulation system environment.

To support the simulation of the group switch, simulated group switch 230, a device board simulataor (DBS) provides a number of functions to resolve B-channel paths through the device board complex. FIG. 12B shows the data flow through the software implementing the DBS. The DBS does not simulate the PCM links. Paths are analyzed, based on time slot assignments, through the device board complex to be able to move a buffer holding a LAP-D frame from its source to Its correct destination.

2.11 SIGEN TRAFFIC GENERATOR

The SIGEN Traffic Generator 220 (see FIG. 4) enables automatic function tests of the ISDN basic rate access in a simulation system 200. SIGEN 220 can execute test cases (CPs or control programs) written in the IGEN Script language. SIGEN 220 provides both for local control from IGEN-like command window as well as for remote control from AUTOSIS.

Functionally, SIGEN 220 is an equivalent to the existing traffic generator for AXE system, namely IGEN. Both programs can run the same basic rate access test and their capacity is exactly the same. The only difference is the host and target environment. IGEN runs on a PC and serves for testing real AXE systems, whereas SIGEN 220 runs on SUN SPARC workstations and is used for testing AXE software executed on the Simulation system 200 AXE simulator also running on SUN workstations.

2.11.1 TRAFFIC GENERATOR OVERVIEW

In general, there are two main parts of SIGEN 220: SIGEN-FRONT (which is the communication part of SIGEN 220) and SIGEN-ENGIN (which is the execution part of SIGEN 220).

SIGEN-FRONT provides all necessary user-related functions for editing, loading, and executing ISDN functional tests. FRONT is implemented as a separate UNIX process. The user interface implemented in FRONT is similar to the one existing in IGEN. FRONT provides also an interface towards AUTOSIS 214, i.e. TENUX channel with AIG (AUTOSIS IGEN Driver). An auxiliary UNIX process, TIF, is provided for this purpose.

SIGEN-ENGIN is an integral part of kernel 231 of SlMAX96, and communicates with SIGEN-FRONT through a socket. ENGIN is the module which compiles and executes functional tests in IGEN script, and provided all elements of ISDN protocol (DSS1) that are necessary for the execution of tests. In particular it implements complete LAPD (layer 2) protocol.

It is possible to dynamically create a number of SIGEN instances in one simulation system 200, which corresponds to several PCS with running IGEN connected to one AXE installation. SIGEN instances, like all other elements of simulation system 200, are created configurated by commands entered in the common command window.

2.11.2 INTERFACES

Figure 13A:
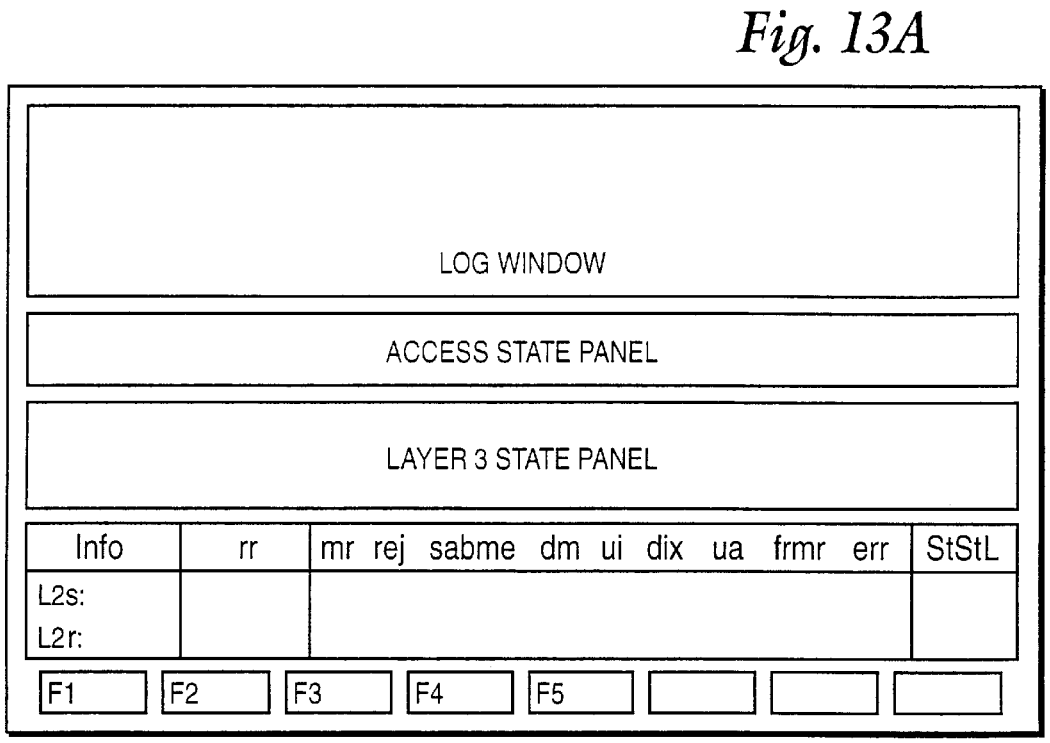
FIG. 13A is a diagrammatic view of a format of an SIGEN graphical user interface window.
Figure 13B:
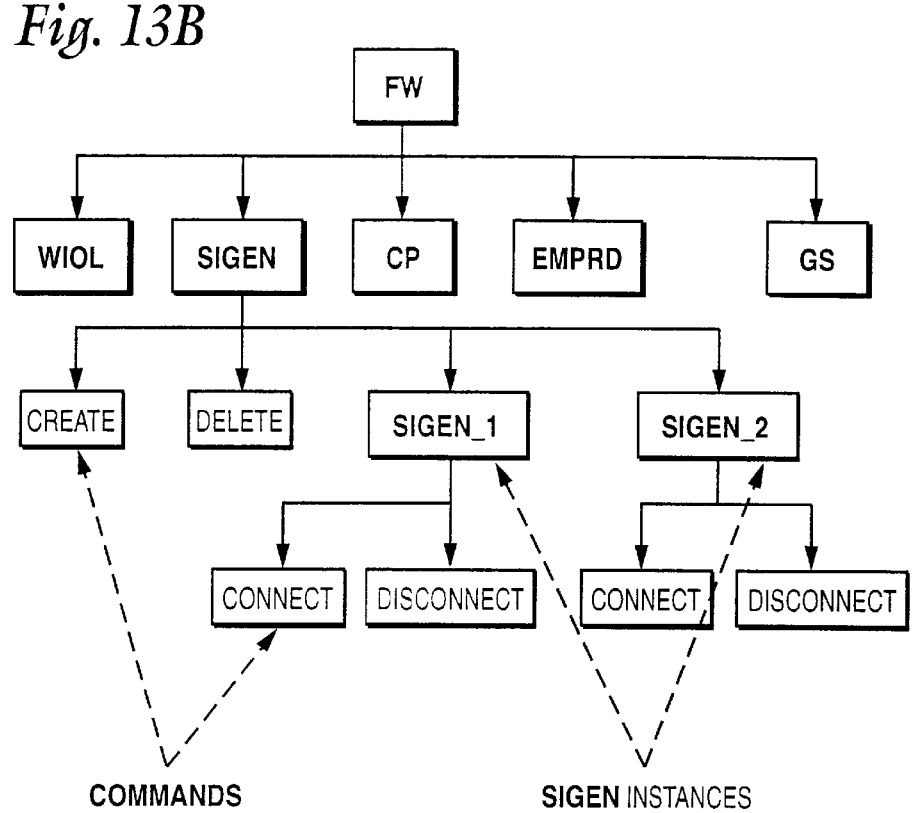
FIG. 13B is a diagrammatic view of SIGEN command hierarchy.

The graphical user interface (SIGEN GUI) of SIGEN 220 consists an X Window which includes: SIGEN main menu, users commands bar, signal and error log window, access and CIN status panel, counters monitoring panel. In order to achieve full consistency between the existing IGEN and SIGEN, the layout of the SIGEN window is very similar to the one of IGEN. The scheme of the SIGEN GUI is shown in FIG. 13A. As shown in FIG. 13A, the main menu contains commands for loading and executing scripts as well as for establishing a connection with AUTOSIS 214.

Unlike IGEN, the script editing function is left outside the SIGEN window, i.e. editing of scripts is done in a separate window. This gives the SIGEN user freedom to use any text editor available under SUN OS, e.g. emacs, vi, or textedit.

In many cases, the AUTOSIS 214 and the Simulation system 200 environment can be run on the same workstation. In such cases, the physical and data link layers of TCP/IP is not be used, which, of course, increases the overall efficiency of TIF - AIG communication.

Simulation system 200 provides a uniform command interface for configuration and management of different parts of kernel 231. The user of simulation system 200 can enter the commands in the main configuration window (MCW). The commands are arranged in a hierarchy that can be dynamically rearranged when new instances of kernel modules are created.

The SIGEN commands are divided in two parts. The first one is used for creating and deleting of SIGEN instances ("create" and "delete"), whereas the second one is used for establishing simulated hardware connections ("cables") between SIGEN ISDN accesses and the DLB2 lines ("connect" and "disconnect"). The first two commands are on the SIGEN level, whereas the latter are available under each instance of SIGEN (see section 2.11.3 for more details regarding command description).

2.11.3 COMMANDS

The SIGEN commands are divided in two basic sets. The first set is used for creating and deleting of SIGEN instances ("create" and "delete"), whereas the second set is used for establishing simulated connections between ISDN accesses and the DLB2 lines ("connect" and "disconnect"). The first two commands are on the SIGEN level, whereas the latter are available under each instance of SIGEN.

The use of SIGEN commands is now described. The creation of new SIGEN instance is done as follows:

```
FW.SIGEN>create SIGEN_name
```

Likewise, the removal of a SIGEN instance is as follows:

```
FW.SIGEN>delete SIGEN_name
```

In order to access the commands on the SIGEN instance level, the name of the instance must be entered by the user. The command prompt will then change indicating the current instance:

FW.SIGEN>SIGEN_name

FW.SIGEN.SIGEN_name>

To establish a simulated link between an SIGEN access and a DLB2 line the user has to enter the "connect" command with the name of a DLB2 board, the line number, and the access number:

FW.SIGEN.SIGEN_name>connect DLB2_name line access

To remove a simulated link between an SIGEN access and a DLB2 line the user has to enter the "disconnect" command with the access number:

FW.SIGEN.SIGEN_name>disconnect access

It is also possible to remove all established links of an SIGEN instance by using the "disconnect" command with the AILL parameter:

FW.SIGEN.SIGEN name>disconnect ALL

According to the common Simulation system 200 kernel rules, the SIGEN provides also the "show" command that prints the information about the SIGEN instance:

FW.SIGEN.SIGEN_name>show

FW.SIGEN.SIGEN name> . . . SIGEN info printout

In Table 1, a sample command session including creation, configuration, and removal of an SIGEN instance called "TUBORG" is given. The "up" and "top" are standard commands available at any level in the command hierarchy.

TABLE 1

SAMPLE COMMAND SESSION

```
FW > . . .
FW>SIGEN
FW.SIGEN >
FW.SIGEN > create TUBORG
FW.SIGEN > TUBORG
FW.SIGEN.TUBORG >
FW.SIGEN.TUBORG > connect DLB2-ONE 1 0
FW.SIGEN.TUBORG > connect DLB2-ONE 2 1
FW.SIGEN.TUBORG > connect DLB2-TWO 0 2
FW.SIGEN.TUBORG > show
FW.SIGEN.TUBORG > . . . TUBORG info printout
FW.SIGEN.TUBORG > up
FW.SIGEN > . . .
FW.SIGEN > . . .
FW.SIGEN > TUBORG
FW.SIGEN.TUBORG >
FW.SIGEN.TUBORG > disconnect 0
FW.SIGEN.TUBORG > disconnect 1
FW.SIGEN.TUBORG > disconnect 2
FW.SIGEN.TUBORG > up
FW.SIGEN > . . .
FW.SIGEN > delete TUBORG
FW.SIGEN > top
FW > . . .
```

2.11.3.1 PRINTOUTS

In order to provide for a full compatibility with the existing IGEN, the contents and the formats of all printouts generated by IGEN will be preserved. The SIGEN printouts will be sent either to the SIGEN window (direct mode) or to the AUTOSIS window (remote mode)

Messages related to internal errors and system configuration errors will be printed through the Report Manager in the Main Control Window.

2.11.3.2 DATA AND OPERATIONS

Figure 13C:
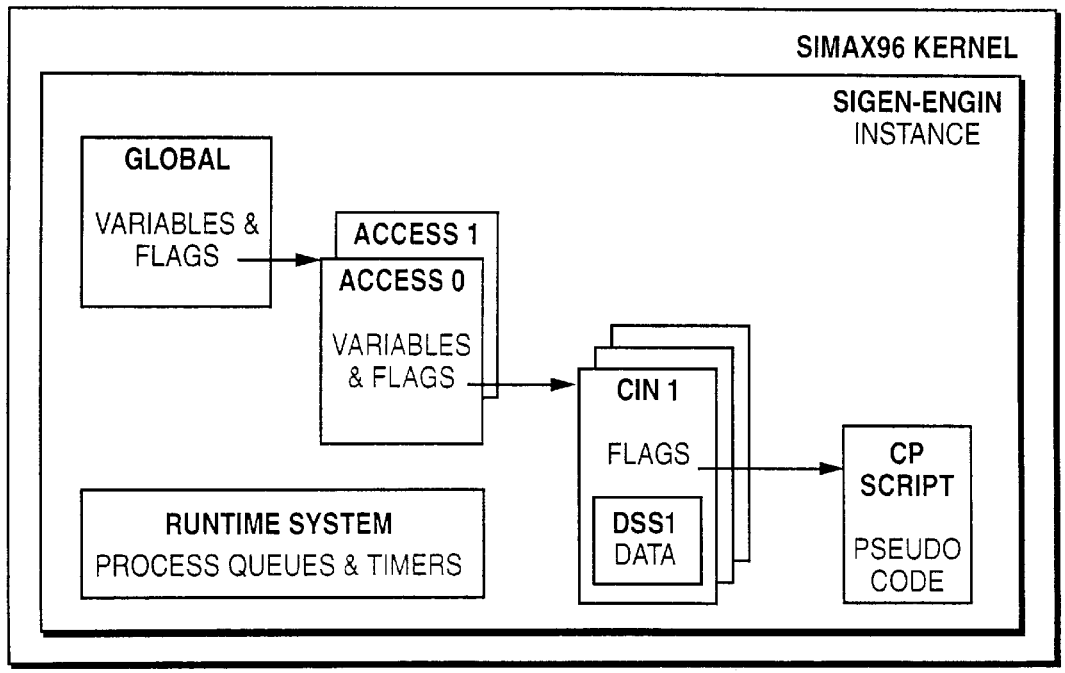
FIG. 13C is a diagrammatic view of SIGEN data structures.

An overview of the SIGEN data structures is provided in FIG. 13C.

3.0 FUNCTIONAL DESCRIPTION 3.1 GENERAL DESCRIPTION

As described above, simulation system 200 executes on a host computer system for simulating a target telecommunications system. The simulation system includes simulation kernel 231 which contains a plurality of simulation subsystems, each of the simulation subsystems corresponding to subsystems of the target telecommunications system.

3.2 TARGET MACHINE

As mentioned previously, the example of the target system described herein is the AXE APZ 212 20.

3.2.1 INSTRUCTION SET

All instructions of the target system (e.g., instructions of the APZ 212) are simulated. This constitutes the following instruction groups: Instructions for reading from store; Instructions for writing in store; Register instructions; Arithmetic instructions; Shift and logical instructions; Jump instructions; Signal transmission instructions; Instructions for concluding a program; search instructions; Forlopp instructions; OS instructions for reading from store; OS instructions writing in store; OS instructions for field transport; OS instructions for register handling; OS instructions for signal sending; OS instructions for special CPS purposes; OS instructions for special MAS purposes; and, other OS instructions.

3.2.2 REGISTERS

The APZ 212 20 processor contains four sets of 192 32-bit registers in Register Memory (RM), one set for each of priority levels TRL, THL, CL, and DL. Only 64 of the registers on each level can be addressed directly by normal software. The remaining 128 registers can only be manipulated by the microprogram or by special operating system instructions. An additional 224 registers that are shared across the four priority levels exist.

The 64 32-bit registers are as follows: 1 Index Register (IR); 2 Pointer Registers (PR0, PR1) 1 Comparison Register (CR); 2 Sign Translation Registers (SR0, SR1); 24 Signal Data Registers (DR0–DR23); 4 Arithmetic Registers (AR0–AR3); 30 Working Registers (WR 0–WR29). Many of the registers that are not directly accessible in software can be accessed using the OS instructions XMOV or XRRM/XWRM.

One of the microprogram-reserved registers which can be accessed directly from ASA using the XMOV OS instruction, but is normally just tested when branching (using e.g. JOR or JZR) is the Result Indicator Register (RIR). It is a simple flag register that functions as carry flag after completion of an arithmetic instruction, zero flag after completion of a logical instruction, and "precision lost" flag after completion of a shift instruction.

3.2.3. SIGNALS

Changing the execution flow can be done in one of two ways: Local jumps and Signals. Local jumps can only be made within the same program block. Local jumps also allow 'call subroutine' functionality using the Jump Local Link instruction. These types of jumps are well known from other CPUs such as the SPARC.

The APZ 212 instruction set does not include jump-indirect, but contains jump-on-table-indexed-by-register/store constructs for C-style switch functionality.

Jumping to another program block can not be done using jumps, but must be made using signals. (Signals can also be used to make local jumps if the block number is the same as the current block number.) Signals are similar to jumps, but instead of specifying a new offset into the same block, a signal is specified. Only a fixed number of signals can be sent from a program block and must be listed in the Signal Sending Table located in front of the program block. Depending on the type of the signal instruction, one of the following things may happen:

The signal is sent immediately: program execution continues at the destination right away. The signal may be sent linked to allow execution to return to the instruction after the signal-sending instruction.

The signal may be entered in a job buffer for later sending.

To be able to find the destination of a signal, signals are looked up in a Global Signal Distribution Table. When a signal is being sent, it is eventually converted to a block number and an offset of the entry point for the signal in the receiving block.

3.2.3.1 GLOBAL SIGNAL DISTRIBUTION TABLES

When a program block is loaded into the program store 87, the Signal Distribution Table and the Signal Sending Table are merged into the Global Signal Distribution Tables. Each signal is also assigned a Global Signal Number (GSN).

If the signal can only be received by a single block, it is entered into the Global Signal Table for Unique signals (GSDT-U). If the signal can be received by several blocks, it is entered in the Global Signal Table for Multiple signals (GSDT-M). This table has an array listing the blocks that are able to receive the signal. When a signal is sent, the destination address is searched for in this array. The Global Signal Distribution Tables are part of the IPU (Instructions Processing Unit) 80.

3.2.4 JOB BUFFERS

Job buffers are used to store signals that have been sent but not yet received by a block. This happens if the instruction which sent the signal has ordered it to be delayed for a specific period of time, or if the signal was put in a specific job buffer. The job buffers are scanned periodically, every time a CP-CP or RP-CP signal is received, and when the program execution ends. Signals that are due to be sent to their destination are then removed from the Job buffer and sent. The APZ 212 20 CP contains 9 job buffers, DL, CL, THL3, THL2, THL I, TRL3, TRL2, TRL 1, and MAL, in increasing priority order. These job buffers are scanned in sequence. If a high priority job buffer contains unsent signals, these are sent before the lower priority job buffers are scanned. The Job Buffers are part of the Signal Processing Unit (SPU) 84.

3.2.5 STORES

As previously mentioned in connection with FIG. 2, the following three stores make up the main memory: Reference Store (RS) 88; Program Store (PS) 87; and, Data Store (DS) 89. On the APZ 212 20 DS and RS both reside in the Data Reference Store (DRS). The Reference Store contains pointers to the program start address in the current program block and pointers to variables (base addresses). These pointers enable the CP 34 to find destination addresses. All references from the program blocks to jump destinations and variables are relative addresses. The CP 34 uses the Reference Store 88 to find the actual address in the Main Store. This makes it virtually impossible to access data/code that does not belong to the program block. The only way of interchanging information with other program blocks is by means of signals.

3.2.6 PRIORITY LEVELS

The central processor 34 executes a single program at a time, but is able to switch 'context' when it receives an interrupt. Switching can be done between five different priority levels:

1. MFL (Malfunction level)—the highest level
2. TRL (Trace level), encompassing TRL I, TRL2, and TRL3
3. THL (Traffic handling level), encompassing THLI, THL2, and THL3
4. CL (C level)
5. DL (D level)—the lowest level A job can only be interrupted by a higher priority signal. Programs are normally executed at THL and CL. APZ measurements take place at the TRL. Hardware error situations are handled at MFL. DL is for special very low priority processes. MFL does not have its own set of registers.

3.2.7 ENDIANNESS

The APZ 212 architecture is big-endian, unlike the SPARC which is little-endiad. Due to the nature of the APZ instruction addressing modes, it is not presently expected that this will cause any significant performance penalty although the Program Store 87 will have to be implemented as little-endian (with regards to 16-bit addressing).

3.3 HOST MACHINE

As mentioned previously, the host machine is a Sun SPARC workstation. See *The SPARC Architecture Manual*, SPARC International, Version 8, Addison-Wesley (1992), for a description of this architecture, and the supplied instruction set. All SPARC instructions are 32 bit, except for the (synthetic) instruction set, which may be 32 or 64 bits.

3.4 EXECUTION MODEL

Figure 3A:
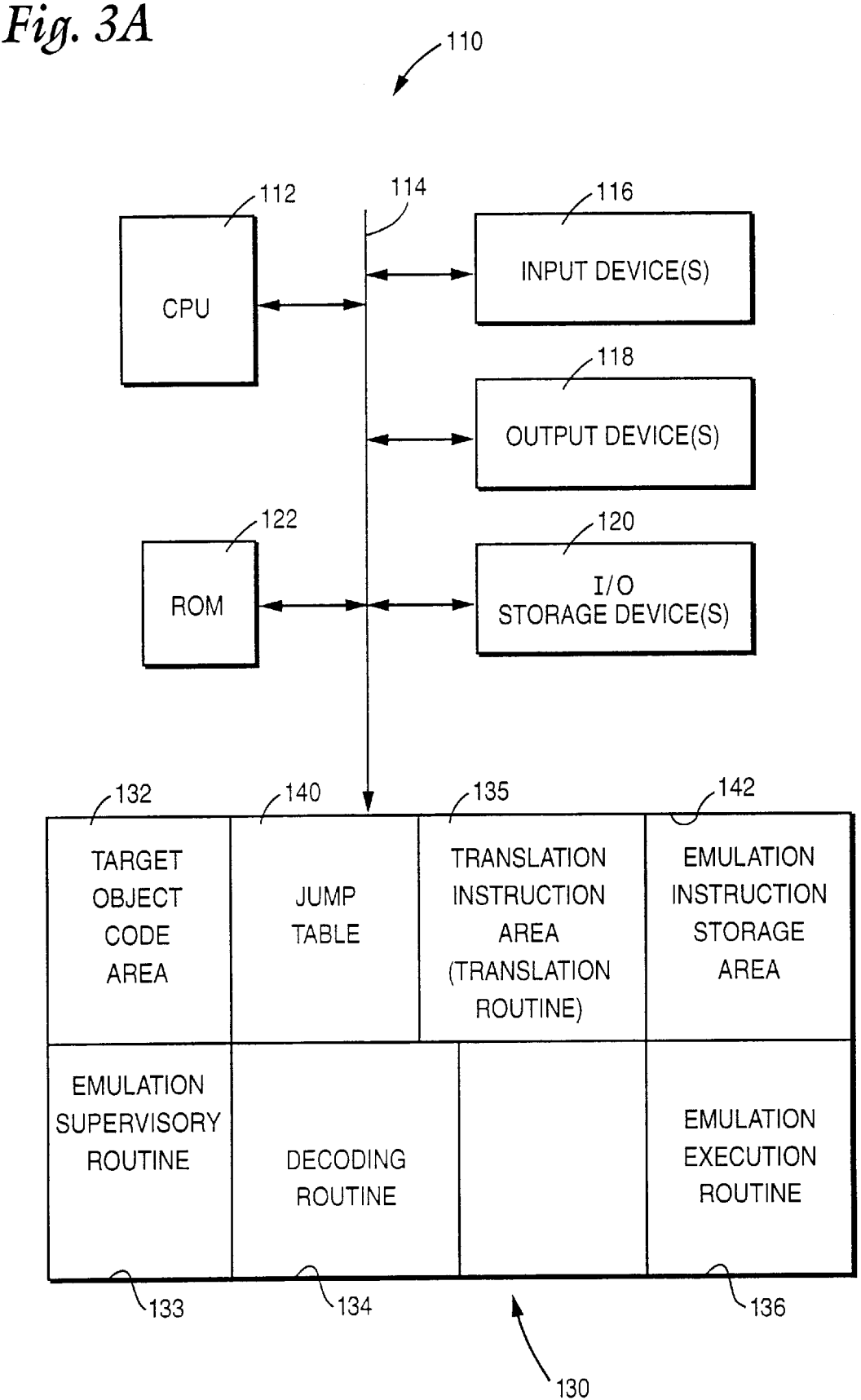
FIG. 3A is a schematic view of an embodiment of a host system according to the present invention, which embodiment has a jump table which accommodates nonuniform length target instructions.

As schematically depicted in FIG. 3A, RAM 130 of host machine 110 includes a number of routines and area (e.g., sections or tables). For example, target object code area 132, also known as the target instruction memory, is used to store programmed instructions coded for the target processor The target instructions stored in target object code area 132 of RAM 130 are typically obtained from an external storage media (e.g., via I/O storage device 120) and transferred as necessary, e.g., cached, into RAM 130. By "coded for the unillustrated target processor" is meant that the target instructions are formatted in accordance with the instruction set of the target processor, e.g., the target instructions are written as assembly level instructions using the instruction set of the target processor. The target instructions stored in target object code area 132 are intended to cause the target processor to perform specified activities and/or obtain specified results. However, as hereinafter described, the target instructions stored in target object code area 132 are instead translated by host computer 110 into instructions which host computer 110 can understand for attempting to accomplish the same specified activities and/or obtain specified results.

Also included in RAM 130 are various programmed routines executed by host processor 112, including an emulation/simulation supervisory routine (ESR) 133; decoding routine 134; translation routine 135; and, emulation execution routine 136. In addition, RAM 130 has stored therein a jump table 140 and an emulation instruction storage area 142.

Figure 14:
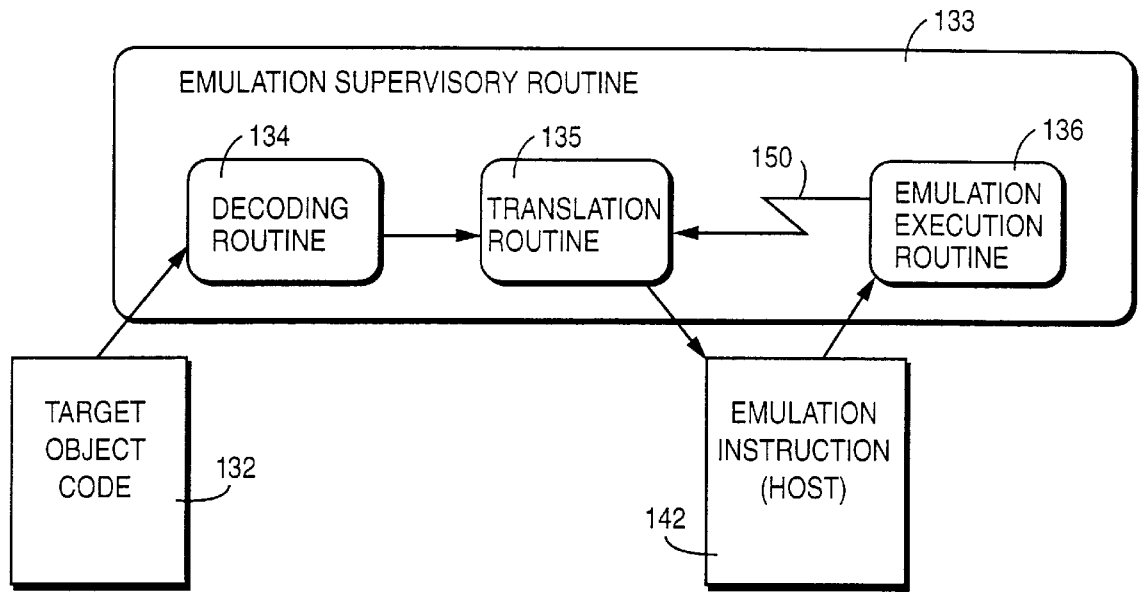
FIG. 14 is a diagrammatic view showing pipelined coordination by a emulation supervisory routine of translation of target object code to emulated instructions and of execution of the emulated instructions.

FIG. 14 shows how emulation supervisory routine coordinates pipelined performance of translation of target object code to emulated instructions and execution by the host of the emulated instructions. In brief, when emulation supervisory routine 133 determines that it is time to fetch target instructions from target object code area 132, the fetched target instructions are analyzed by decoding routine 134. Decoding routine 134, knowing the structure of the target instruction set, picks apart a fetched target instruction and determines its type, e.g., whether the fetched instruction is an "add register" instruction for adding the contents of two registers, a "move" instruction for moving the contents of one register into another register or address, etc. The analysis of the fetched target instruction is premised upon understanding by decoding routine 134 of the predefined operation codes and fields of the target instruction sets. With the benefit of the analysis performed by decoding routine 134, translation routine 135 builds a set of emulation instructions for storage in emulation instruction area 142. The emulation instructions stored in area 142 are formatted in the instruction set of host processor 112. The emulation instructions generated for the fetched target instruction are configured to cause host processor 112 to perform the same actions as would the target processor upon executing the fetched target instruction. Emulation execution routine 136 obtains the emulation instructions from area 142 for execution by host processor 112. When emulation execution routine 136 determines that more emulation instructions are necessary for filling in emulation instruction storage area 142, an interrupt is generated to translation routine 135 as shown by line 150 in FIG. 14. In response to the interrupt, more target instructions are fetched, decoded, and translated for supply to emulation instruction storage area 142.

Thus, target processor instructions are translated into host instructions dynamically. The translation is done for sequences of target instructions. These sequences of target instructions are stored in code buffer memory 142. The translation is done "on the fly".

Host instructions are stored and reused for later execution. When the execution returns back to a given point the instructions are already translated. This means that the host code is executed in a straight flow and no reduction of execution speed for cache flush and pipe breaks in the host system. The execution flow is straightened out in the translation process.

An important aspect of the present invention is the translation of fetched target object code into emulation instructions which are executable by host processor 112. To this end, more detailed discussion is provided below pertaining to modes of the translation, including configurations and usages of jump table 140.

A jump table has pointer entries employed to locate, in a translation instruction memory, sets of translating instructions for generating emulation instructions executable by the host for each of the differing types of target instructions.

In one embodiment, described in more detail in section 3.4.1, each of pointer entries in the jump table has an entry length which is no greater than the shortest target instruction length, thereby enabling the jump table to handle target instructions of non-uniform instruction length.

For another embodiment in which the target instructions comprise blocks of target instructions, including signal-handling target instructions, the jump table is augmented by a jump table shadow memory. The jump table shadow memory has a plurality of jump table shadow tables, each jump table shadow table being paired with one of the plurality of blocks having a signal-handing target instruction. Each jump table shadow table has a copy of a jump table entry associated with the signal handling target instruction included the block with which the jump table entry table is paired. When compiling a designated block of target instructions, the host processor compiles a portion of the jump table which corresponds to the designated block and the jump table shadow table for any other block invoked by a signal generated by the designated block. This embodiment is described in section 3.4.3.

In another embodiment, described in more detail in section 3.4.4, the jump table memory is partitioned into segments corresponding to the blocks stored in the target instruction memory. Selected ones of the segments of the jump table memory are uncompacted in accordance with a recent utilization criteria and non-selected ones of the segments are compacted.

3.4.1 JUMP TABLE WITH VARIABLE WIDTH INSTRUCTIONS

Figure 15:
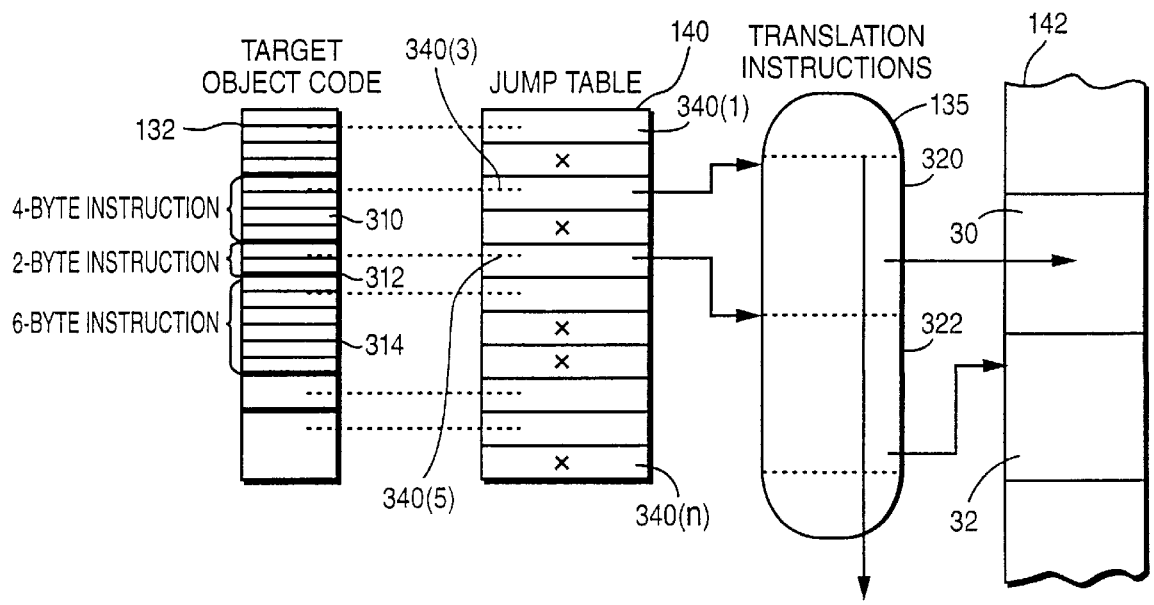
FIG. 15 is a diagrammatic view showing an interrelationship, according to one mode of the invention, between a target object code area, a jump table, and translation instruction area in which a translation routine resides.

FIG. 15 shows an interrelationship, according to one mode of the invention, between target object code area 132, jump table 140; and translation instruction area 135 in which the translation routine resides. As indicated in FIG. 15, the target instructions stored in target object code area 132 having differing instruction lengths. For example, target instruction 310 is a four byte instruction, target instruction 312 is a two byte instruction, and target instruction 314 is a four byte instruction. Thus, in the illustrated embodiment, the shortest target instruction length is two bytes.

Each target instruction stored in target object code area 132 must be translated into instructions, known as emulation instructions, which are executable by host processor 112 so that host processor 112 will perform the same action as would the target processor upon execution of the target instruction. To this end, translation routine 135 includes, for each type of target instruction, a set of translating instructions for generating emulation instructions. For example, translation routine 135 includes a set 320 of translation instructions which are suitable for building a set 330 of emulation instructions in accordance with the target instruction type to which target instruction 310 belongs. As another example, translation routine 135 includes a set 322 of translation instructions which are suitable for building a set 332 of emulation instructions in accordance with the target instruction type to which target instruction 312 belongs.

In the course of instruction translation it is necessary to locate, in translation instruction area 135, the particular set (e.g., set 320 or 322) of translation instructions suitable for building the emulation instructions for storage in emulation instruction storage area 142. To this end jump table 140 is employed. As shown in FIG. 15, jump table 140 has a plurality of slots or entries 340(1) through 340(n). Each entry 340 in jump table 140 has a length SL which is no greater than the shortest target instruction length, i.e., two bytes in the illustrated embodiment.

Upon fetching and decoding by decoding routine 134, each target instruction in target object code area 132 is assigned a pointer to the set of translation instructions in area 135 which can be utilized to build a corresponding set of emulation instructions. For example, entry 340(3) contains a pointer for target instruction 310, the pointer of entry 340(3) referencing the address of set 320 of translation instructions in area 135. Similarly entry 340(5) contains a pointer for target instruction 312, the pointer of entry 340(5) referencing the address of set 332 of translation instructions in area 135. Each pointer is stored in a unique location in jump table 140. In fact, jump table 140 and target object code area 132 are so configured and addressed that the address of the target instruction in the target object code area 132 can be used to obtain the address of the corresponding pointer in jump table 140. In particular, the byte address following the target instruction in the target object code area 132, when divided by the standard length SL of the entries in jump table 140, yields the entry number of the corresponding pointer in jump table 140. For example, in the illustrated embodiment, the pointer for target instruction 312 (which ends at address 10 of area 132), is stored at entry 10/SL=10/2=5 of jump table 140.

Thus, the structure of jump table 140 of the embodiment of FIG. 15 facilitates utilization of target instructions of variable, i.e., non-uniform length, and yet maintains an efficient indexing scheme for locating pointer entries in jump table 140 for the target instructions. Such is accomplished by providing jump table 140 with a granularity which is the same as the length of the shortest target instruction. However, each entry in jump table 140 still needs to be sufficiently long so that it can contain the address of the set of translation instructions in area 135 to which it points. Thus, jump table 140 must be twice as large as the target program whose target instructions are stored in target object code area 132. For some applications, the size of jump table 140 would then become unacceptably large, inviting one or more mechanisms as described below for reducing the size of jump table 140.

3.4.2 HYBRID EXECUTION MODEL

Figure 19A:
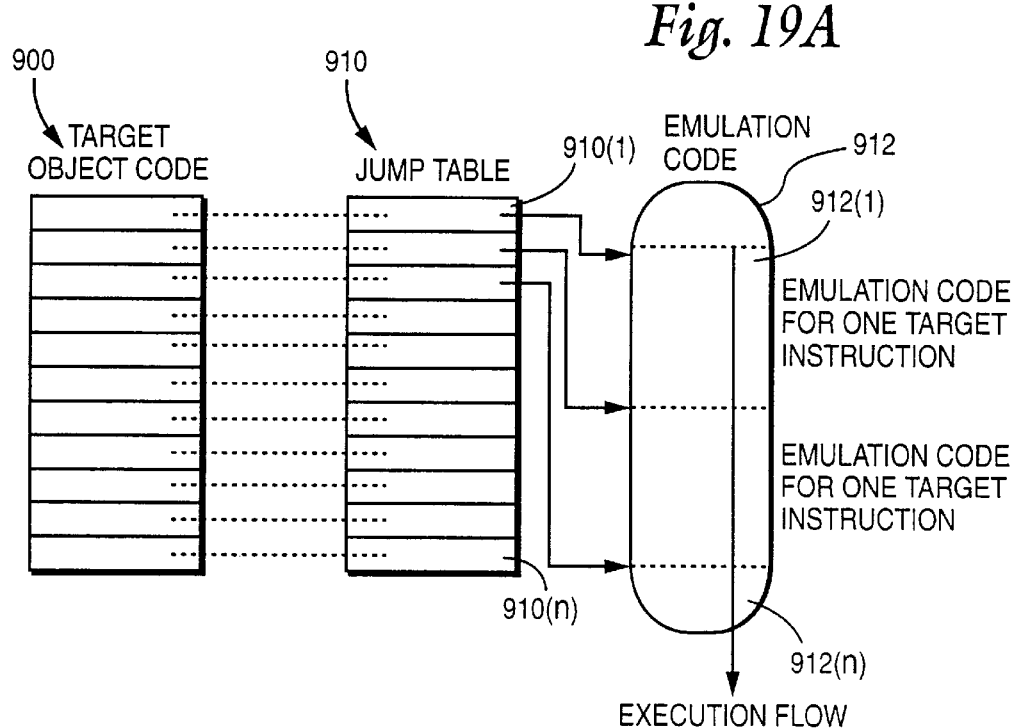
FIG. 19a is a diagrammatic view showing an interrelationships, according to one mode of the invention, between a target code module, a jump table and an emulation code area.

FIG. 19*a* illustrates the hybrid model aspects of one embodiment of the invention. The model of FIG. 19*a* merges the advantages of a common execution thread model with the advantages of an in-line model. Specifically, the hybrid model achieves the fast calculation of jump destinations and the efficient handling of program counter calculation from target to host code that are provided by pure thread models. The hybrid model also achieves the speed advantage provided by a pure in-line model.

The hybrid system of FIG. 19*a* achieves these advantages with the target code module 900 interacting with the emulation code area 912 via the jump table 910 having associated jump table pointers 910(1) through 910(n). The target processor instructions are translated into the emulation code dynamically, "on the fly." But the translation is done for blocks of target instructions which will be consecutively executable without any jumps. In this way, the host computer can execute code in a straight flow without undue pipeline breaks.

The emulation code 912 is then executed consecutively, in-line, as shown in FIG. 19*a*. This means that the emulation code can be executed without the usual linkage instructions between the blocks of emulation code 912(1) through 912(n). This ensures that the host computer can execute the emulation code quickly, without breaking the pipeline of executable emulation instructions, except for situations such as address translations, interrupts or breakpoints.

Figure 19B:
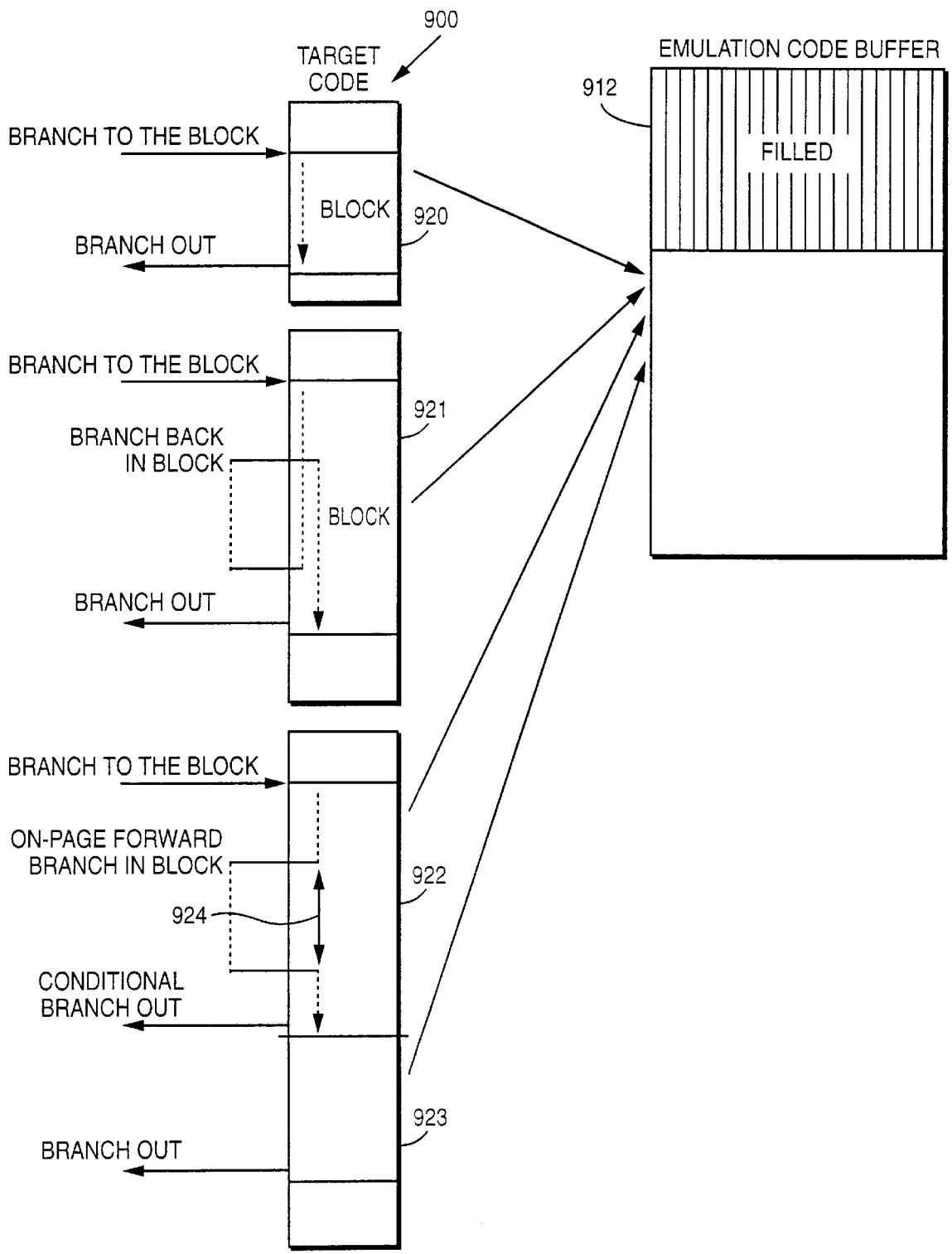
FIG. 19b is a diagrammatic view showing the organization of in-line emulation code.

As illustrated in FIG. 19*b*, consecutive host code emulation blocks are collapsed into in-lined blocks to save linkage instructions. In the example embodiment of FIG. 19*b*, the boundaries for each compilation block can be determined by examining the flow-control instructions. Incremental compilation is started when execution reaches a non-compiled target instruction, which typically happens when branching. The block is compiled until a branch is reached and is stopped at a branch inside the block. This generation results in an emulation code block that starts and stops at branch destinations.

The example rules for compiling the block selections in FIG. 19*b* are:

1. The first instruction at a branch destination starts a block, unless the instruction is already compiled.
2. The block continues until the first branch instruction is reached, except for the following cases:
   2.1 If the branch is backwards into the current block, the block is not stopped and compilation continues.
   2.2 A local (e.g., less than the page size) forward branch does not stop the block unless there is another branch between the forward branch and the destination of the forward branch that does not apply to rule 2.1 and 2.2
3. The first instruction after a conditional branch also starts a block.

These rules can be simplified to the following without loss of efficiency in practice:

1. The first instruction at a branch destination starts a block, unless the instruction is already compiled.
2. The block continues until the first non-conditional branch instruction.

In FIG. 19*b*, for example, the first instruction at the branch starts executable block 920 and the first non-conditional branch instruction ends it. Based on these two branches, block 920 is defined and stored in emulation code buffer 912. The next block 921 begins at the first branch and continues to the indicated "branch out." Note, in block 921 the intermediary "branch back" does not end block 921 since this "branch back" branches backward but also into the current block and thus can be executable in the emulation code without external jumps or a break in the pipeline. The "branch back" of block 921 thus follows rule 2.1 above by not ending the block 921.

Block 922 of FIG. 19*b* begins at the "branch in" and ends at the conditional "branch out" in accordance with rule 3 above. Between these branches, block 922 includes a short "branch forward" which does not end the block 922 due to its relative size, as listed in rule 2.2. Note that this rule may lead to compilation of code 924 that is not executed following the branch forward instruction up to the point where the branch forward returns to the instruction set. Also, "conditional branch" ends and begins blocks 922 and 923 in accordance with rule 3.

3.4.3 JUMP TABLE SHADOWS

Figure 3B:
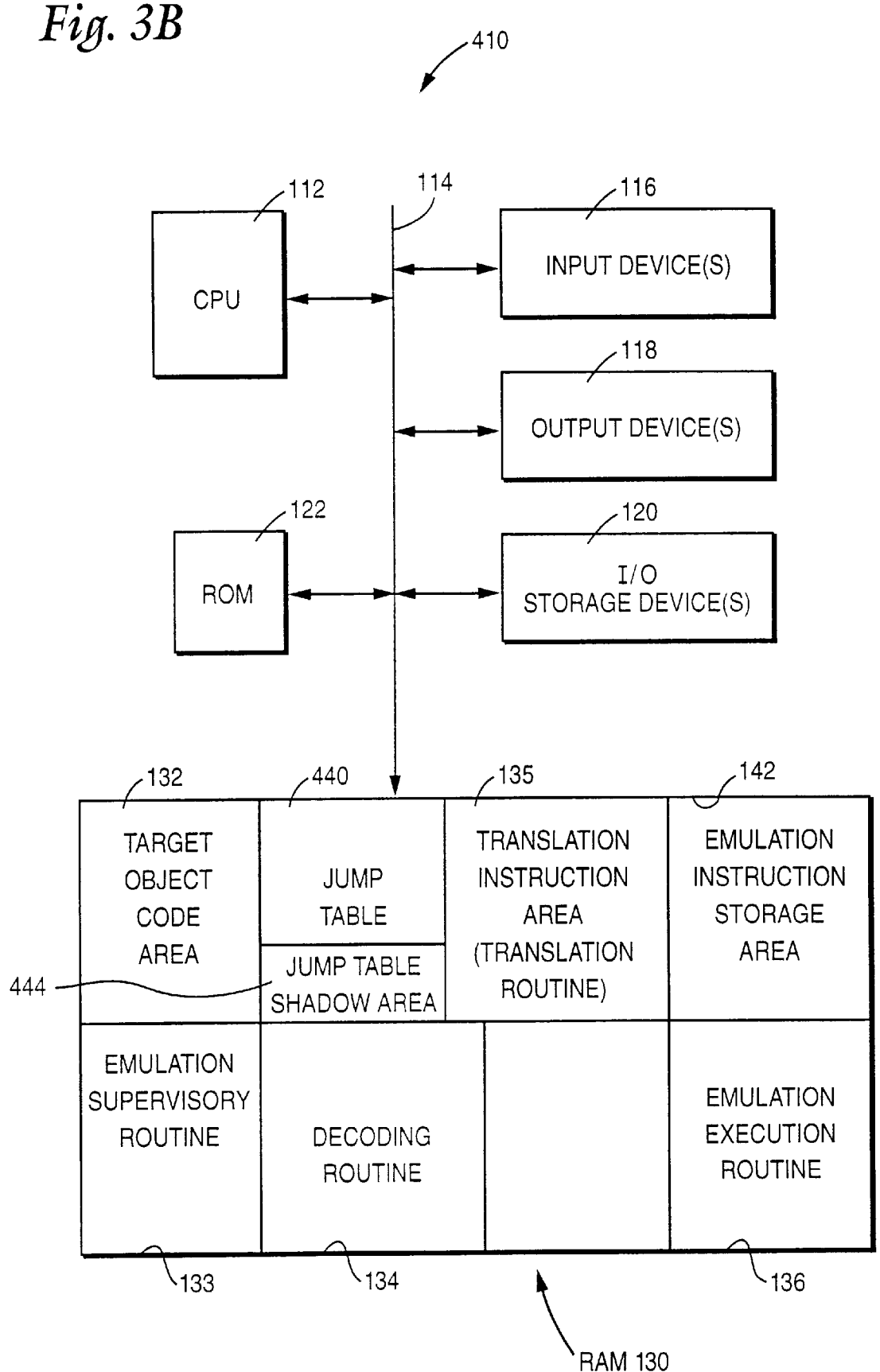
FIG. 3B is a schematic view of another embodiment of a host system according to the present invention, which embodiment reduces size of a jump table by the provision of jump table shadow tables.

Host system 410 of FIG. 3B achieves a small number of entries in its jump table 440. Host system 410 of FIG. 3B resembles host system 110 above described with respect to FIG. 3A, except as otherwise noted herein, e.g., by differently referenced constituent elements. One primary difference between host system 410 and host system 110 is the provision in RAM 130 of host system 410 of a jump table shadow area 444. The utilization of jump table 440 and jump table shadow area 444 are illustrated and expounded with reference to FIG. 16.

Figure 16:
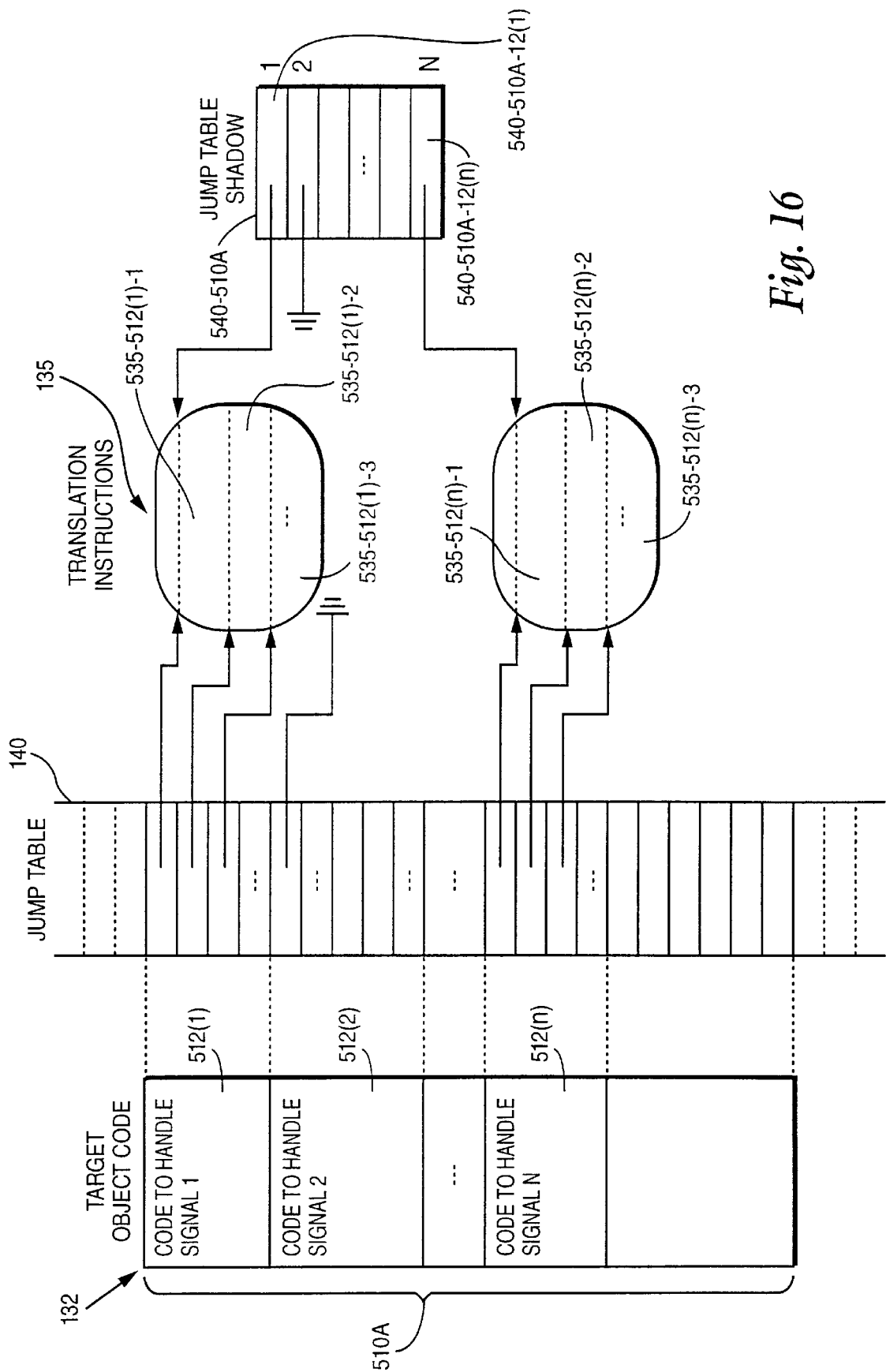
FIG. 16 is a diagrammatic view showing an interrelationship, according to the embodiment of FIG. 3B, between a target object code area, a jump table, a translation instruction area, and a jump table shadow table.

Host system 410 of FIG. 3B is particularly adapted for target instructions which are grouped into blocks, with at least some of the blocks including signal-handling target instructions. For example, for simplification target object code area 132 of FIG. 16 is shown as having stored therein one block 510A. Composing block 510A are various target instructions, including a group 512(1) of target instructions for handling a first signal; a group 512(2) of target instructions for handling a second signal; and a group 512(n) of target instructions for handling a last signal. As explained previously, a "signal" is a message sent from one block of code to another. The signal comprises both a signal header and a signal body. The signal header includes an identifier of the sending block and the recipient block, as well as a signal number or type. The signal body includes data which is to be utilized by the recipient block in the execution of the signal. Thus, in the example shown in FIG. 16, block 510A can receive any one of the first through last signals, in which case block 510A must be complied and translated. In addition, block 510A can also generate signals which are sent to other blocks.

As understood from the foregoing, each target instruction in block 510A, including the signal-handling target instructions included in groups 512(1) through 512(n), have corresponding pointers stored in jump table 540, with those pointers in turn referencing addresses of sets of translating instructions in area 135. For example, group 512(1) has three target instructions, for which three corresponding pointers are stored in jump table 540. The pointers in jump table 540 reference sets 535-512(1)-1 through 535-512(1)-3, respectively, of translating instructions in area 135. Similarly, and as another example, the pointers in jump table 540 for the signal-handling target instructions included in group 512(n) address sets 535-512(n)-1 through 535-512(n)-3, respectively, of translating instructions in area 135.

FIG. 16 also shows that, for block 510A, a jump table shadow table 540-510A is included in jump table shadow area 444. Jump table shadow table 540-510A has entries for each of the signals which block 510A is expected to handle. In this regard, jump table shadow table 540-510A has entries 540-510A-12(1) through 540-510A-12(n) corresponding to groups 512(1) through 512(n) of signal-handling target instructions included in block 510A. Each entry in jump table shadow table 540-510A is a copy of the entry in jump table 440 corresponding to the first target instruction in the corresponding group of signal-handling target instructions. For example, the first entry in jump table shadow table 540-510A, which is an entry for the first signal, is a copy of the pointer in jump table 540 which points to address 535-512(1)-1 of area 135. Similarly, the last entry in jump table shadow table 540-510A, which is an entry for the last signal, is a copy of the pointer in jump table 540 which points to address 535-512(n)-1 of area 135.

Figure 17:
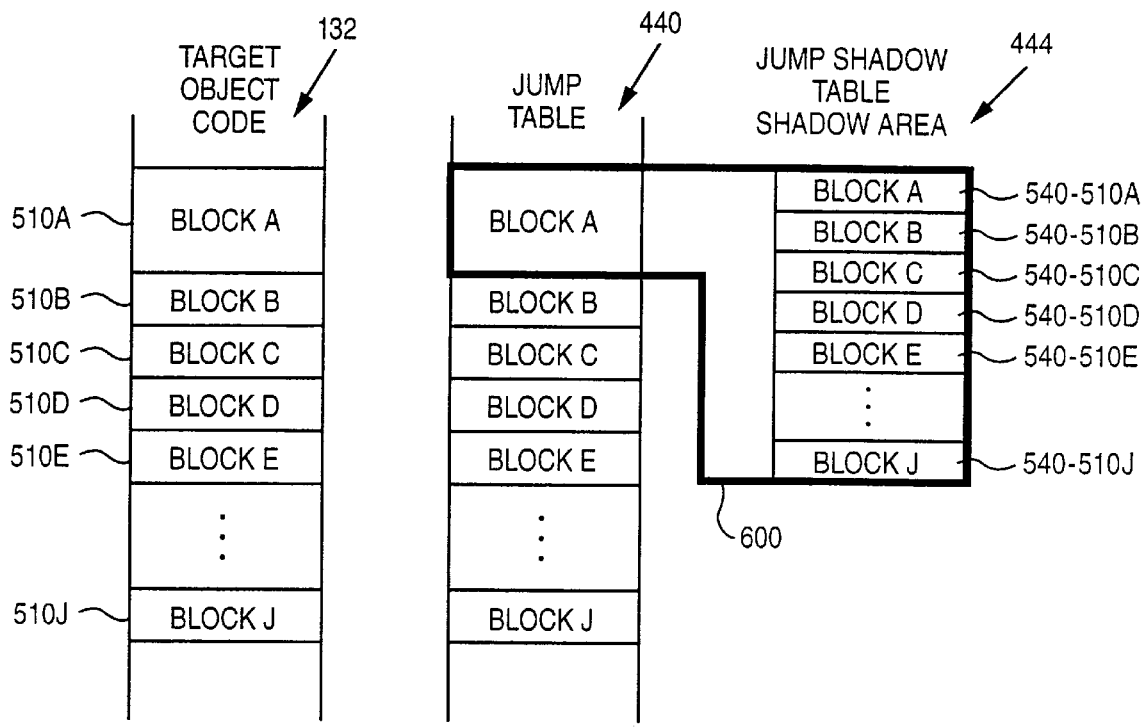
FIG. 17 is a diagrammatic view showing memory utilized for compilation of instructions necessary for translating a block in accordance with the embodiment of FIG. 3B.

FIG. 17 shows the embodiment of FIG. 16, but with a plurality of blocks 510A, 510B, . . . 310J, each having a respective one of the jump table shadow tables 540-510A, 540-510B, . . . 540-510J. Thus, particularly with reference to the preceding discussion, it is understood that jump table shadow tables for each block 510A, 510B, . . . 310J, has entries for each signal handled by the respective block. In this regard, the number of entries in the jump table shadow table for any given block can be determined from the signal distribution table for that block.

3.3.4 JUMP TABLE SEGMENTATION AND TIME-STAMPED COMPRESSION

FIG. 17 also shows compilation of code for translating a block of the target program. As understood from FIG. 17, host processor 112 need not have access to the entire jump table 440, but instead only so much of jump table 440 as is necessary for the block being translated, plus the jump table shadow tables for every other block for which signals are generated by the block being translated. Thus, in the example of FIG. 17 in which block 510A generates signals for each of blocks 510B–510N, host processor 112 need only have access to the memory areas framed by line 600 in FIG. 17.

Since host processor 112 does not need access to the entire jump table 440 of FIG. 3B, it is understood that the remainder of jump table 440 can be stored elsewhere than in RAM 130. For example, the remainder of jump table 440 can be stored on a disk or the like, such as is handled by I/O storage device 120 or some other caching technique employed.

Figure 3C:
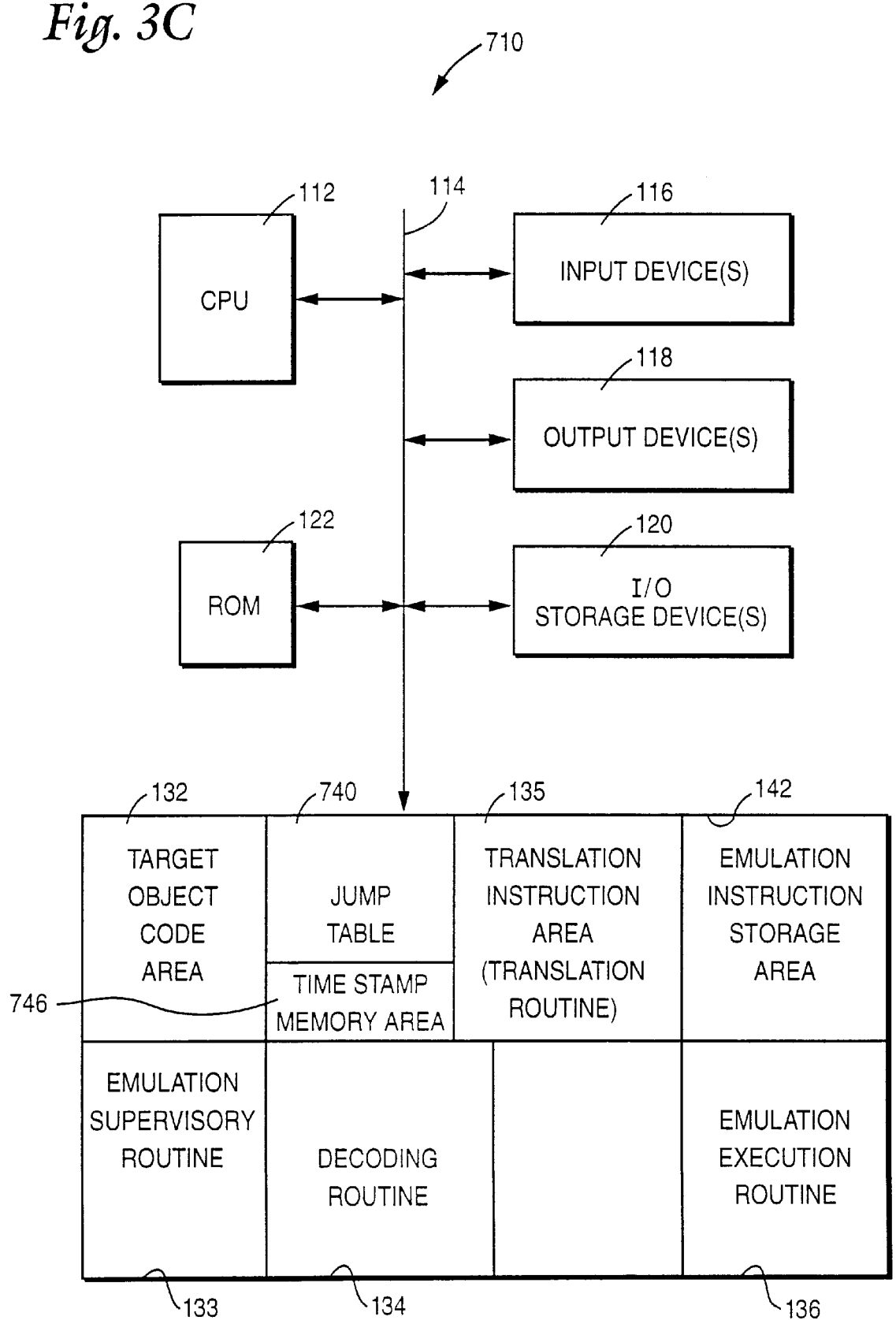
FIG. 3C is a schematic view of another embodiment of a host system according to the present invention, which embodiment reduces size of a jump table by utilization of a time-stamped compaction technique.

FIG. 3C illustrates another memory-saving embodiment of a host system 710, and particularly an embodiment utilizing compaction of data in jump table 740. Host system 710 of FIG. 3C resembles host system 110 above described with respect to FIG. 3A, except as otherwise noted herein, e.g., by differently referenced constituent elements. One primary difference between host system 710 and host system 110 is the provision in RAM 130 of host system 710 of a time stamp memory area 746. The utilization of time stamp memory area 746 in conjunction with compaction of data in jump table 740 is illustrated and expounded with reference to FIG. 18.

Figure 18:
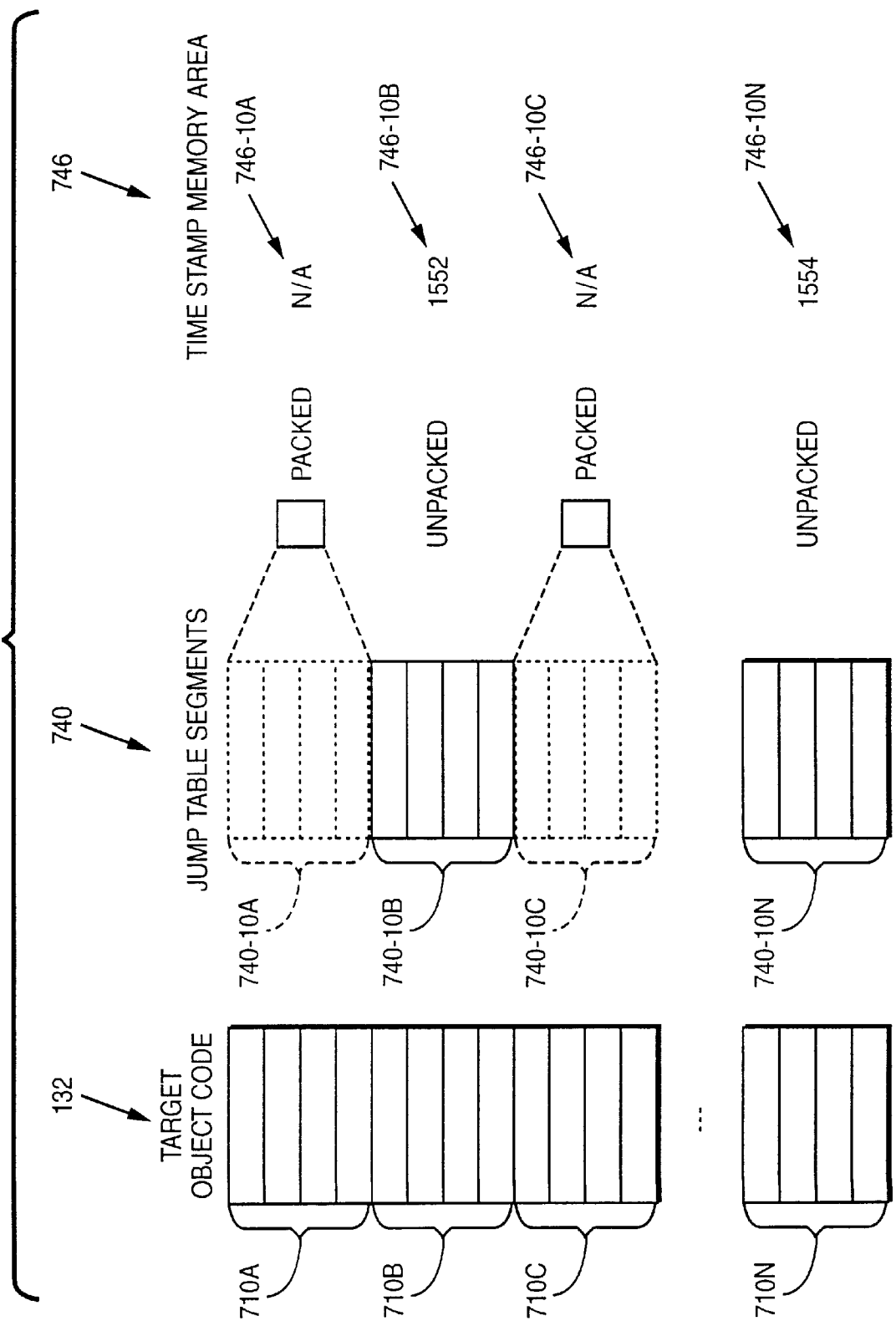
FIG. 18 is a diagrammatic view showing an interrelationship, according to the embodiment of FIG. 3C, between a target object code area, a jump table, and a time stamp memory area.

In FIG. 18, target object code area 732 has a plurality of blocks 710A through 710N. As in the foregoing embodiments, each target instruction of each block has a corresponding pointer in jump table 740. Although unillustrated in FIG. 18, it should be understood that the pointers in jump table 740 point to sets of translation instructions in like manner as described in connection with other embodiments described herein.

As shown in FIG. 18, block 710A has its set of pointers 740-10A in jump table 740, block 710B has its set of pointers 740-10B in jump table 740, and so forth continuing to block 710N. The sets of pointers in jump table 740 which are shown in broken lines are compacted, i.e., have packed data, while the sets of pointers in jump table 740 which are shown in solid lines are uncompacted.

As further shown in FIG. 18, each set of pointers 740-10A through 740-10N in jump table 740 has a time stamp stored in time stamp memory area 746. For example, set 740-10A has a time stamp 746-10A; set 740-10B has a time stamp 746-10B; and so forth. For uncompacted sets, each time stamp indicates a relative time at which the set of pointers in jump table 740 was uncompacted. For example, time stamp 746-10B indicates that set 740-10B was uncompacted at time 1552; time stamp 746-10N indicates that set 740-10N was uncompacted at time 1554.

Thus, in the embodiment of FIG. 3C, jump table 740 is split into segments, one for each block of the target program. These segments are packed and unpacked independently. When compiling code for a block, host processor 710 unfolds the associated segment in jump table 740 so that the standard immediate lookup mechanism is available for calculation of local branch destinations. When the execution thread leaves the current block, host processor 710 recompacts the associated segment in jump table 740.

Preferably, host processor 710 allows only a predetermined number, e.g., 20 to 50, of segments of jump table 740 to be unpacked simultaneously. As indicated above, these unpacked segments are time-stamped. The least-recently used segment of jump table 740, as determined from the time stamp memory area 746, is packed when the need for unpacking a new segment arises. Preferably, only a small number of blocks will be active most of the time, so the embodiment of FIG. 3C in such cases provides a good trade-off between time and memory requirements.

3.5 INSTRUCTION CONVERSION

Another aspect which may optionally, and preferably, be incorporated into the present embodiments of the invention is an incremental compiler used as an intermediate step in the translation of code from the target code to the emulation code. The function pointers between the target code and the emulation code can be initially defined by references to functions for decoding the target instructions and generating the emulation instructions. In this way, changes to the target computer system can be accommodated in the translation by updating the table references that are consulted during the translation steps.

Figure 20:
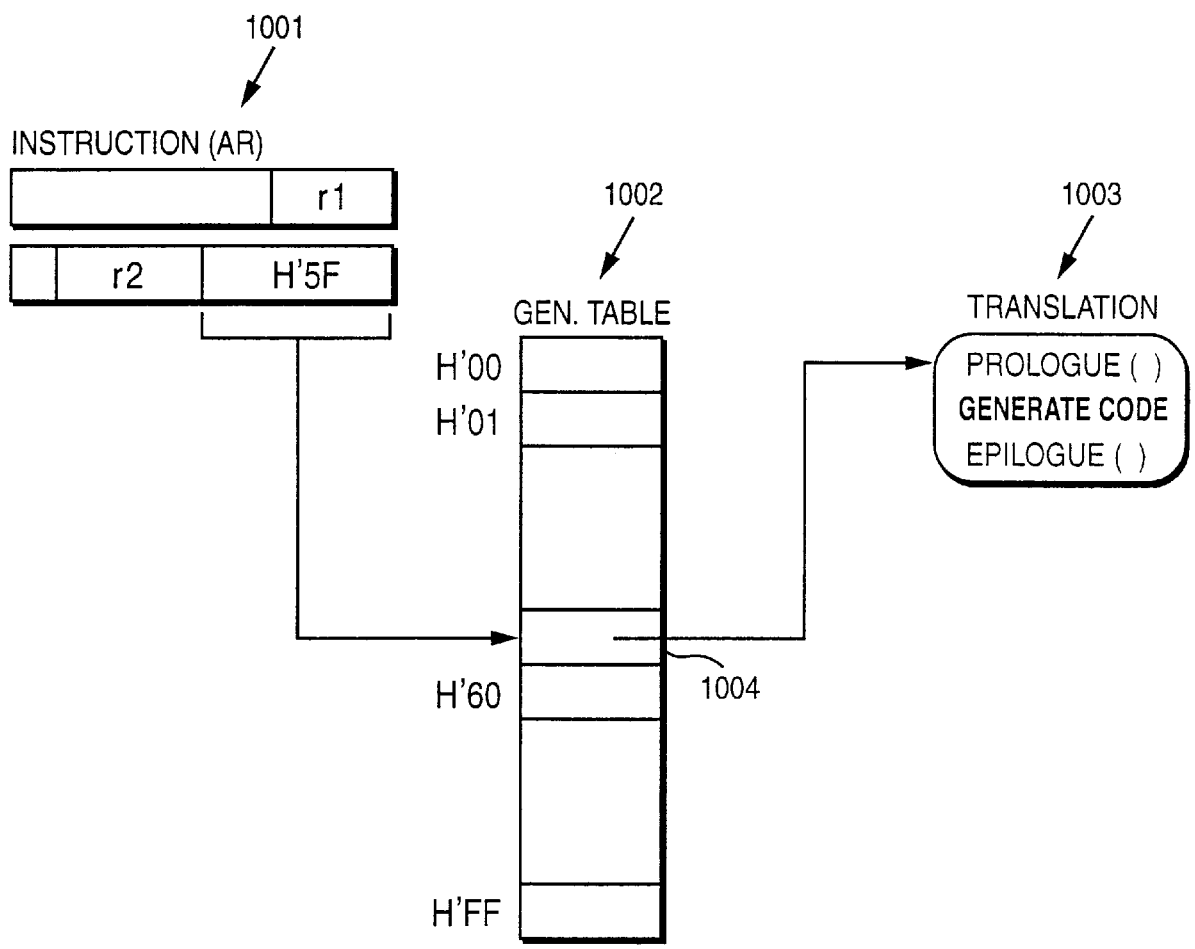
FIG. 20 is a diagrammatic view of the interrelationships between a modified target instruction, a intermediary generation table, and the translation into emulation code, and illustrates a process of converting a particular target instruction, i.e., the Add Register to Register instruction, to a host instruction.

That is, instead of a translation that simply decodes target instructions and generates corresponding simulation code, the example embodiment of FIG. 20 employs translation step 1003, which pulls its target instructions from generation table 1002 and performs "prologue" and "epilogue" routines respectively before and after the actual emulation code generation. These routines are described in greater detail below.

The example of FIG. 20 shows an add register instruction being decoded and re-generated as emulation code. The code conversion process begins by reading the target instruction 1001. In this case, the target instruction is an add register instruction from "r1" to "r2" at location H'5F. This instruction is loaded in generation table 1002 at location 1004, thus updating generation table 1002 to accommodate the new instruction step in the emulation code generation routines. Translation step 1003 then pulls the change instruction from 1004, executes 1) the prologue routine, 2) the emulation code generation routine, and 3) the epilogue routine.

The decoding and code generation for a simple AR instruction is done using the following function (cf. 3, Section 3.8.8):

```
GenAR()
{
    register u_char r1 = (instr[0] >> 16) & 0x3f;
    register u_char r2 = (instr[0] >>  8) & 0x3f;
    PROLOGUE(5); /* At most 5 host instructions */
    OUT_READHALF_2_REGS(r1,op1,r2,op2);
    OUT_ADD(op1,op2,op1);
    OUT_SRL(op1,16,regRIR_N);
    OUT_WRITEHALF_REG(op1,r1);
    EPILOGUE(2); /* simulates 2 target cycles*/
}
```

FIG. 20 is a diagrammatic view of a process of converting a particular target instruction, i.e., the Add Register to Register instruction (AR r1–r2), to a host instruction.

The OUT- macros take care of the actual code generation, i.e. building the bit pattern corresponding to the instruction and saving the pattern in memory. For each of the fixed width instructions, a corresponding OUT- macro exists for the Sun SPARC in a file called sparc_code.h. The OUT_ADD macro used above generates the binary representation of a SPARC add instruction. It is defined as follows:

```
#define OUT_ADD(RS1,RS2,RD) \
    GEN(0x80000000 | ((RD)<<25) | ((RS1)<<14) | (RS2))
```

The OUT_macros use another macro called GEN defined as follows:

```
#define GEN(instruction) \
    *emulation_code_top++ = (instruction)
```

This macro saves the instruction bit pattern in the host code buffer (at emulation_code_top) and updates the emulation_code_top pointer. Overflow in the host code buffer is checked in the prologue (see section 3.5.1.).

3.5.1 PROLOGUE

The function PROLOGUE is called as the first action in converting an instruction before any code is generated. The prologue ensures that there is sufficient space available in the host code buffer area, updates the jump table pointer and can be used for printing tracing information.

```
void PROLOGUE(int ninst)
{
    if (emulation_code_top+ninst+EPILOGUE_MAX_SIZE >=
        emulation_code_base+emulation_code_size)
        grow_emulation_code_buffer();
    *jt_entry++ = (u_long)emulation_code_top;
    if (sim_convert_trace_on) {
        sim_printf("0x%x: ", emulation_code_top);
        print_instruction((u_long)current_logical);
    }
}
```

The jt_entry pointer refers to the jump table used during conversion (see Section 3.4.2).

The prologue shown is for single stepping mode.

3.5.2 EPILOGUE

After code is generated for an instruction, an epilogue function is called. This epilogue handles several things. First of all, the simulator contains an event mechanism, which is used for several purposes, that has to do with simulated time. E.g. if the user wants the simulator to break after 950 cycles has passed, this is implemented by posting an event to the simulator with a delay of 950. Similarly, the handling of delayed signal via job buffers, may use the event mechanism. The epilogue updates a host register regE for each cycle that is simulated (i.e. several cycles for the instructions, that take more than one cycle on the target machine). When regE matches a time stamp in the (sorted) event queue, function if needed can be done in 3 host instructions in precise mode. In fast mode, the event check is only done at a few places in the generated code, e.g. at the end of each compilation unit.

Also, the epilogue checks the number of instructions simulated in the current execution slice and returns control to the surrounding framework scheduler if this number exceeds the predetermined threshold (say, 1,000 or 10,000 target instructions. This may also be done using the event mechanism.

Besides the above event check, the standard epilogue function EPILOGUE will update the simulated program counter (IAR) by adding the size of the instruction just executed to it.

Two more variants of the epilogue exist: The SIGNAL_EPILOGUE is used by functions generating code for signal sending instructions. It uses the signal distribution tables to find the new simulated program counter (see Section 3.4.2). The JUMP-EPILOGUE is used by functions simulating branches, and calculates the new simulated program counter using the hash tables mentioned in Section 3.4.2. Both SIGNAL_EPILOGUE and JUMP_EPILOGUE also generate a call to an update_jam function, that updates the Jump Address Memory buffer.

In accordance with yet another example embodiment of the invention. The memory for host computer to store the emulation code is allocated in appropriate chunks by the host computer, as simulated target instructions are written to it. In addition, the host computer can simulate memory allocation that would be used by the target computer executing the target instructions.

3.6 MEMORY HANDLING AND SIMULATION

Two kinds of memory handling occur: (1) handling internal simulator memory, e.g. memory for emulation code; and (2) simulation of target memory, e.g. the Data Store DS.

Item (1) must be handled using memory calls provided by the Framework. Target memory simulation involves simulation of DRS and PS. Host memory for DRS and PS is allocated in appropriate chunks by the simulator as the simulated target instructions write to it. These writings are easily detected, since they use specific instructions (XWPS, WS, XFTR, . . . ). Since these memory accesses must be validated by the simulator anyway, no significant overhead is expected for this extra bookkeeping. For instance, a chunk size of 16K or 32K could be used.

When the simulator is started, memory is initialized by reading in a previously created memory dump. This puts DS, PS and RS in a well-defined state.

It should be noticed that a special process on the lowest priority level (DL) constantly scans the whole memory area to check that the hardware is working properly. This process might cause problems to the memory model because the entire DRS and PS will be read and written thereby causing all memory to be swapped from disk to memory, thus degrading performance. This priority process should probably be located and disabled.

3.7 REGISTER SIMULATION

Figure 21:
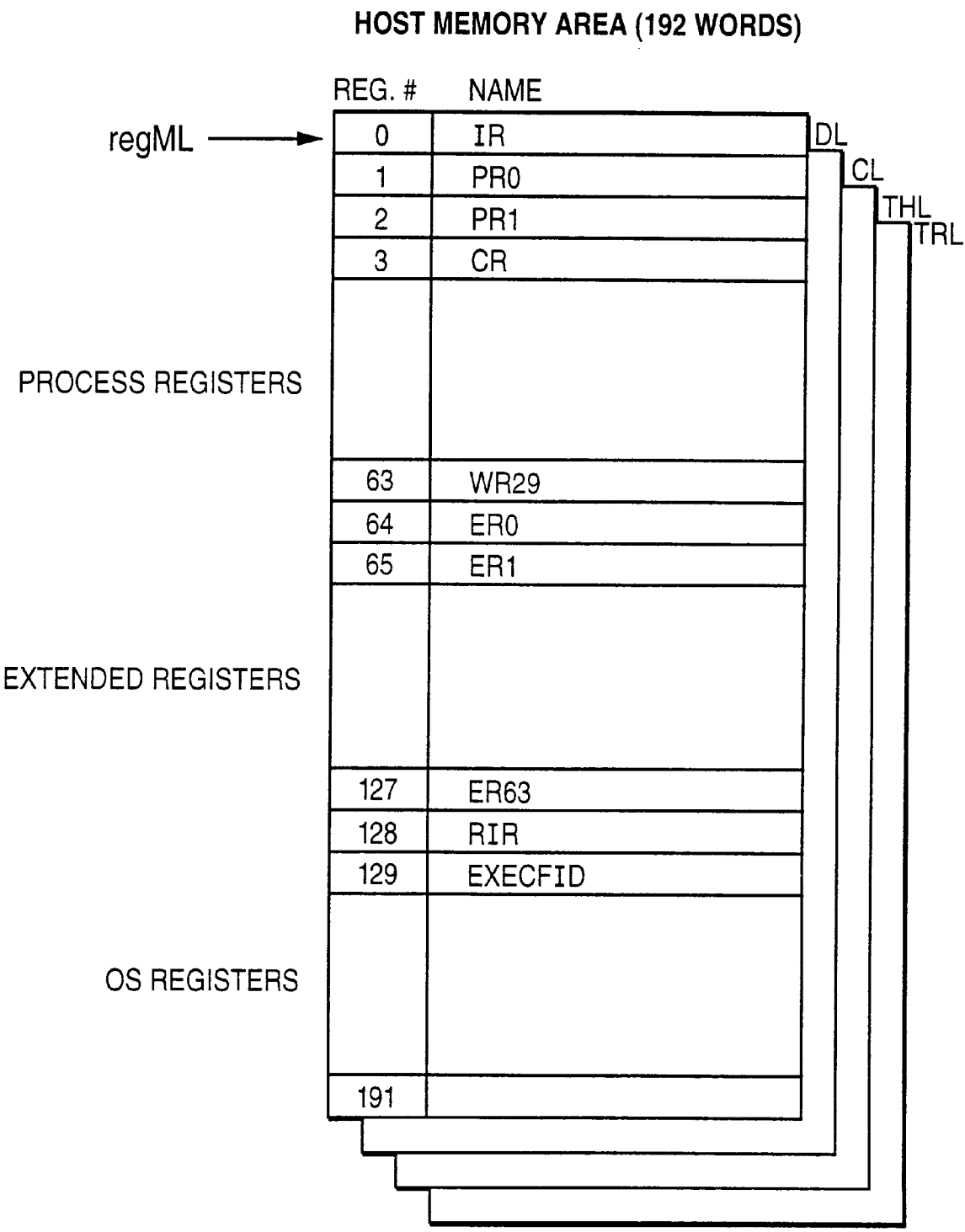
FIG. 21 is a diagrammatic view of register simulation in host memory.

The APZ incorporates 192 general-purpose registers on each of the four execution levels (see section 3.2.2 and section 3.2.6). These registers can be simulated in host memory with a global host register regML pointing to them, as shown in FIG. 21. As can be seen, there is one such memory area for each APZ priority level. When a level-change is simulated, the regML register is changed likewise.

In addition, the 224 registers that are shared across all priority levels are stored in a single host memory area, pointed to by register regMN.

3.7.1 REGISTER CACHING

The most used target registers can be simulated directly in host registers allocated for this purpose. The read_reg, read_2_regs, readhalf_reg, readhalf_2_regs, write_reg, write_2_regs, writehalf_reg, and writehalf_2_regs pseudo instructions mentioned handle most of the register caching details. For example, the read_reg instruction will get the target register from the host register used to cache it instead of loading it from memory. Some special purpose registers are always cached, e.g. RIR in regRIR.

4.0 SYSTEM ADVANTAGES

As described above, simulated central processor CP 234 simulates central processor 34 of the target system down to the instruction and register level. That is, simulated central processor CP 234 simulates execution of the instruction set for CP 34 and use of all registers of CP 34. On the other hand, other processors which handle such chores as supervision and data transmission (e.g., packing/unpacking of data) are not simulated with full instruction set simulation (ISS), but instead are implemented by interface simulation. Internal buses are implemented by function calls between the various simulated subsystems.

From the foregoing, it can be seen that simulation system 200 of the present invention has many advantages. Some of these advantages and benefits are listed below.

4.1 GAIN IN PRODUCTIVITY

Simulation system 200 provides a gain in productivity for the user, as evidenced by the following:

(1) The new simulated environment solves the problems of present interfaces.

(2) The complete PLEX and ASA (AXE Assembler) system can be loaded.

(3) System sizes of several hundreds of MB can be executed.

4.2 GAIN IN QUALITY

Simulation system 200 provides a gain in quality for the user, of which the following are examples:

(4) A major part of the function tests of the target system can be accomplished using simulation system 200.

(5) Improved usability through easier handling of configuration, loading, starting, and execution of test specification and debugging.

4.3 GAIN IN LEAD TIME

Simulation system 200 provides a gain in lead time for the user, of which the following are examples:

(6) Simulation system 200 provides a target environment on a work station, shortening the lead time in testing.

(7) Execution speed in simulation has much shorter turnaround time. The turnaround time includes loading, starting system, execution of tests and debugging.

(8) Double test instruction are no longer needed.

(9) Overhead in sustaining of software is decreased, due to the possibility of testing blocks and corrections easily in simulated environment.

(10) Program corrections can be tested easily in simulation system 200.

(11) Dump production can be easily accomplished.

(12) Configuration of a large system can be done in a simulated environment and then a dump can produced to be used at site.

(13) Reduced need for test plants.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A simulation system executable on a host computer system for testing a target telecommunications switching exchange which includes a group switch, the target telecommunications system having a central processor and plurality of subsystems which communicate via an internal bus, the simulation system comprising:

a simulation kernel containing a plurality of simulation subsystems which correspond to the subsystems of the target telecommunications system, the simulation kernel being assembled as one executable image with all simulation subsystems executing in one common process context and sharing one common execution thread;

the plurality of simulation subsystems including a group switch simulator which simulates hardware of the group switch including a plurality of time switch modules in which, when a call is to be set up in real time in the group switch, a path through the group switch is selected by writing to an appropriate one of the time switch modules;

the simulation kernel including a traffic generator which establishes simulated real time connections through the group switch simulator;

a user communication channel to the simulation kernel for entering commands;

the simulation kernel including a central processor simulator which simulates execution of target instructions in response to the commands and which simulates utilization of registers of the central processor of the target telecommunication system.

2. The simulation system of claim 1, wherein the central processor of the target telecommunications system has an instruction processor, a signal processor, and a regional processor handler, wherein the central processor simulator has a simulated instruction processor which simulates an instruction processor of the target telecommunications system, and wherein the central processor simulator simulates the signal processor and the regional processor handler at an interface level.

3. The simulation system of claim 1, wherein the commands entered through the user communication channel are for configuring a selected simulation subsystem in accordance with hardware of the corresponding subsystem of the target telecommunications system.

4. The simulation system of claim 1, wherein the commands entered through the user communication channel are for accessing at least one of the simulation subsystems.

5. The simulation system of claim 4, wherein commands entered through the user communication channel for a selected simulation subsystem are transmitted to the simulation kernel through a socket and passed to the simulation subsystem by a command dispatcher.

6. The simulation system of claim 1, wherein each subsystem is organized in a tree hierarchy.

7. The simulation system of claim 1, wherein each simulation subsystem has a command interpreter.

8. The simulation system of claim 7, wherein each interpreter includes routines for handling hardware configuration of its simulation subsystem.

9. The simulation system of claim 1, wherein each simulation subsystem is controllable from the user communication channel, wherein each simulation subsystem has its own command interpreter and own command set.

10. The simulation system of claim 9, wherein interpreters for all subsystems follow the same principles for command analysis.

11. The simulation system of claim 1, wherein one of the simulation subsystems is one of the following:
 (1) a traffic generator for generating ISDN basic rate access tests;
 (2) a group switch simulator;
 (3) a conference call device simulator;
 (4) a signal transfer central simulator which communicates with a simulated extension module regional processor device; and
 (5) a signal transfer remote simulator.

12. The simulation system of claim 1, wherein the simulation subsystems include a signal transfer central simulator and a signal transfer remote simulator, and wherein the signal transfer central simulator and the signal transfer remote simulator transfer signals using procedure calls.

13. The simulation system of claim 1, wherein some of the functions of at least one of the a simulation subsystems are performed by the central processor simulator.

14. The simulation system of claim 1, wherein one of the subsystems of the target telecommunications system is a module through which a subscriber has access to the telecommunications system, the module being controlled by an access processor, and wherein the simulation system further comprises a simulated access processor, the simulated access processor simulating an instruction set of the access processor and a register set of the access processor, the simulated access processor interacting with subsystems at a logical level.

15. The simulation system of claim 1, wherein the internal bus of the target telecommunication system is simulated by function calls between the simulation subsystems.

16. The simulation system of claim 1, wherein the group switch simulator comprises:
 a time switch module simulator for simulating the hardware of the plurality of time switch modules;
 a function for creating data structures for the time switch module simulator;
 a clock module simulator;
 a group switch hardware simulator;
 a function for analyzing paths through the group switch hardware simulator.

17. The simulation system of claim 1, wherein the group switch simulator comprises:
 a time switch module simulator for simulating the hardware of the plurality of time switch modules;
 a group switch hardware simulator which includes routines for simulating data stores of the plurality of time switch modules, and wherein the group switch hardware simulator is controlled by the time switch simulator.

18. The simulation system of claim 17, further comprising a time switch module signal interface simulator for handling signals set between the time switch module simulator and one of the central processor and a regional processor of the group switch.

19. The simulation system of claim 1, wherein software functionality of the plurality of time switch modules is distributed between the central processor simulator and the group switch simulator, the group switch simulator simulating regional software executed by a regional processor of the group switch.

* * * * *